United States Patent
Sato et al.

(10) Patent No.: US 7,176,959 B2
(45) Date of Patent: Feb. 13, 2007

(54) VEHICLE SURROUNDINGS DISPLAY DEVICE AND IMAGE PROVIDING SYSTEM

(75) Inventors: Satoshi Sato, Osaka (JP); Masamichi Nakagawa, Osaka (JP); Shusaku Okamoto, Kanagawa (JP); Atsushi Morimura, Nara (JP); Yoshihiko Matsukawa, Nara (JP); Kunio Nobori, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 645 days.

(21) Appl. No.: 10/237,514

(22) Filed: Sep. 9, 2002

(65) Prior Publication Data

US 2003/0076414 A1 Apr. 24, 2003

(30) Foreign Application Priority Data

Sep. 7, 2001 (JP) ............................. 2001-272518

(51) Int. Cl.
  *H04N 7/18* (2006.01)
(52) U.S. Cl. ...................................... 348/148; 382/104
(58) Field of Classification Search ................ 348/148, 348/135, 113, 116, 136, 140, 143, 169, 139, 348/141, 142; 382/106, 105, 104, 286, 199, 382/309, 276, 254
See application file for complete search history.

(56) References Cited

U.S. PATENT DOCUMENTS 5,646,679 A * 7/1997 Yano et al. .................... 348/47
6,008,865 A * 12/1999 Fogel ........................... 348/700
6,477,260 B1 * 11/2002 Shimomura .................. 382/106
2004/0184638 A1 * 9/2004 Nobori et al. ............... 382/104

FOREIGN PATENT DOCUMENTS

| DE | 100 37 129 A1 | 4/2001 |
|---|---|---|
| JP | 58-110334 | 6/1983 |
| JP | 59-120877 A | 7/1984 |
| JP | 62-16073 B2 | 4/1987 |
| JP | 06-333200 | 12/1994 |
| JP | 07-223488 | 8/1995 |

(Continued)

OTHER PUBLICATIONS

Osamu Hasegawa et al.; "Online Object Classification in Street Video"; The 7th Symposium on Sensing via Image Information Collected Papers; p. 221-226; Jun. 2001; together with partial English translation thereof.

(Continued)

*Primary Examiner*—Tung Vo
*Assistant Examiner*—Behrooz Senfi
(74) *Attorney, Agent, or Firm*—Harness, Dickey & Pierce, P.L.C.

(57) ABSTRACT

In the vehicle surroundings display device of the invention, an image processor generates an image showing the situation around a vehicle. When an obstacle is detected by an obstacle detection means, the image processor determines an image missing region using the position of the border of the obstacle on the vehicle side detected by an obstacle position detection means and fills the image missing region with substitute image data. This eliminates unnaturalness of a display image the user may feel and enables the user to accurately recognize the position of a neighboring obstacle that is important in driving operation.

12 Claims, 52 Drawing Sheets

FOREIGN PATENT DOCUMENTS

| | | |
|---|---|---|
| JP | 10-302074 | 11/1998 |
| JP | 2001-010427 | 1/2001 |
| JP | 2001-101405 | 4/2001 |
| JP | 2001-101405 A | 4/2001 |
| JP | 2001-187553 | 7/2001 |
| WO | WO 00/64175 | 10/2000 |

OTHER PUBLICATIONS

Ismail Haritaoglu et al., "W[4]: Who? When? Where? What? A Real Time System for Detecting and Tracking People"; Third Face and Gesture Recognition Conference; pp. 222-227; Apr. 1998.

Hideo Saito et al.; "Virtualizing Real Scene from Multiple View Images—View Interpolation of Multiple Cameras Based on Projective Geometry Among Cameras -"; Information Processing Society of Japan SIG Notes 2002-CVIM-131; pp. 53-60; Jan. 17, 2002.

Massimo Bertozzi et al.; "Performance Analysis of a Low-Cost Solution to Vision-Based Obstacle Detection"; International Converence on Intelligent Transportation Systems; pp. 350-355; Oct. 1999.

Notice of Reasons of Rejection for Japanese Patent Application No. 2002-241144; Mailed Jul. 6, 2004; and English translation thereof.

European Search Report for Application No. EP 02 02 0059; European Patent Office, Munich; Mailed Oct. 20, 2004.

* cited by examiner

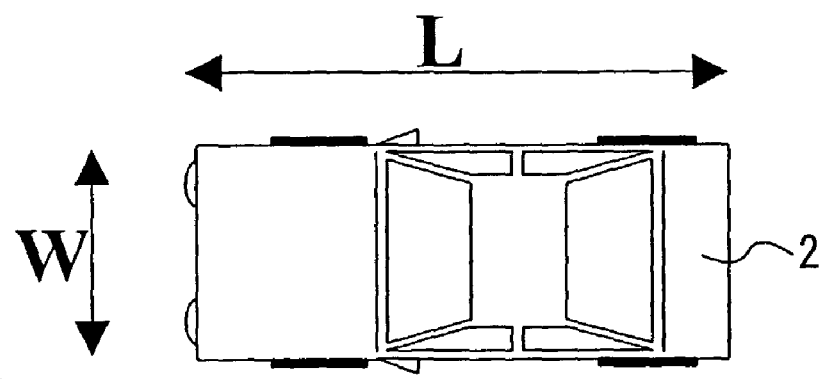
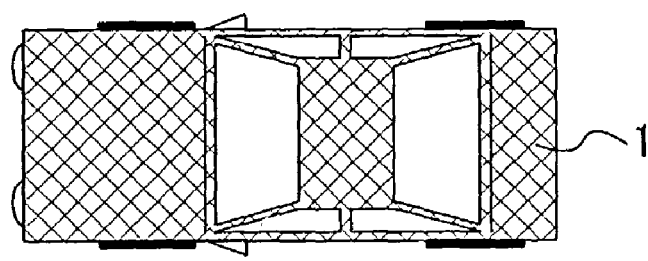
FIG. 7A
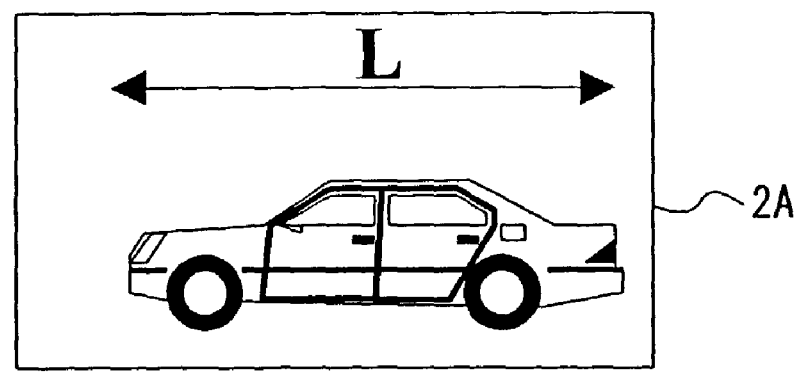
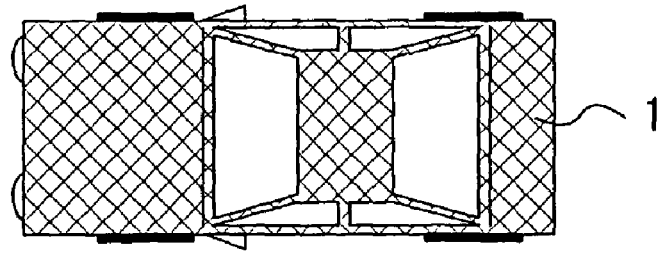
FIG. 7B

FIG. 13
Surroundings image
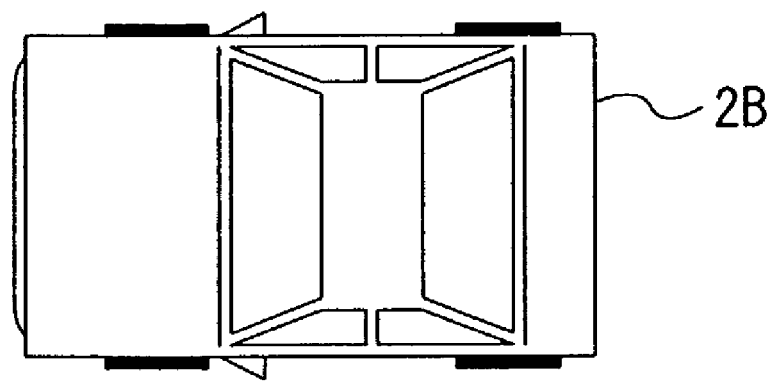
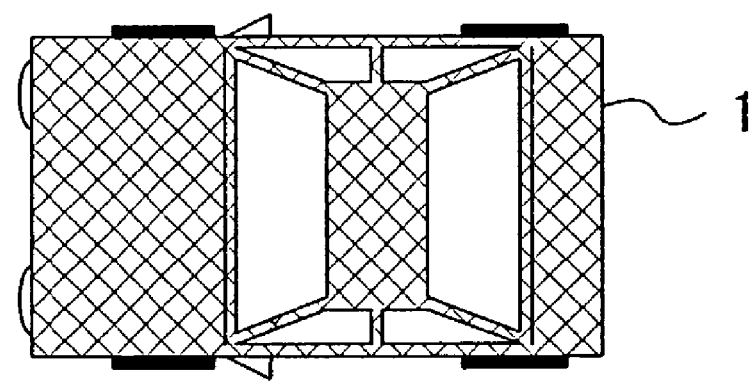

FIG. 15
Surroundings image
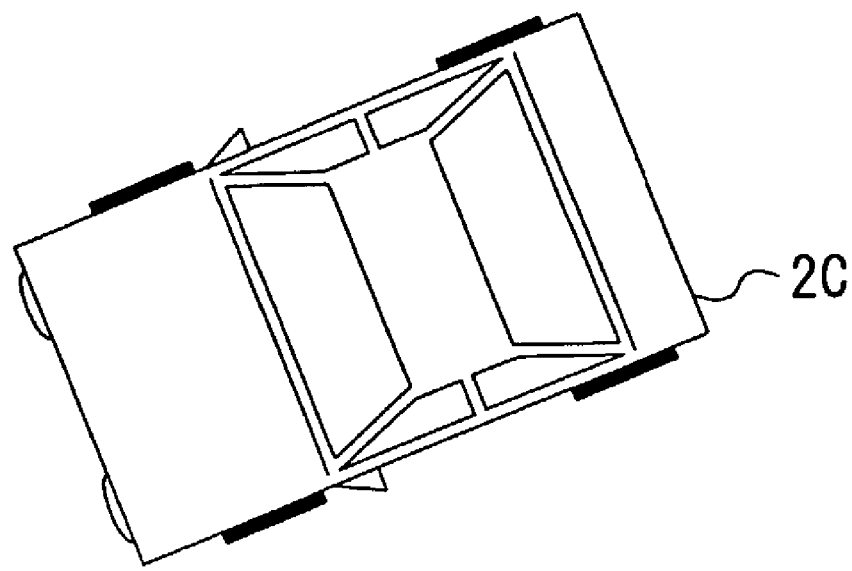
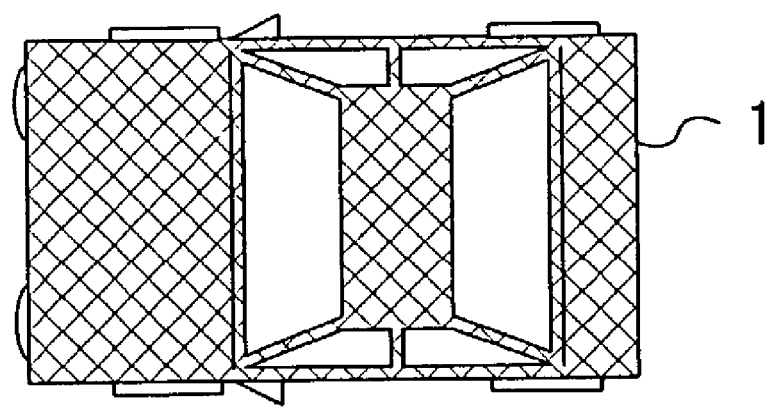

FIG. 18
Surroundings image
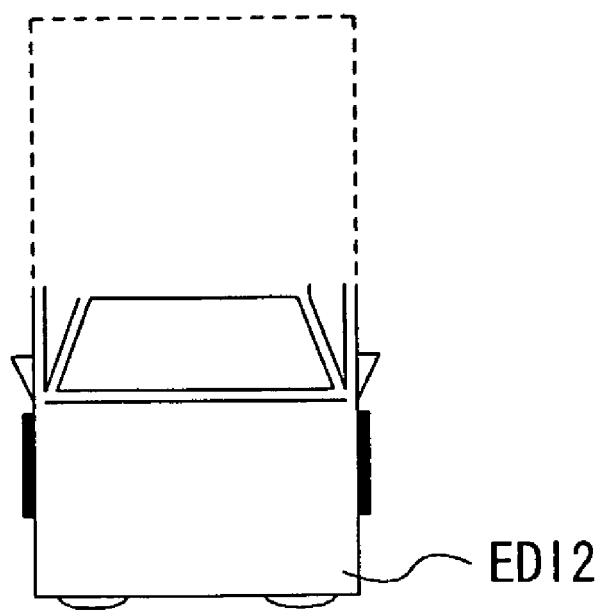
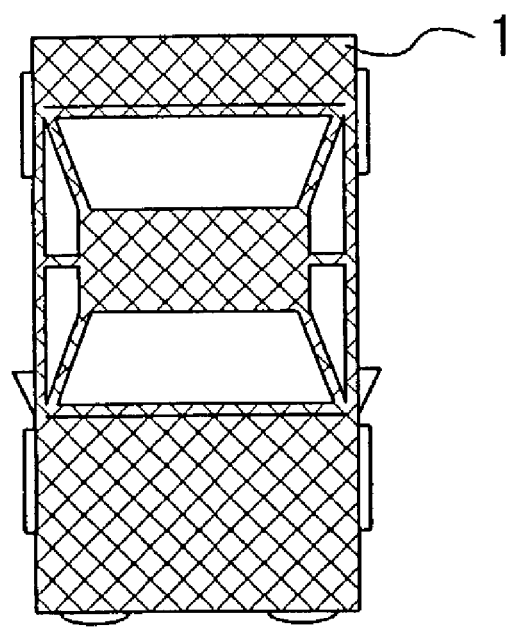

FIG. 20
Surroundings image
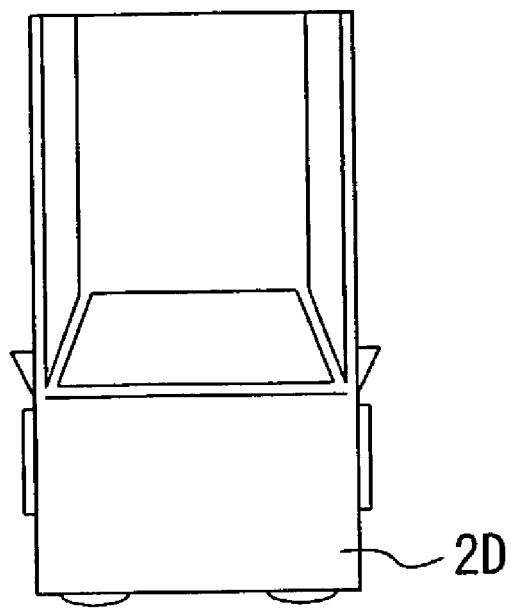
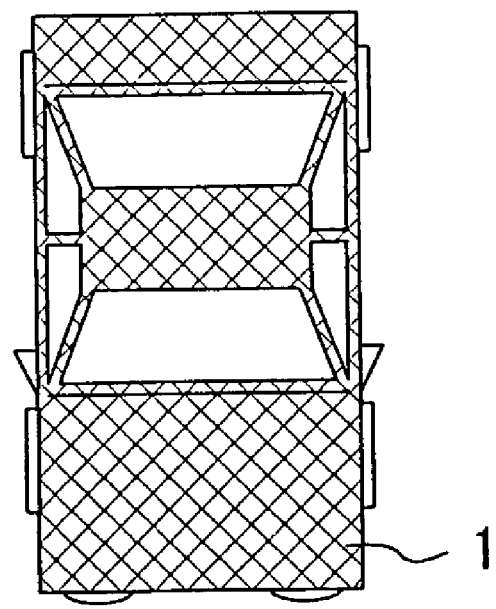

FIG. 25
| Model No. | Model identifying data | Color data | Display data |
|---|---|---|---|
| Model 1 |  | White (230,230,230) Silver (140,150,150) Blue (20,30,80) ... |  |
| Model 2 |  | White (220,240,250) Silver (130,130,130) Red (180,25,25) ... |  |
| ... | ... | ... | ... |

Vehicle

Pedestrian

General obstacle

Motorcycle

Obstacle region

Virtual obstacle shape

Obstacle region

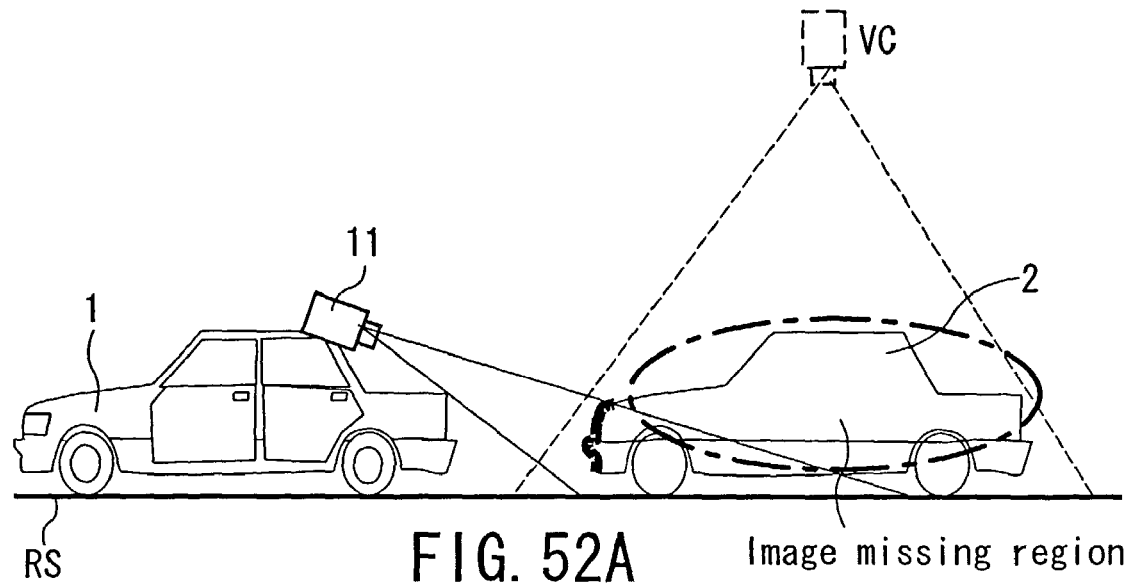
FIG. 52A   Image missing region
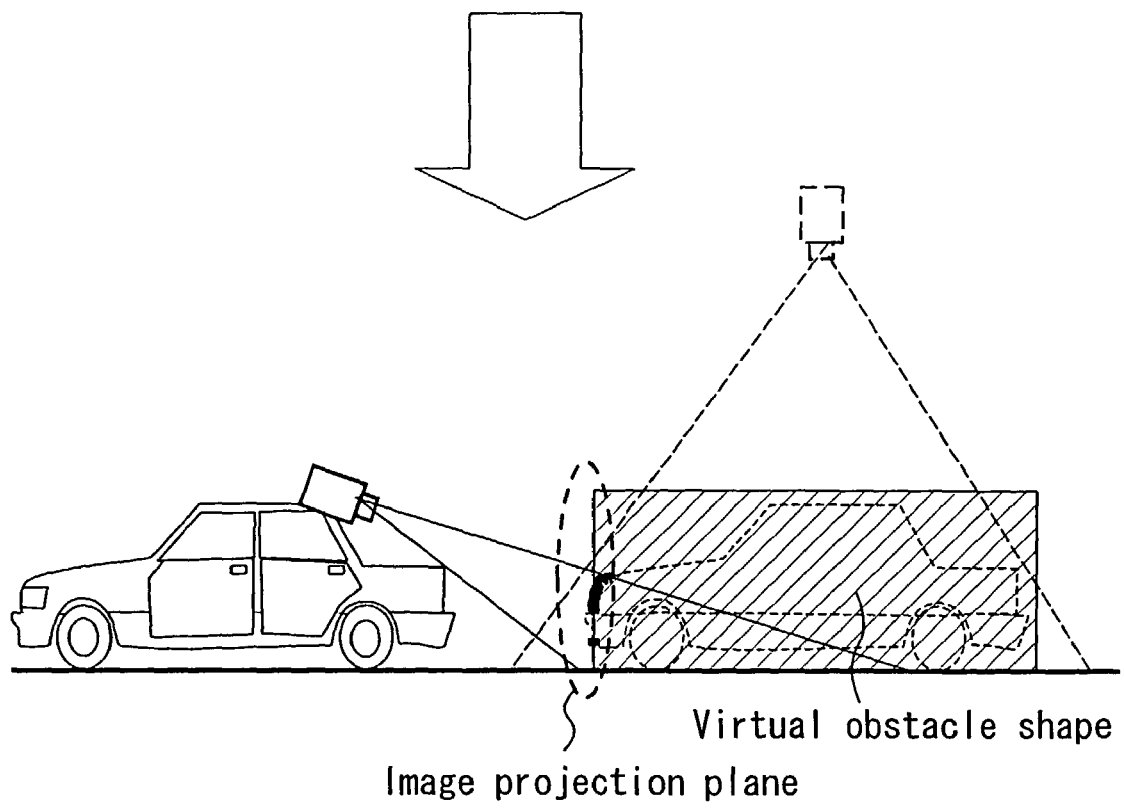
Image projection plane   Virtual obstacle shape
FIG. 52B

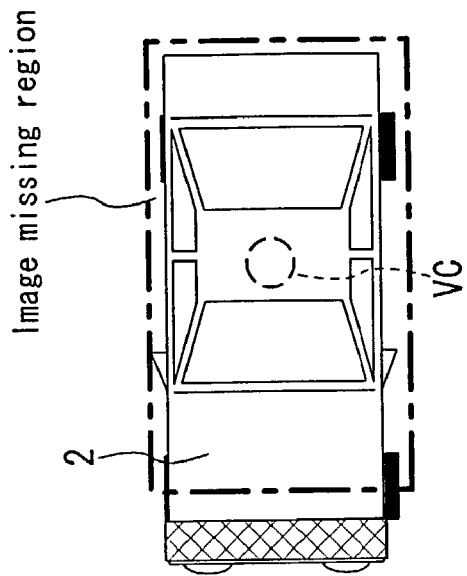
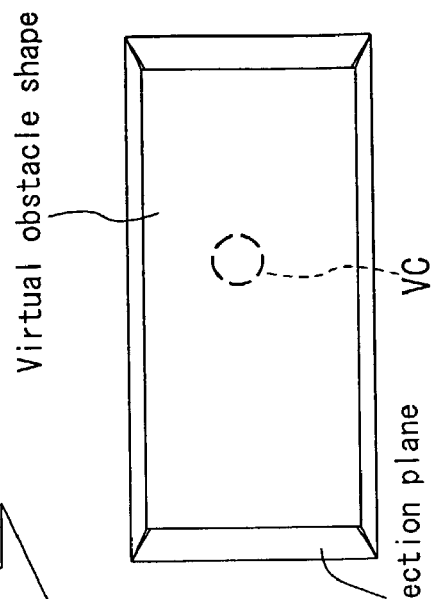
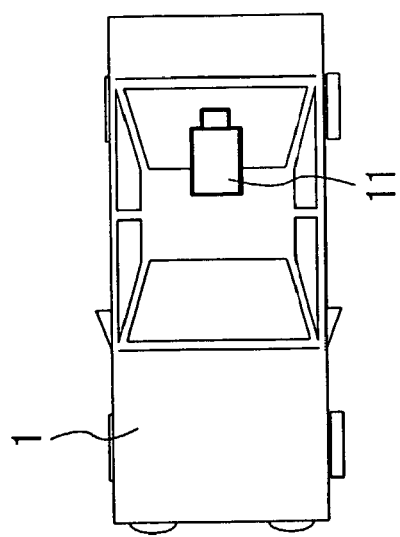
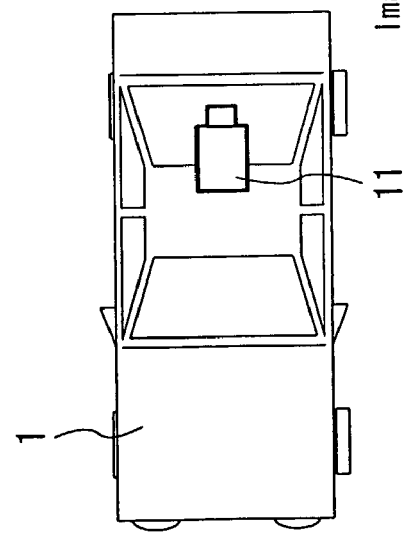
FIG. 53A
FIG. 53B

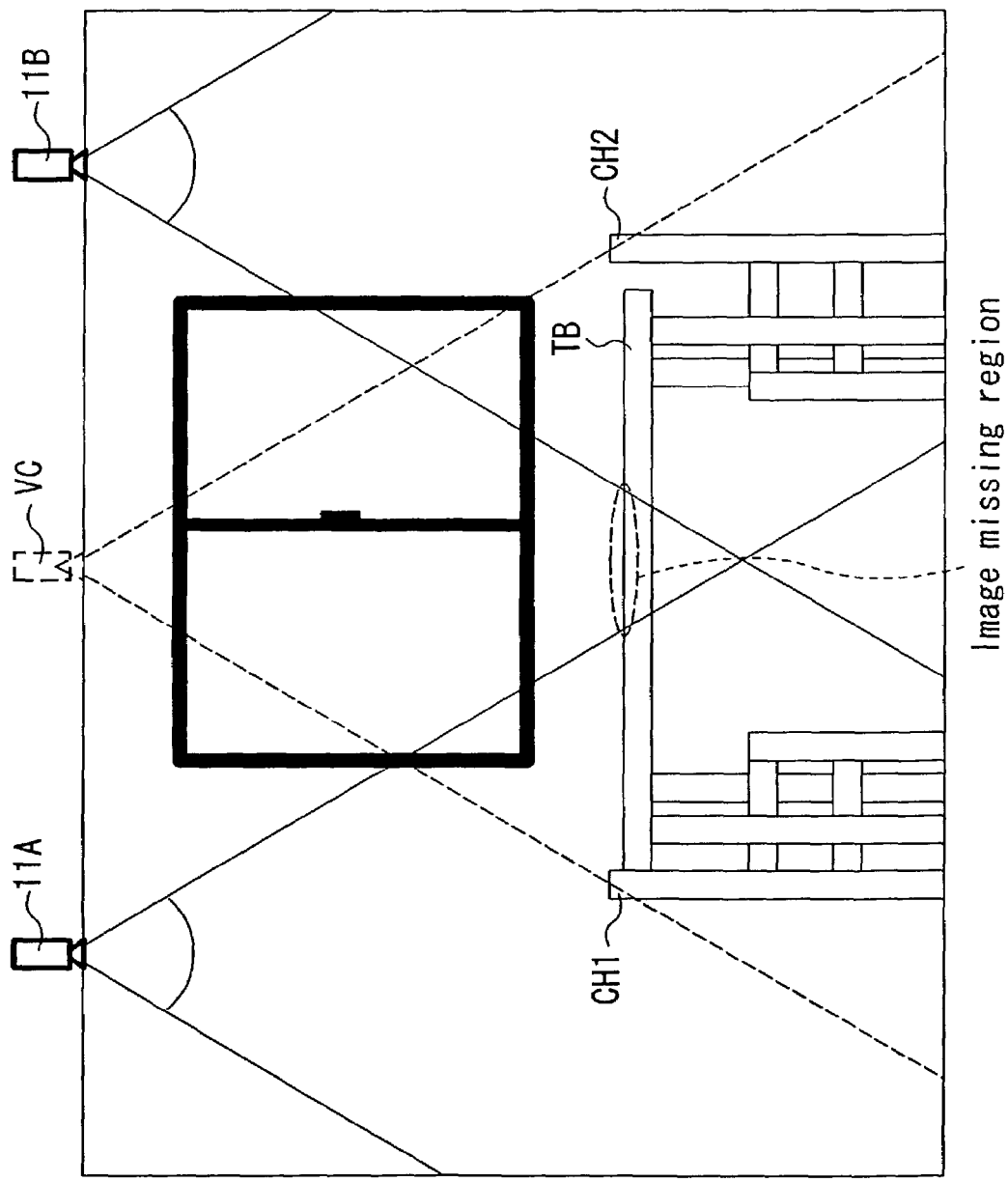

VEHICLE SURROUNDINGS DISPLAY DEVICE AND IMAGE PROVIDING SYSTEM

BACKGROUND OF THE INVENTION

The present invention relates to a vehicle surroundings display device for displaying the surroundings of a vehicle as an image, and more particularly, relates to a technology enabling the user to recognize the surroundings of a vehicle easily and accurately for safer driving operation.

In conventional general vehicle surroundings display devices, images of the surroundings of a vehicle are taken with one camera or several cameras, and the taken images are transformed so that the situation around the vehicle is shown by one image. For example, in Japanese Patent Publication No. 62-16073 (first prior art), a plurality of cameras are mounted on a car. Video outputs from the cameras are changed to coordinates in a plane coordinate system with the car positioned in the center, to be synthesized as one image so that the driver can recognize the situation around the car at a glance.

In Japanese Laid-Open Patent Publication No. 7-223488 (second prior art), in presentation of the surroundings of a vehicle to the user, objects in the surroundings are detected in advance, and a perspective display level is set for a basic image showing the surroundings of the vehicle. In addition, pictorial symbols as shown in FIG. 37 stored in a database are displayed for the respective objects with risk emphasizing information added thereto. With this display, the user can easily recognize the surroundings of the vehicle.

In the conventional vehicle surroundings display devices described above, when a viewpoint-transformed image is to be generated from image data obtained from a camera and the like using perspective transform, a plane for the perspective transform must be provided. In the first prior art, a road surface is used as the perspective projection plane on the assumption that no three-dimensional objects having a height component exist around a vehicle. This type of perspective transform using the road surface is called road surface projection. In this transform, however, if a three-dimensional object having a height component exists around a vehicle, discrepancy arises between the fact and the assumption, and a distortion is generated in the image obtained as a result of the road surface projection.

FIG. 38 illustrates an example of placement of eight cameras (cameras 0 to 8) on a vehicle 1 (hereinafter, a vehicle on which a camera is mounted is referred to as a user's vehicle) and examples of images taken with the cameras 0 to 8 (camera images). FIG. 39 is an image of the surroundings of the vehicle shown in FIG. 38. FIG. 40 is an image obtained by performing road surface projection using the eight camera images shown in FIG. 38. Note that since it is hardly possible to obtain an image of the user's vehicle 1 itself from the camera images shown in FIG. 38, an illustration of the user's vehicle 1 is fitted into the image shown in FIG. 40 for convenience.

As is found from comparing FIG. 40 with FIG. 39, the image of an object having a height component (for example, an adjacent vehicle 2) distorts greatly in the direction farther from the user's vehicle 1, and this makes the user consider that something exists in an area of the road in which actually nothing exists. This mismatch between the actual surroundings and the synthesized image may possibly cause misunderstanding by the user and thus may impair the user's safety driving.

To cancel the distortion of the image described above, a method using a distance-measuring sensor such as a laser radar may be employed. That is, for a three-dimensional object having a height component such neighboring vehicles, distance data may be previously obtained with a distance-measuring sensor, and perspective transform is performed using a three-dimensional profile determined from the obtained distance data as the projection plane.

By adopting this method, no image distortion is generated unlike the case of the road surface projection. However, this method still has a problem that a region concealed behind an object located closer to a camera (occlusion region) is formed.

For example, in FIG. 38, it is known from the images taken with the cameras 1 and 2 that a car is at a stop on the right side of the user's vehicle 1. However, no image of the right part of the car is taken with any of the cameras because the right part is concealed by the left part of the car. The right part therefore corresponds to an image missing region of a surroundings image of the user's vehicle in which no image data has been taken with the cameras. Therefore, even if all distance data is obtained for the surroundings, only the left part of the car of which camera images are available is shown in the resultant synthesized image because image synthesis fails for the right part of the car corresponding to the image missing region. In this type of system, cameras are generally mounted on a vehicle, and the number of cameras is limited due to restriction in cost and the like. Therefore, the above problem occurs for almost all three-dimensional objects in the surroundings of the vehicle.

FIG. 41 is a synthesized image obtained when distance data on the neighboring objects is all known. As is found from FIG. 41, while distance data on the vehicles existing around the user's vehicle 1 is all known for the sides thereof closer to the user's vehicle, the opposite sides of the vehicles farther from the user's vehicle belong to image missing regions. Therefore, for each vehicle, an image can be generated only for the user's vehicle side.

In the second prior art in which each object is represented by a pictorial symbol, the problem of displaying only part of an image is avoided. However, the user may feel the displayed image unnatural because the image is different from the object the user sees directly. Moreover, it is almost impossible for a pictorial symbol to indicate the accurate position of the object.

FIG. 42 is an illustration of a situation in which a vehicle 3 exists in a left-hand rear position with respect to the user's vehicle 1, viewed from above. Referring to FIG. 42, for safe parking operation, it is important to accurately recognize the position of an area AR1 of the vehicle 3 on the side closer to the user's vehicle 1.

FIG. 43 is an example of display of the situation shown in FIG. 42, in which the vehicle 3 is represented by a picture 3A smaller than the actual size of the vehicle. In this example, areas AR2 to AR4 are not shown for the user although actually these areas are part of the vehicle 3. In particular, the area AR2 relates to a border of the vehicle 3 closer to the user's vehicle, which is important during parking of the user's vehicle. This display is therefore inappropriate.

FIG. 44 is an example of display of the situation shown in FIG. 42, in which the vehicle 3 is represented by a picture 3B larger than the actual size of the vehicle. In this example, areas AR5 to AR7 are shown as if they are part of the vehicle 3 for the user although actually the vehicle 3 does not occupy these areas. In particular, the areas AR5 and AR7 relate to borders of the vehicle 3 closer to the user's vehicle, which is important during parking of the user's vehicle. This display is therefore inappropriate.

SUMMARY OF THE INVENTION

An object of the present invention is providing a vehicle surroundings display device capable of allowing the user to accurately recognize the position of a neighboring object that is important in driving operation and eliminating unnaturalness the user may feel due to failure of display of an image in an occlusion region.

Another object of the present invention is providing an image providing system capable of eliminating unnaturalness the user may feel for a region of a provided image in which image data from a camera is not available due to existence of an object.

The occlusion region as used herein refers to a region that is not viewed via any camera placed on the user's vehicle. During driving operation such as parking, it is important to display the position of the border of a neighboring object on the user's vehicle side. As for the occlusion region, it is considered that an accurate image in an accurate position is not necessarily required, but display to a degree of accuracy that the user does not feel unnaturalness is sufficient. To state specifically, in the example shown in FIG. 42, only the area AR1 of the vehicle 3 is visible from the user's vehicle. The other area of the 10 vehicle 3 is viewed neither via cameras nor directly by the eyes. However, this does not especially impair the driving operation.

On the contrary, a non-concealed region must be displayed in an accurate position. In addition, since the user sees both a displayed image of an object and the object directly during driving operation, the image displayed is preferably not so different from the actual object.

In view of the above, according to the present invention, in the "non-concealed region", the image is displayed in an accurate position, while in the "occlusion region", an image to a degree of accuracy that the user does not feel unnaturalness is sufficient.

The vehicle surroundings display device of the present invention includes: a camera for taking an image of the surroundings of a vehicle; obstacle detection means for detecting an obstacle in the surroundings of the vehicle; an image processor for generating a surroundings image representing the situation around the vehicle from the image taken with the camera; and image missing region detection means for detecting an image missing region in the surroundings image when the obstacle is detected by the obstacle detection means, the image missing region failing to obtain image data from the camera due to existence of the obstacle, wherein the image processor fills at least part of the image missing region with substitute image data when the image missing region is detected.

According to the invention described above, when an obstacle in the surroundings of a vehicle is detected by the obstacle detection means, an image missing region failing to obtain image data from the camera due to existence of the obstacle and the like is detected by the image missing region detection means. The image processor fills at least part of the image missing region with substitute image data. In the resultant surroundings image generated by the image processor, unnaturalness of the image missing region corresponding to the "occlusion region" described above is reduced by the filling with substitute image data, and camera image data is used for the portion other than the image missing region corresponding to the "non-concealed region". Therefore, the user does not feel unnaturalness for the surroundings image so much and can recognize the position of the obstacle in the surroundings of the vehicle accurately. Thus, safe driving operation is possible more reliably and comfortably than in the conventional case.

In the vehicle surroundings display device of the invention described above, preferably, the image missing region detection means includes object position detection means for detecting the position of a border of the obstacle on the vehicle side, and determines the image missing region using the detected border position.

The image processor preferably uses a border image including at least the border portion of the obstacle on the vehicle side for generation of the substitute image data. Thus, the border image including the border portion of the obstacle on the user's vehicle side is used for generation of substitute image data for filling of the image missing region. It is therefore possible to present to the user an image indicating the accurate border position of the obstacle on the user's vehicle side, which is important for driving operation.

Preferably, the image processor places the border image on the surroundings image so as to align with the border position detected by the obstacle position detection means, presumes a region occupied by the obstacle in the surroundings image by aligning with the border position, and generates the substitute image data by pixel interpolation using pixel data of the border image for a portion of the presumed obstacle region other than the border image. Thus, the border image is placed in the accurate border position, and an image of the portion of the obstacle other than the border image is generated by pixel interpolation using pixel data of the border image. This enables generation of a surroundings image in which the border position of the obstacle on the user's vehicle side, important for the user, is accurate and for which the user does not feel unnatural.

Preferably, when the obstacle is an axisymmetric object, the image processor assumes a symmetry axis of the obstacle in the surroundings image, inverts the border image with respect to the symmetry axis to provide an inverted border image, and generates an image between the border image and the inverted border image in the obstacle region by the pixel interpolation using pixel data of the border image. This enables generation of a synthesized image of an occlusion region free of unnaturalness by use of axisymmetry of the object such as a vehicle.

The vehicle surroundings display device of the invention described above may further includes an obstacle image database for storing image data of objects as candidates of obstacles, wherein the image processor determines the type of the detected obstacle, reads image data of the determined type of obstacle from the obstacle image database, places the read image data on the surroundings image to align with the border position detected by the obstacle position detection means as the substitute image data.

According to the invention described above, image data of objects as candidates of obstacles are held as a database, and image data of a determined type of obstacle is placed to align with the border position as substitute image data. Therefore, an image similar to an actual obstacle can be presented in an accurate position.

The image processor preferably determines the type of the obstacle based on the image from the camera.

Preferably, when the obstacle is a vehicle, the obstacle position detection means detects a contact position of a tire of the vehicle with the road surface in the image from the camera as the border position.

According to the invention described above, when the obstacle is a vehicle, the existence of a tire can be used to detect the accurate border position.

In the vehicle surroundings display device of the invention described above, preferably, when the obstacle is a vehicle, the obstacle position detection means detects a line of a plane including a number plate of the vehicle in contact with the road surface in the image from the camera as the border position.

Preferably, the image processor generates the surroundings image by performing virtual viewpoint transform based on the image from the camera.

The image providing system of the present invention includes: a camera for taking an image; detection means for detecting an object in an image-provided range; an image processor for generating a provided image showing the situation in the image-provided range from the image taken with the camera; and image missing region detection means for detecting an image missing region in the provided image when an object is detected by the detection means, the image missing region failing to obtain image data from the camera due to existence of the object, wherein the image processor fills at least part of the image missing region with substitute image data when the image missing region is detected.

According to the present invention, when an object is detected in the image-provided range, an image missing region failing to obtain image data from the camera due to existence of the object is detected by the image missing region detection means. The image processor fills at least part of the image missing region with substitute image data. In the resultant provided image generated by the image processor, unnaturalness of the image missing region is reduced by the filling with substitute image data, and camera image data is used for the portion other than the image missing region. Therefore, the user does not feel unnaturalness for the provided image so much and can recognize the situation in the image-provided range accurately.

In the image providing system of the invention described above, preferably, the camera takes an image of the surroundings of a vehicle.

Preferably, the camera takes an image of the inside or surroundings of a building.

BRIEF DESCRIPTION OF THE DRAWINGS

FIGS. 7A and 7B are views showing a situation in which a vehicle as an obstacle exists on one side of the user's vehicle.

FIG. 13 is a diagrammatic view of a surroundings image generated in Embodiment 2 of the present invention.

FIG. 15 is a diagrammatic view of a surroundings image generated in Embodiment 2 of the present invention.

FIG. 18 is a diagrammatic view of a synthesized image obtained when a neighboring vehicle is in the rear of the user's vehicle.

FIG. 20 is a diagrammatic view of a surroundings image generated in Embodiment 2 of the present invention.

FIG. 25 shows an example of car model data stored in an obstacle image database.

FIGS. 52A and 52B are views conceptually showing the result of fitting of a virtual obstacle shape, viewed from a side.

FIGS. 53A and 53B are views conceptually showing the result of the fitting of the virtual obstacle shape, viewed from above.

FIG. 54 is a conceptual view of an indoor monitoring system.

DESCRIPTION OF THE PREFERRED EMBODIMENTS

Hereinafter, preferred embodiments of the present invention will be described with reference to the accompanying drawings.

First, the relationship between the occlusion region and the image missing region as used herein will be described.

FIGS. 45A and 45B show a situation in which a vehicle 2 is at a stop in the rear of a user's vehicle 1, viewed from a side and from above, respectively. A camera 11 is mounted on the user's vehicle 1 for taking images in the rear. Using images taken with the camera 11, a synthesized image viewed via a virtual camera VC is generated. The line RS denotes a road surface. As is found from FIG. 45A, due to existence of the vehicle 2, an occlusion region concealed by the front portion of the vehicle 2 is generated.

For generation of a synthesized image viewed via the virtual camera VC, images of portions of the vehicle 2 corresponding to the occlusion region (the bonnet, windshield and roof of the vehicle 2) must be displayed. However, no image data is provided from the camera 11 for these portions, which therefore constitute an image missing region. As in this example, a region for which no image data is available from any camera due to existence of an object or an obstacle, such as the vehicle 2, constitutes an image missing region in an image to be displayed. Note that the image missing region also includes a portion that is originally outside the field of view of the camera, for which no image data is available naturally.

Embodiment 1

Figure 1:
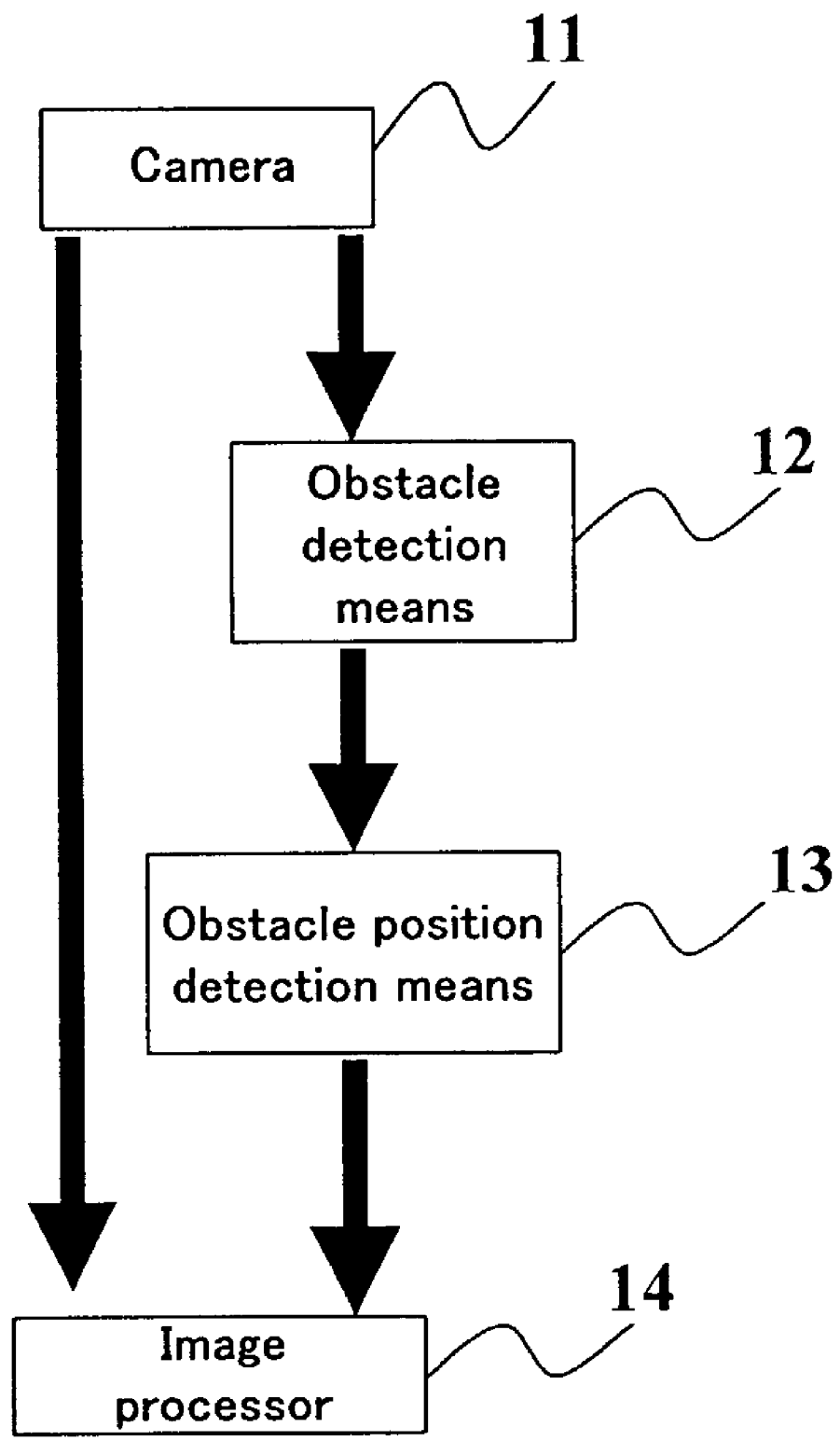
FIG. 1 is a block diagram of a basic configuration of vehicle surroundings display devices of Embodiments 1 and 2 of the present invention.

FIG. 1 conceptually shows a basic configuration of a vehicle surroundings display device of Embodiment 1 of the present invention. The vehicle surroundings display device of FIG. 1 includes, as a basic configuration: a camera 11 for taking images of the surroundings of a vehicle; an obstacle detection means 12 for detecting an obstacle in the surroundings of the vehicle; an obstacle position detection means 13 for detecting the position of the border of the obstacle on the vehicle side; and an image processor 14 receiving the images taken with the camera 11 (camera images) for generating an image showing the situation around the vehicle from the received camera images.

The camera 11 is typically mounted on the vehicle for taking images of the situation around the vehicle. Cameras placed somewhere in infrastructures such as roads, signals and buildings may also be used. Otherwise, images taken with cameras mounted on other vehicles around the user's vehicle, if any, may be received and used together with the images taken with the camera 11 or independently.

The obstacle detection means 12 detects an obstacle in the surroundings of the vehicle, by any of the following methods, for example. In one method, the color of the road surface is extracted from images taken with the camera 11. In another method, a region having a height component is extracted by a technique of stereo vision or the like utilizing parallax obtained from a plurality of images, to detect this region as an obstacle region. Alternatively, various active sensings for obstacle detection using laser, ultrasonic, ultraviolet, extremely high frequency (EHF) and the like may be used.

Detection of an obstacle region by extracting the color of the road surface will be described. Assuming that a camera faces in a downwardly slanted direction with respect to the horizontal direction, the road surface presumably occupies the broadest region of a camera image. It is therefore possible to determine a typical color of the road surface by preparing a histogram of colors of the image and extracting the color having the highest frequency. In general, the color of a paved road surface is gray that is the color of asphalt, while the color of an unpaved road surface is brown. Therefore, the region other than the road surface, that is, an obstacle region can be determined by finding a region having a color greatly different from the extracted typical color.

An example of the method utilizing parallax obtained from a plurality of images is described in Massimo et al., "Performance Analysis of a Low-Cost Solution to Vision-Based Obstacle Detection", International Conference on Intelligent Transportation Systems, pp. 350–355 (Literature 1).

The obstacle position detection means 13 detects the position of the border of the obstacle region detected by the obstacle detection means 12 on the user's vehicle side, that is, the position of the boundary of the obstacle closest to the user's vehicle. This detection can be realized by performing raster scanning with an active sensing in the direction horizontal to the side face of the user's vehicle, or by a method using a range finder as follows. First, scanning is performed with a range finder in the direction vertical to the road surface. A position closest to the user's vehicle is determined from distances measured by the vertical scanning. The vertical scanning is repeated for the detected obstacle over a horizontal fan-shaped area, and the positions closest to the user's vehicle determined by the scans are connected as a line in the horizontal direction. This line is determined as the border of the obstacle on the user's vehicle side.

Figure 2:
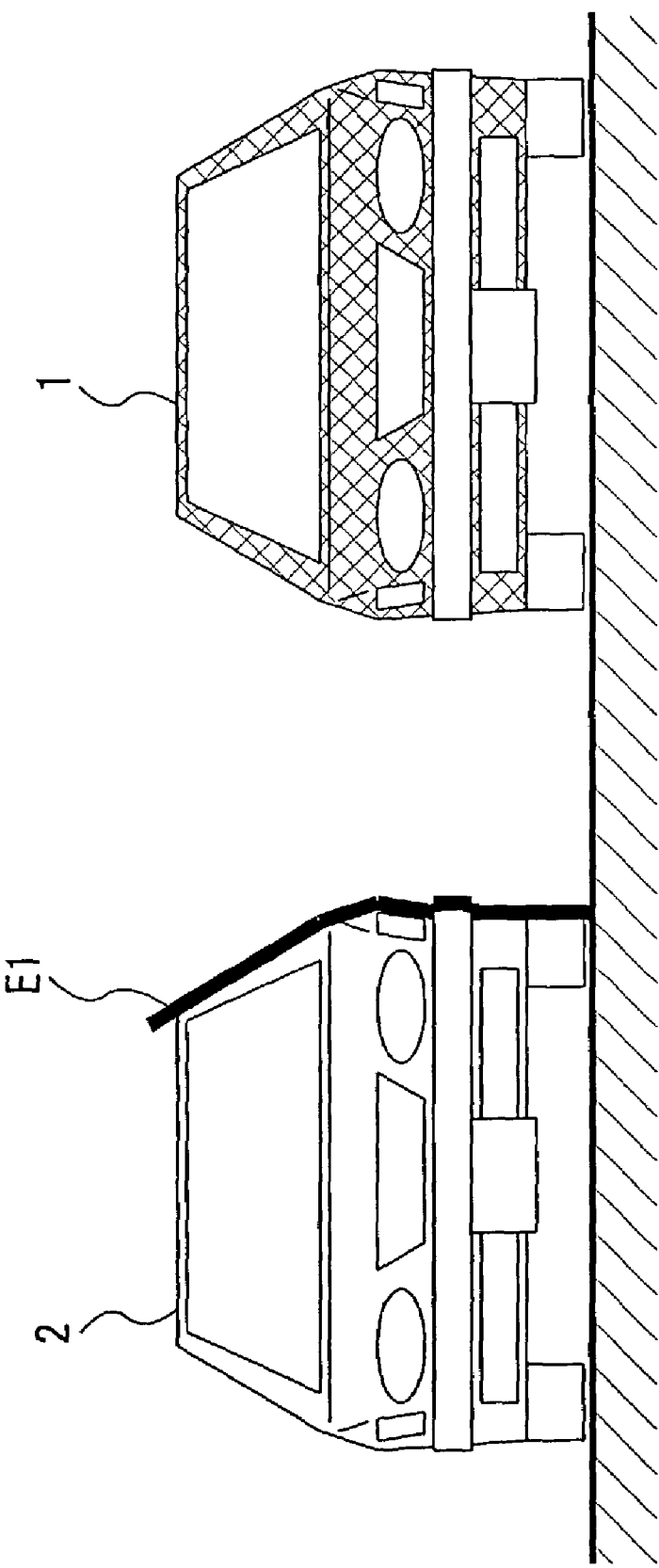
FIG. 2 is a view illustrating a border of an obstacle on the user's vehicle side.

FIG. 2 is a view showing a situation in which a vehicle 2 is at a stop on one side of a user's vehicle 1. A side profile E1 as the border of the vehicle 2 on the side closer to the user's vehicle 1 can be determined by scanning with an active sensing as the obstacle position detection means 13.

The problem of an occlusion region described earlier in relation with the prior art problems arises in the above detection. That is, it is extremely difficult to take images of an obstacle in the surroundings of the user's vehicle without any part of the obstacle being concealed, with cameras mounted on the user's vehicle or even with cameras placed in infrastructures in addition to the cameras on the user's vehicle. This is because obstacles have a variety of shapes and the positions of obstacles vary with time and circumstance. An enormous number of cameras are therefore required to take images of an obstacle without any part concealed at any time. This is economically disadvantageous. In an indoor parking space, for example, it may be possible to place a camera at a position above a vehicle and provide an image of the vehicle taken with the camera to the user. However, in this case, also, since the camera is not always positioned right above a vehicle, an occlusion region is still generated.

Therefore, although an obstacle region is determined by the obstacle detection means 12, the resultant surroundings image presented to the user inevitably includes an image missing region due to existence of an occlusion region. The resultant image is considerably unnatural as a whole.

In this embodiment, to solve the above problem, when an obstacle is detected by the obstacle detection means 12, the obstacle position detection means 13 detects the position of the border of the obstacle on the user's vehicle side, and the image processor 14 determines an image missing region using the detected border position and fills at least part of the image missing region with substitute image data, to generate a surroundings image for which the user does not feel unnaturalness. The obstacle position detection means 13 and the means for determining the image missing region constitute an image missing region detection means.

Specifically, first, road surface projection or perspective projection transform is performed for the portion of an image other than an obstacle region detected by the obstacle detection means 12 to generate a vehicle surroundings image. Thereafter, an image of the obstacle region detected by the obstacle detection means 12 is processed, re-synthesizing to eliminate unnaturalness, and the resultant image is placed on the vehicle surroundings image so that the border position detected by the obstacle position detection means 13 is located accurately, to thereby complete the vehicle surroundings image. The resultant vehicle surroundings image is displayed on a display device such as a liquid crystal display and a head-mounted display to be presented to the user.

An important point in the above processing is to position the border of the obstacle on the user's vehicle side accurately when the image of the obstacle region is placed on the vehicle surroundings image. This is because, if the obstacle is displayed in the vehicle surroundings image in a position farther than the actual position with respect to the user's vehicle, the user's vehicle may possibly come into contact with the obstacle. The obstacle position detection means 13 therefore plays an importance role to avoid this problem.

<First Example>

One of major problems that may occur when a displayed image has a blank region is that the user may pay attention to this region and as a result neglect the attention to the road surface region that is actually required during driving. In view of this, in this example, the image processor 14 fills in the obstacle region with a background color such as black, not displaying an image. In other words, the user is presented with a vehicle surroundings image including only the road surface region displayed.

Note however that the border of the obstacle on the user's vehicle side is displayed in the image accurately at the position obtained by the obstacle position detection means 13. Therefore, the possibility of contact of the user's vehicle with the obstacle is avoided. The border of the obstacle on the side opposite to the user's vehicle side is in an occlusion region. However, since this region is not so important for driving operation as described above, filling-in of this region with a background color will not cause a problem.

Figure 3:
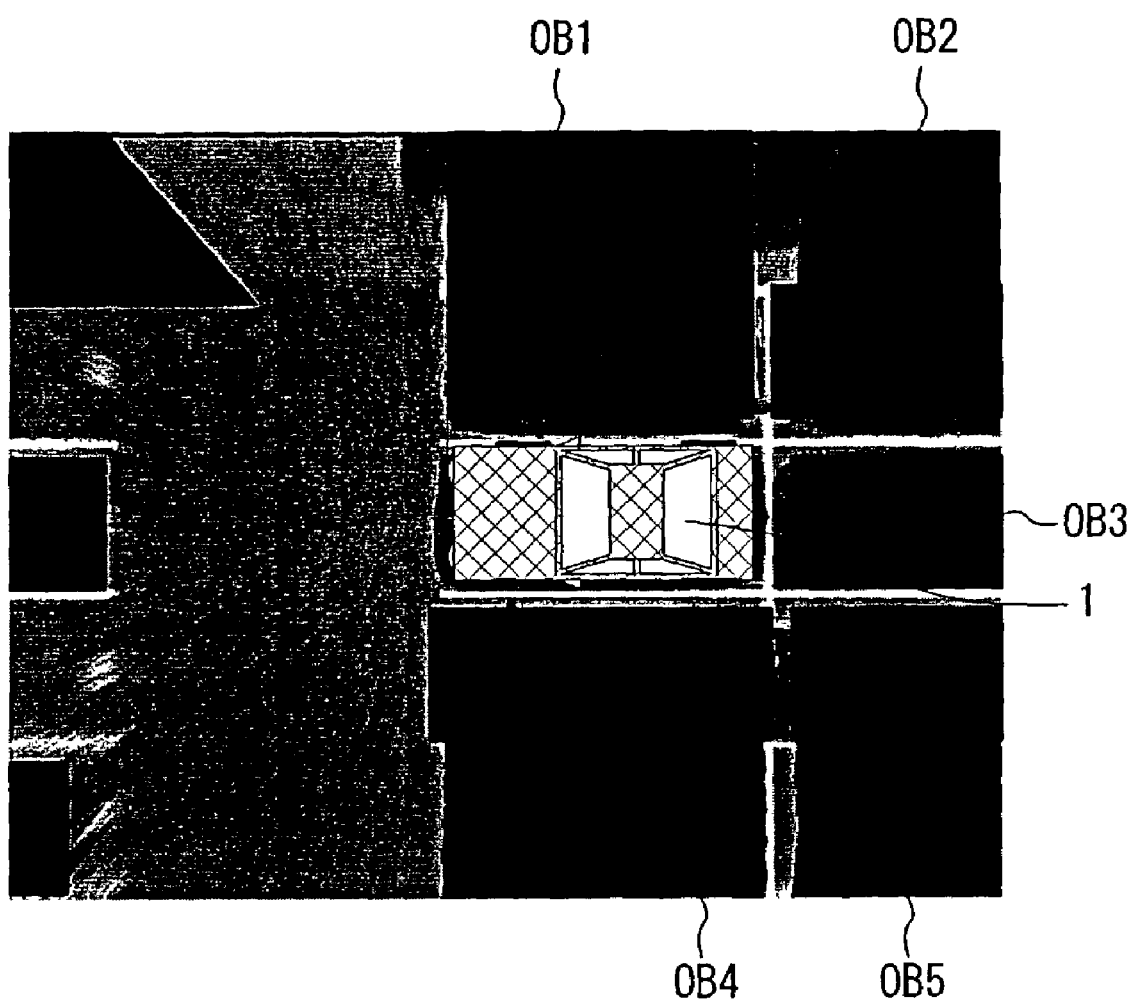
FIG. 3 is a first example of a synthesized image obtained in Embodiment 1 of the present invention.

FIG. 3 shows an example of an image obtained by performing the processing described above for the synthesized image of FIG. 41, in which obstacle regions OB1 to OB5 in the surroundings of the user's vehicle 1 are filled in with black. In FIG. 3, with no images displayed for the obstacle regions OB1 to OB5, the user is urged to confirm the regions directly by the eyes, and this prevents occurrence of a problem caused by mismatch between a distorted synthesized image and the actual surroundings. A range a little wider than the actual obstacle region may be filled in considering a possible error in detection. In place of filling in with a background color, the region may be more degraded in precision or masked with the degree of precision of detection that the region is outside the road surface, to thereby prevent this region from attracting the attention of the user.

Figure 38:
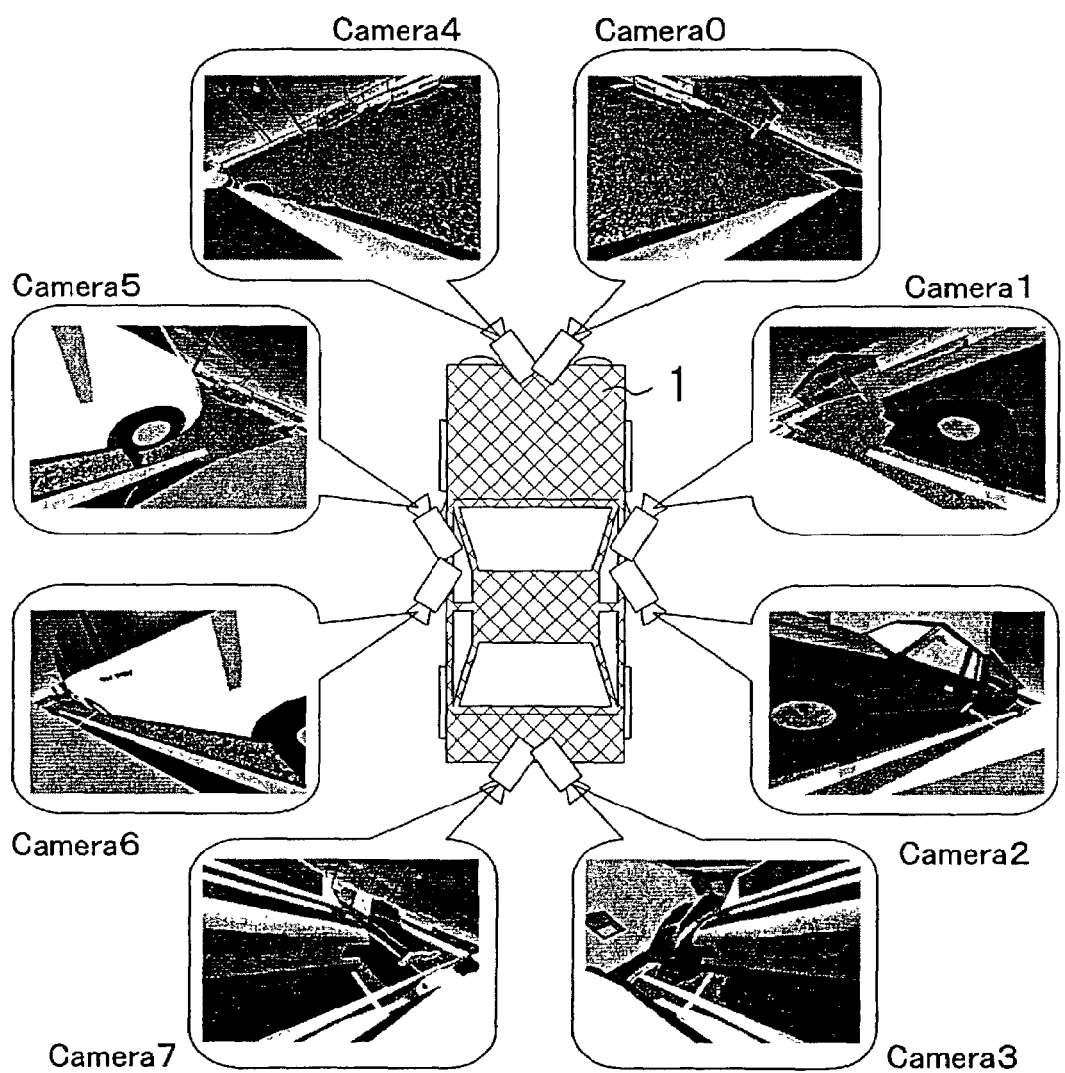
FIG. 38 shows an example of placement of cameras together with examples of images taken with the cameras in the embodiments of the present invention.
Figure 39:
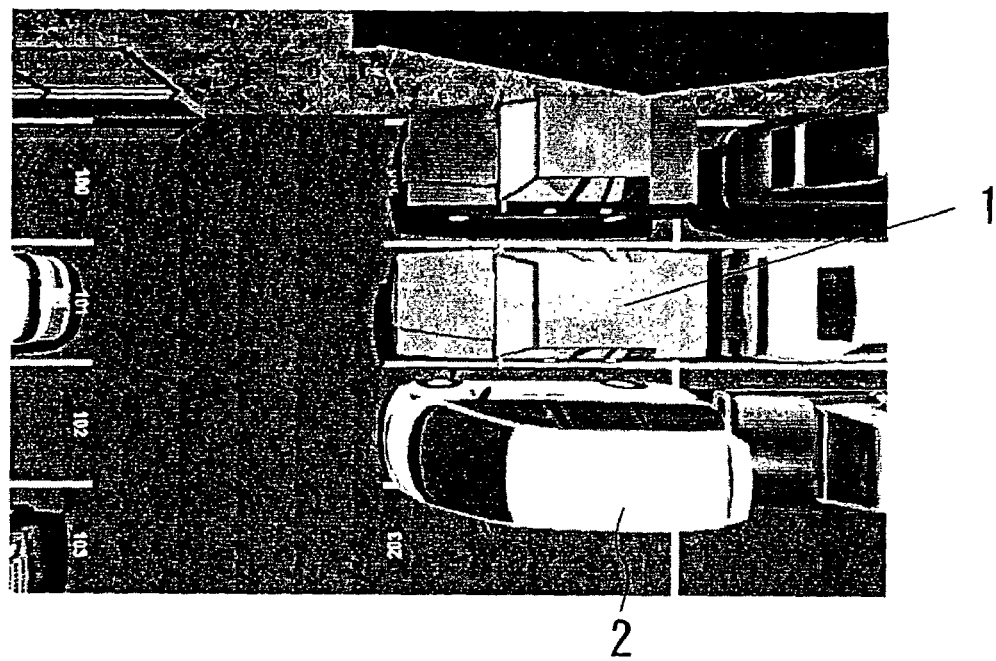
FIG. 39 is a view of the surroundings of the vehicle shown in FIG. 38.
Figure 40:
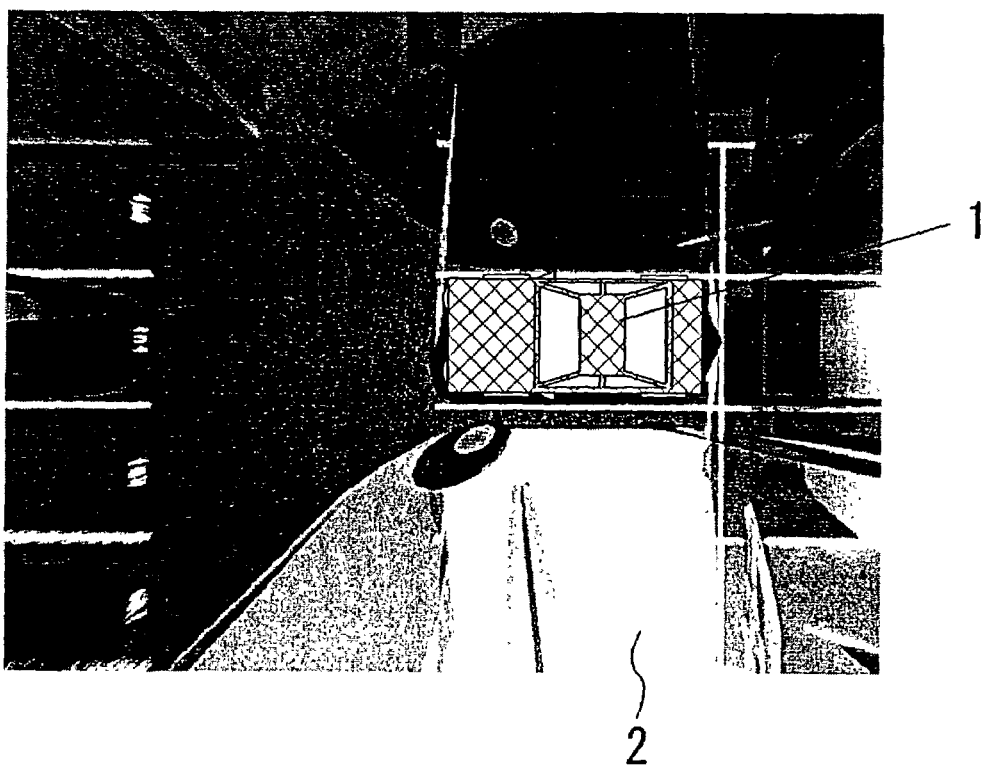
FIG. 40 is an example of a synthesized image obtained by road surface projection.

In FIG. 3, although the image of the user's vehicle 1 is hardly obtained from the camera images shown in FIG. 38, the position of the user's vehicle 1 is very important to recognize the positional relationship between the user's vehicle and the neighboring obstacles. Therefore, an illustration of the user's vehicle 1 is pasted to the position of the user's vehicle 1. Alternatively, an image of the actual user's vehicle 1 may be stored in advance and pasted.

<Second Example>

The size of an obstacle may be detected by the obstacle detection means 12, and a simple rectangle or a box-like three-dimensional object corresponding to this size may be superimposed on the obstacle region. This may call the user's attention to this region and urge the user to confirm the region directly by the eyes.

Figure 4:
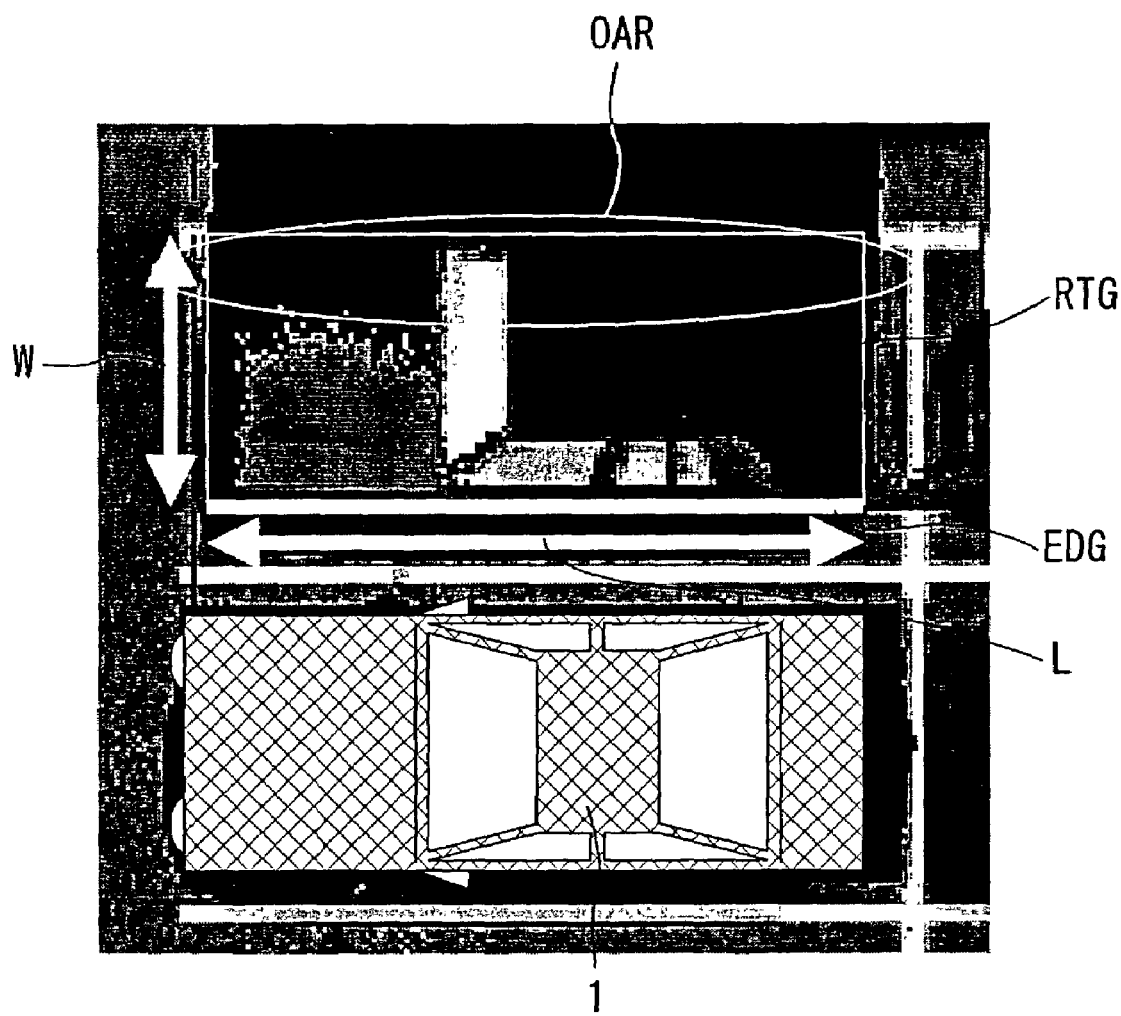
FIG. 4 is an enlarged view of a synthesized image by perspective projection transform, for illustrating generation of a second example in Embodiment 1.
Figure 41:
FIG. 41 is an example of a synthesized image obtained by perspective projection transform using distance data.
Figure 42:
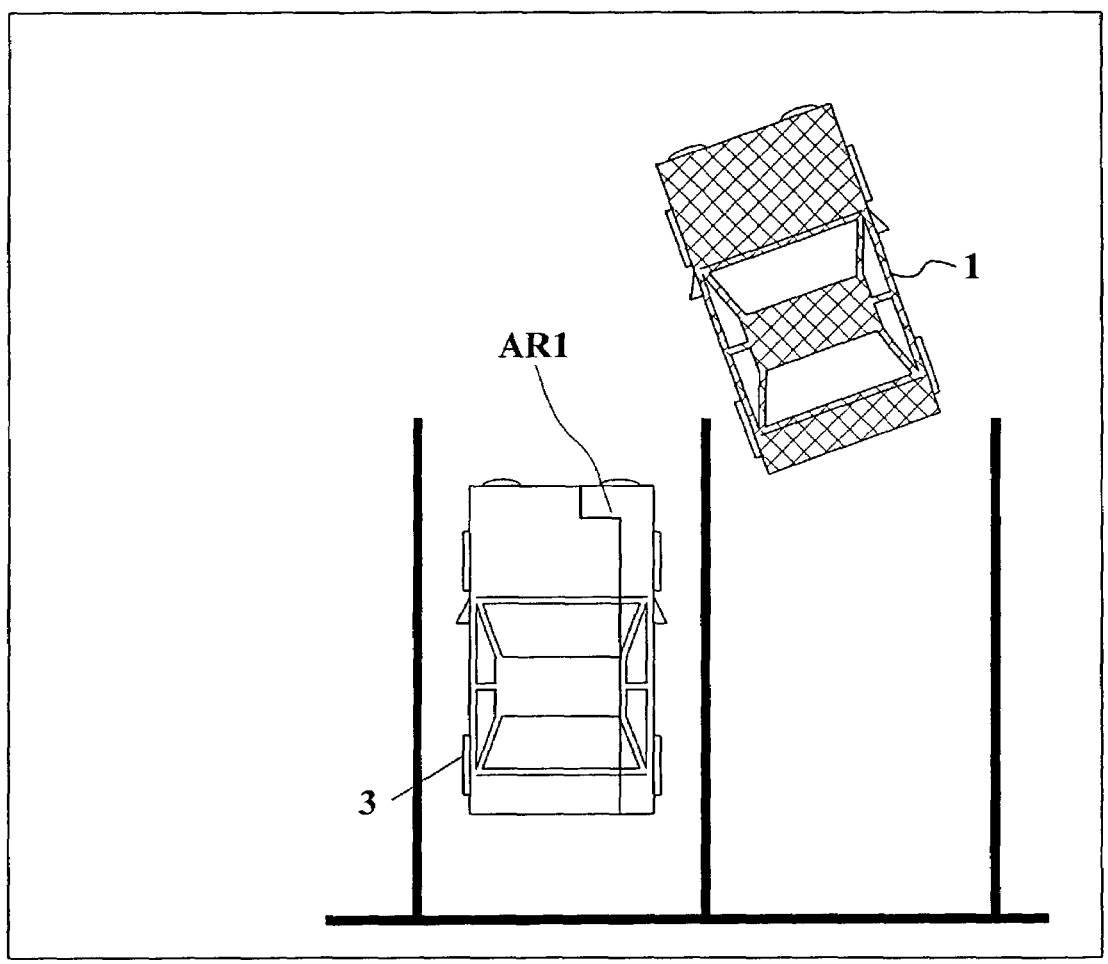
FIG. 42 is an illustration of a situation in which a vehicle exists in a left-hand rear position with respect to the user's vehicle, viewed from above.
Figure 43:
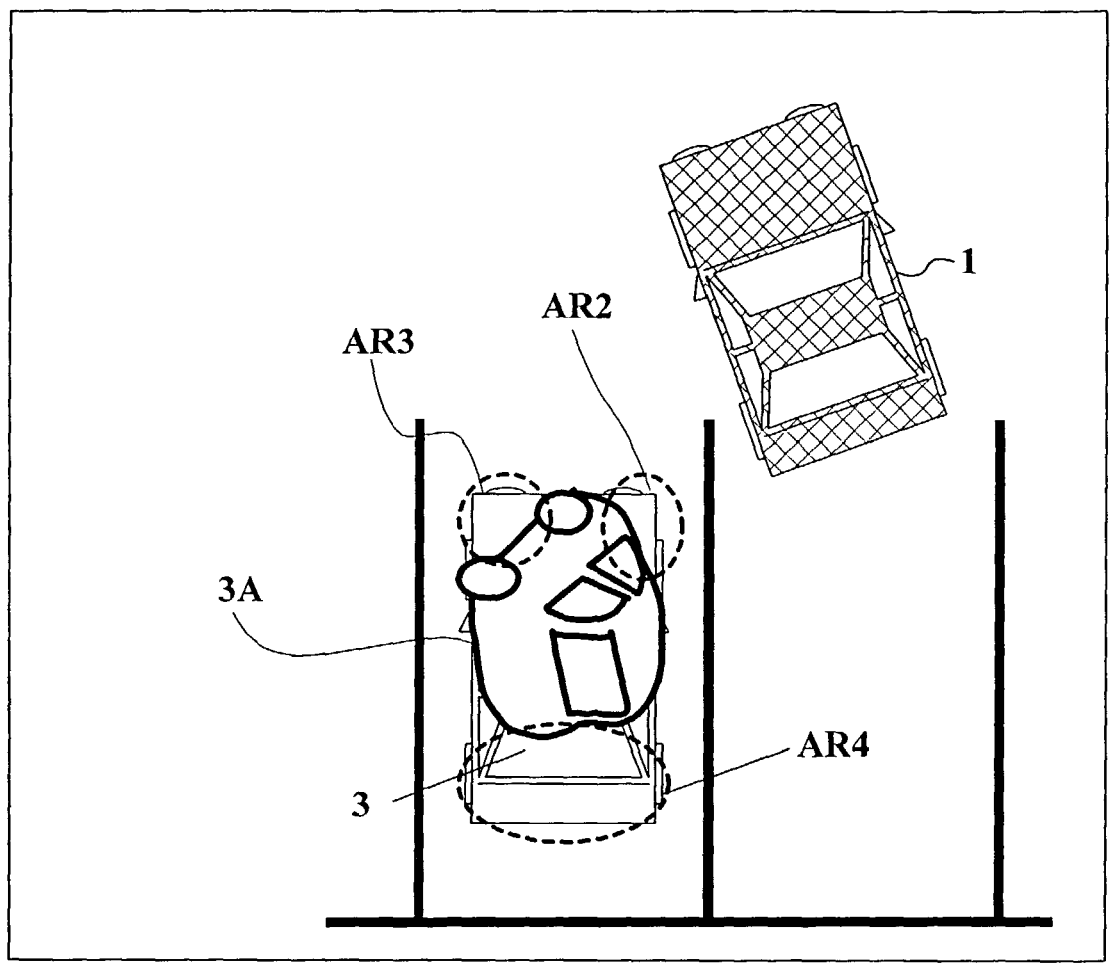
FIG. 43 is an example of display of the situation shown in FIG. 42, in which a picture smaller than the actual vehicle is displayed.
Figure 44:
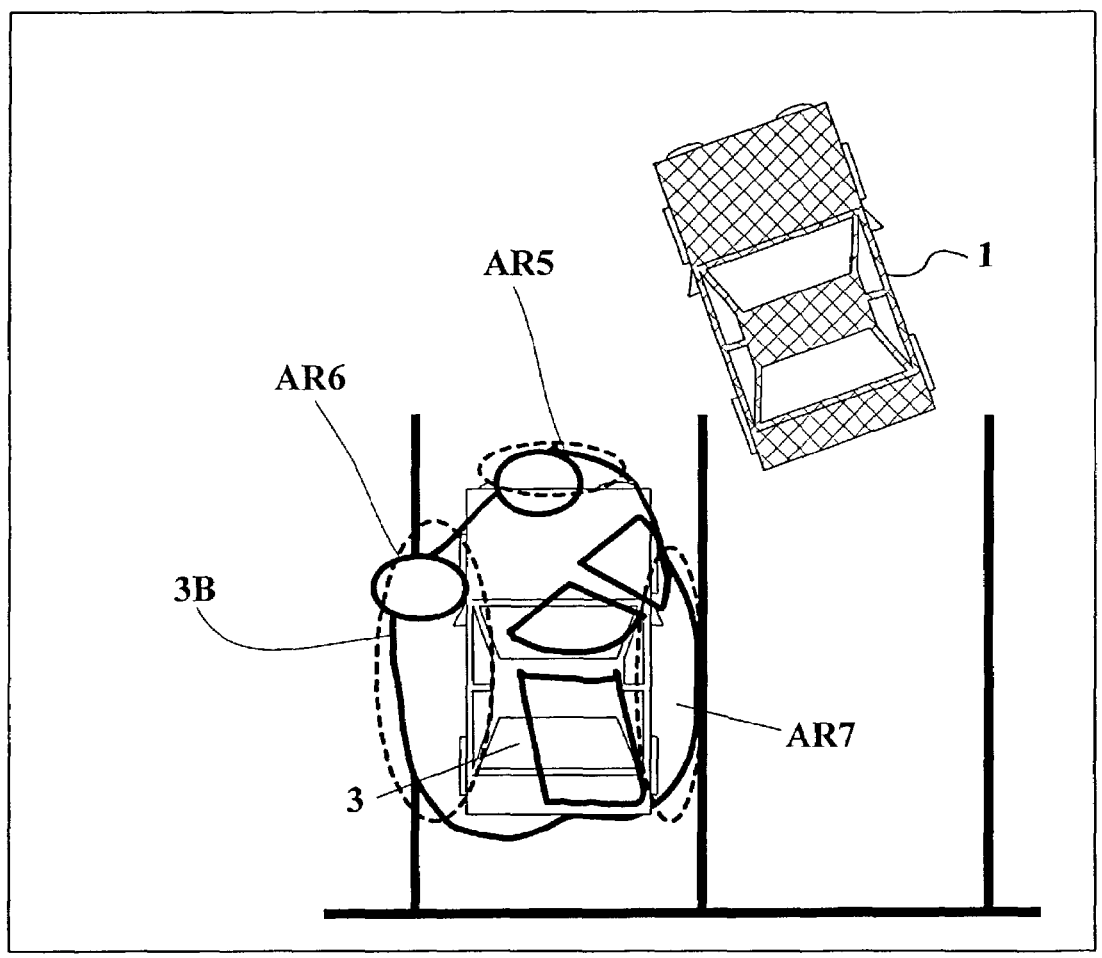
FIG. 44 is another example of display of the situation shown in FIG. 42, in which a picture larger than the actual vehicle is displayed.

FIG. 4 is an enlarged view of an area near the user's vehicle 1 in FIG. 41. The length L of a border EDG of a neighboring obstacle on the user's vehicle side shown in FIG. 4 can be determined by the obstacle detection means 12. Therefore, a rectangle RTG having a side of length L is generated and superimposed on the obstacle region so that the side aligns with the border EDG. The length W of the other side of the rectangle RTG vertical to the L-long side may be arbitrarily determined. In the illustrated example, the length W is simply a half of the length L. A region OAR of the obstacle on the side opposite to the user's vehicle side is not important so much for the user, and thus the effect is considered small if a displacement occurs between the synthesized image and the actual obstacle in this region. The length W can also be determined from the tilt of the side profile of the obstacle obtained by the obstacle position detection means 13. This is based on the assumption that the length W is longer with respect to the length L as the tilt of the side profile of the obstacle is slower with respect to the length L.

Figure 5:
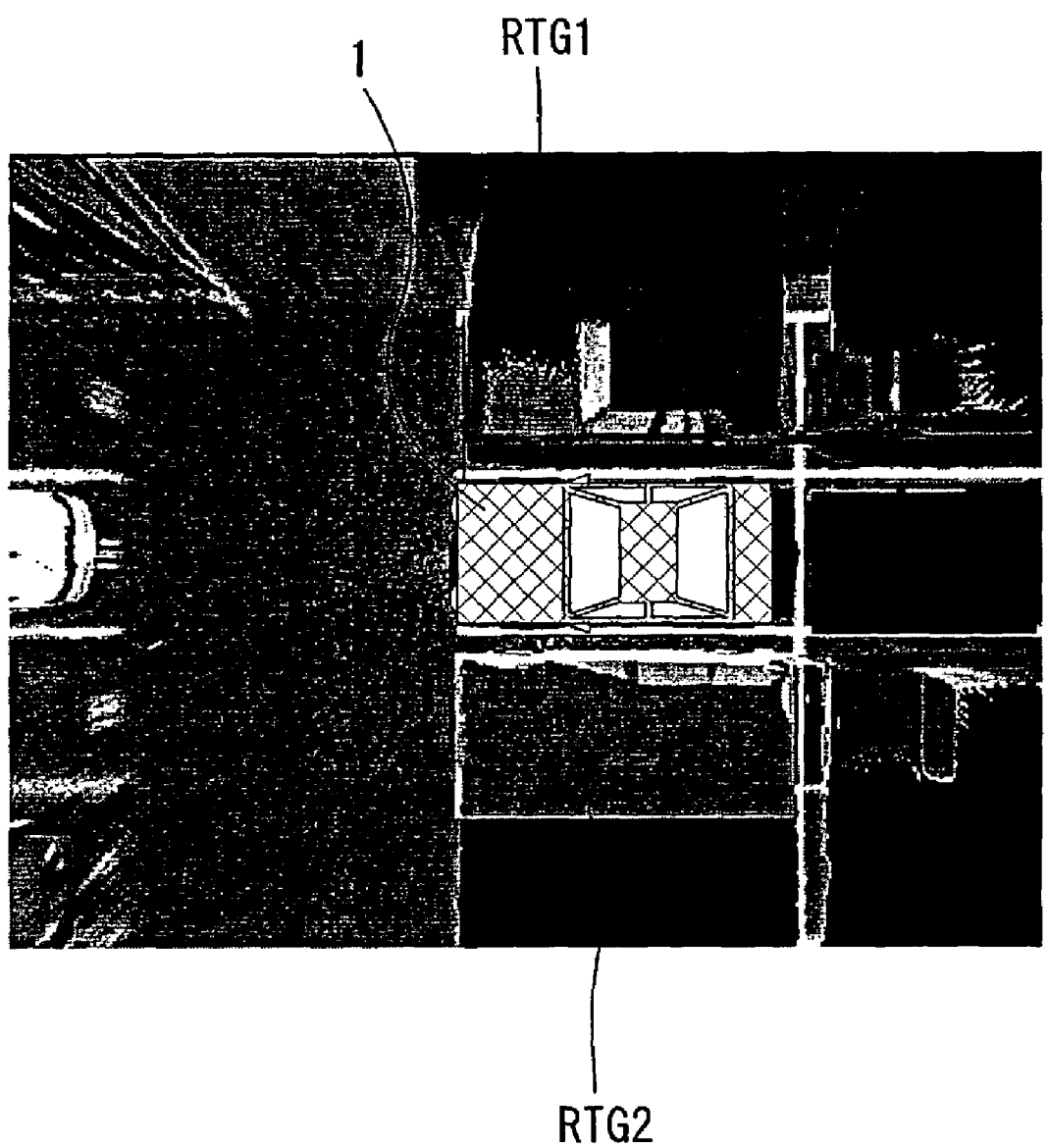
FIG. 5 is the second example of a synthesized image obtained in Embodiment 1 of the present invention.

FIG. 5 shows an example of an image obtained by performing the processing described above for the synthesized image of FIG. 4I, in which rectangles RTG1 and RTG2 are generated for the obstacle regions.

The color of the rectangles may be a typical color of obstacles, or may be a color attracting the user's attention. In place of the rectangles, three-dimensional objects such as rectangular parallelepipeds may be displayed. Otherwise, if the border EDG is a curve, an oval object having a line extending along this curve may be superimposed on the obstacle region. Moreover, an illustration and a word may be superimposed on the region for attracting attention.

<Third Example>

Figure 6:
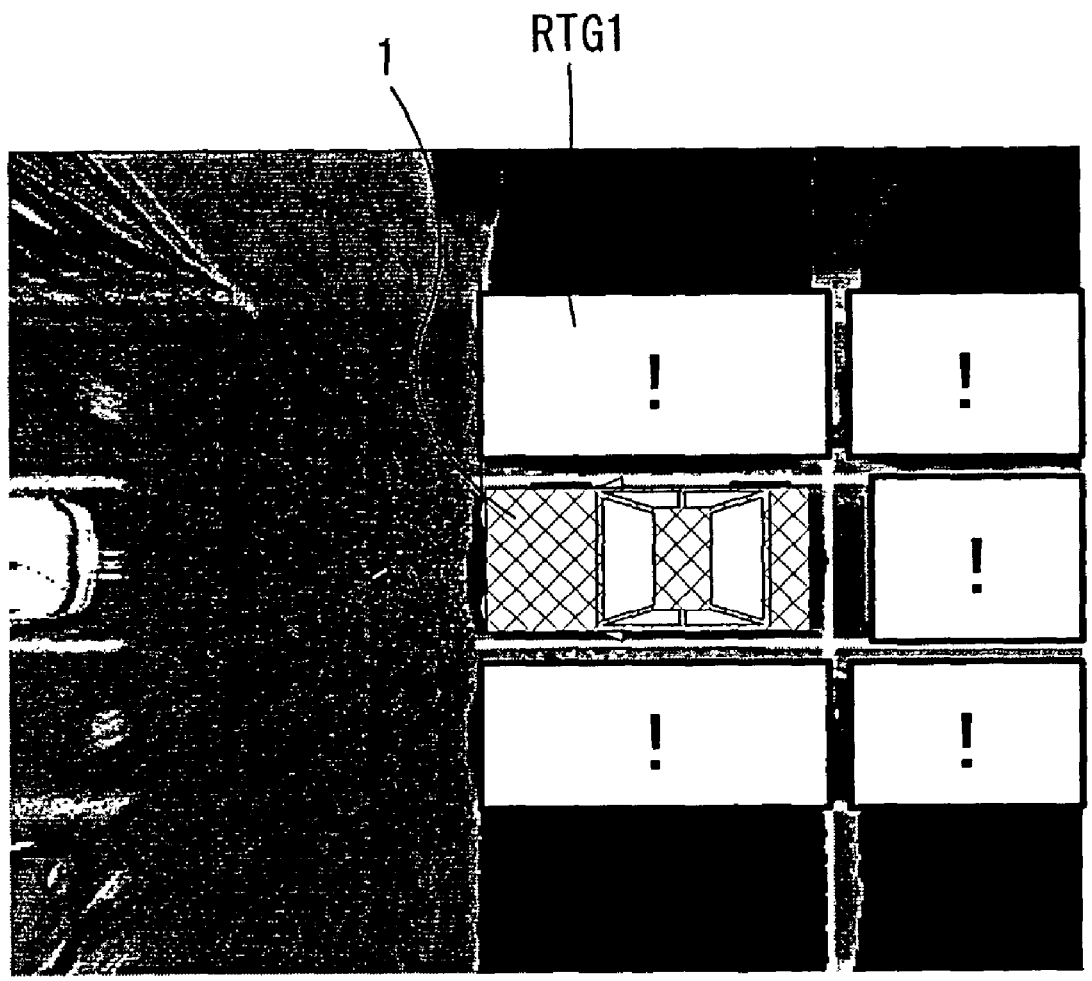
FIG. 6 is a third example of a synthesized image obtained in Embodiment 1 of the present invention.

FIG. 6 shows an example of an image in which each obstacle region is represented by a rectangle RTG1 and a code is superimposed on the region. In FIG. 6, the code "!" is superimposed to call the user's attention. The border of the rectangle on the user's vehicle side is displayed accurately in the position of the neighboring obstacle obtained by the obstacle position detection means 13. This prevents the user's vehicle from coming into contact with the neighboring obstacle unlike the second prior art in which an illustration is simply pasted. Another code, a word or an illustration helpful in calling the user's attention may be used in place of "!".

Embodiment 2

The vehicle surroundings display device of Embodiment 2 of the present invention has a basic configuration as shown in FIG. 1, as in Embodiment 1, that is, has the camera 11, the obstacle detection means 12, the obstacle position detection means 13 and the image processor 14 as main components.

This embodiment is different from Embodiment 1 in the function of the image processor 14. In this embodiment, when an obstacle is detected by the obstacle detection means 12, the image processor 14 uses a border image including at least a border portion of the obstacle on the user's vehicle side detected by the obstacle position detection means 13 to generate substitute image data for filling an image missing region, and displays the substitute image data in an accurate position so that the user does not feel unnaturalness for the resultant image.

In many cases, obstacles in the surroundings of a vehicle are roughly axisymmetric as cars are. In the following example, the axisymmetry is used for generation of an image of an obstacle region as substitute image data.

FIG. 7A is a diagrammatic view of an image of the user's vehicle 1 and a vehicle 2 existing on the right of the user's vehicle 1, viewed from above the user's vehicle 1. FIG. 7B is a diagrammatic view showing an image 2A of the vehicle 2 taken with the camera 11 mounted on the user's vehicle 1, together with the positional relationship between the user's vehicle 1 and the vehicle 2, in the situation shown in FIG. 7A.

Figure 8:
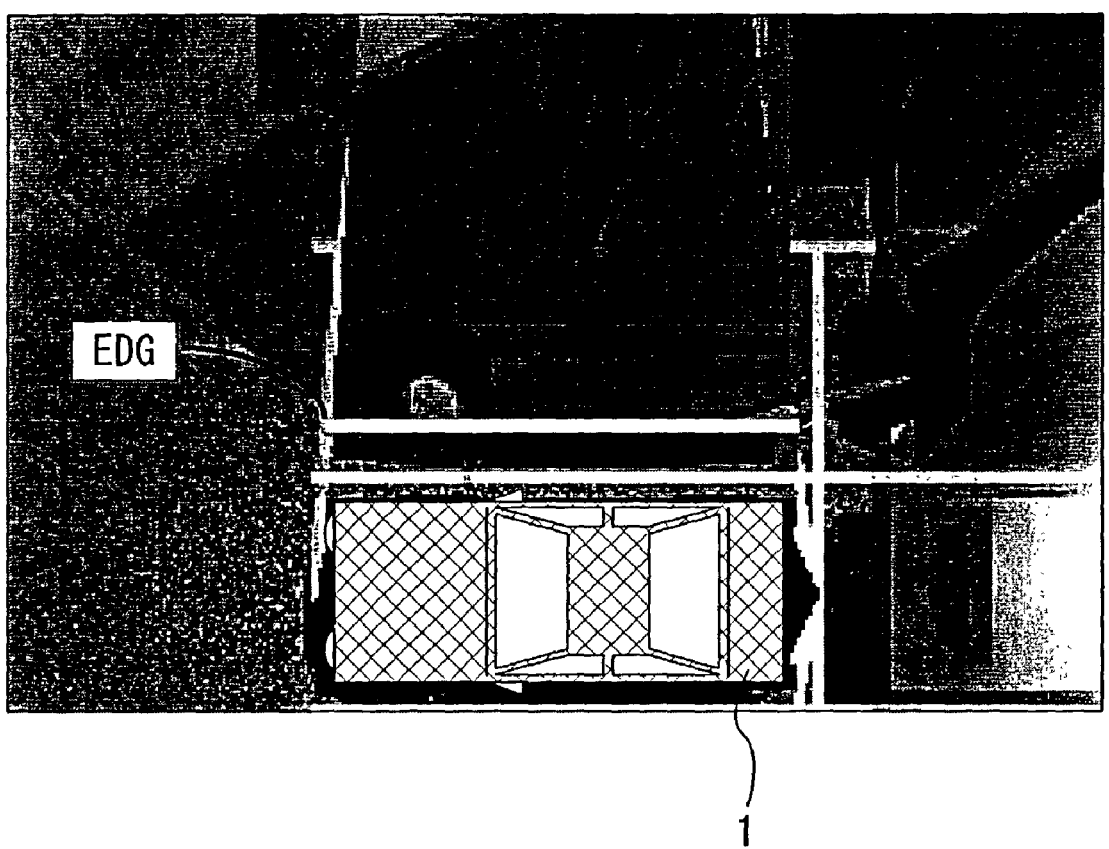
FIG. 8 is an image generated by road surface projection in the situation shown in FIGS. 7A and 7B.

FIG. 8 is a synthesized image generated by the road surface projection described in Japanese Patent Application No. 2000-613188 in the situation shown in FIG. 7A. FIG. 8 shows a border EDG of the vehicle 2 on the user's vehicle side determined by the obstacle position detection means 13. As described earlier in relation with the prior art problems, in the road surface projection, in which projection is performed on the assumption that all objects in an image are in the plane of the road surface, the image of the vehicle 2 having a height component is distorted and the projected position greatly differs from the actual position, as shown in FIG. 8. Therefore, a problem in this embodiment is how an image of the vehicle 2 should be superposed so as to align with the border EDG.

<First Example>

Figure 9:
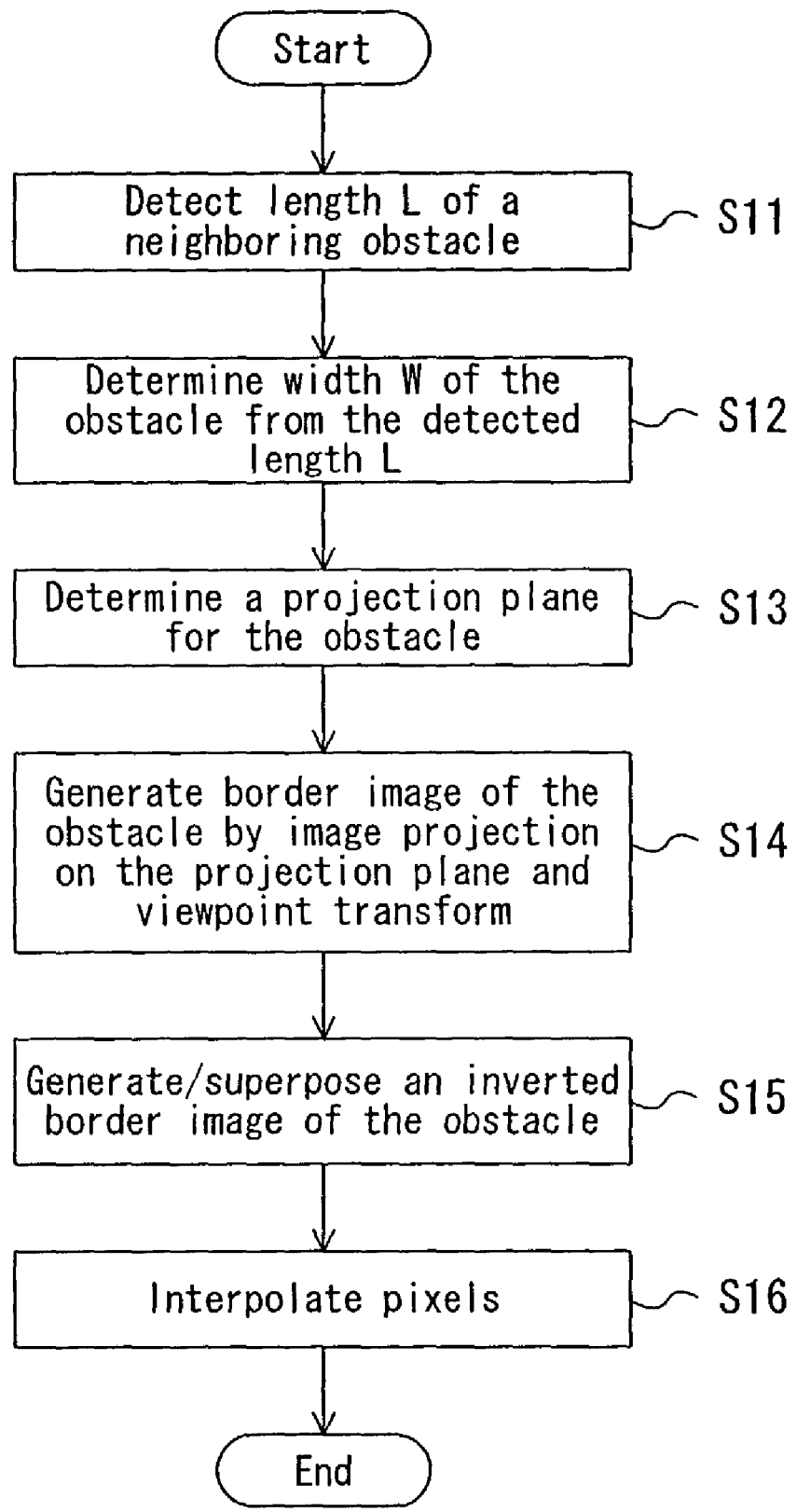
FIG. 9 is a flowchart of image synthesis using an inverted border image by an image processor in Embodiment 2 of the present invention.

FIG. 9 is a flowchart of operation of the image processor 14 in the first example of this embodiment.

In step S11, the position of the border of an obstacle on the user's vehicle side and the length L of the border are determined by the obstacle detection means 12 and the obstacle position detection means 13. Assume herein that the border of the obstacle on the user's vehicle side is a straight line, that is, the obstacle or the vehicle existing on a side of the user's vehicle is viewed right from the side.

In step S12, the length W of the obstacle in the depth direction (orthogonal to the border of the obstacle) is arbitrarily determined. In this example, the length W is assumed to be a half of the length L. As described above, while the position of the border on the user's vehicle side is an important part of the obstacle, the length orthogonal to the border is not so important for the user and thus the effect is considered small if a displacement occurs between the actual obstacle and the synthesized image.

In step S13, a side profile (E1 in FIG. 2, for example) of the detected obstacle is determined by the obstacle position detection means 13, to be used as a projection plane for the neighboring obstacle.

In step S14, an obstacle image taken with the camera 11 is projected on the projection plane, and then viewpoint transform is performed to obtain a projected image of part of the obstacle, that is, a border image.

Figure 10:
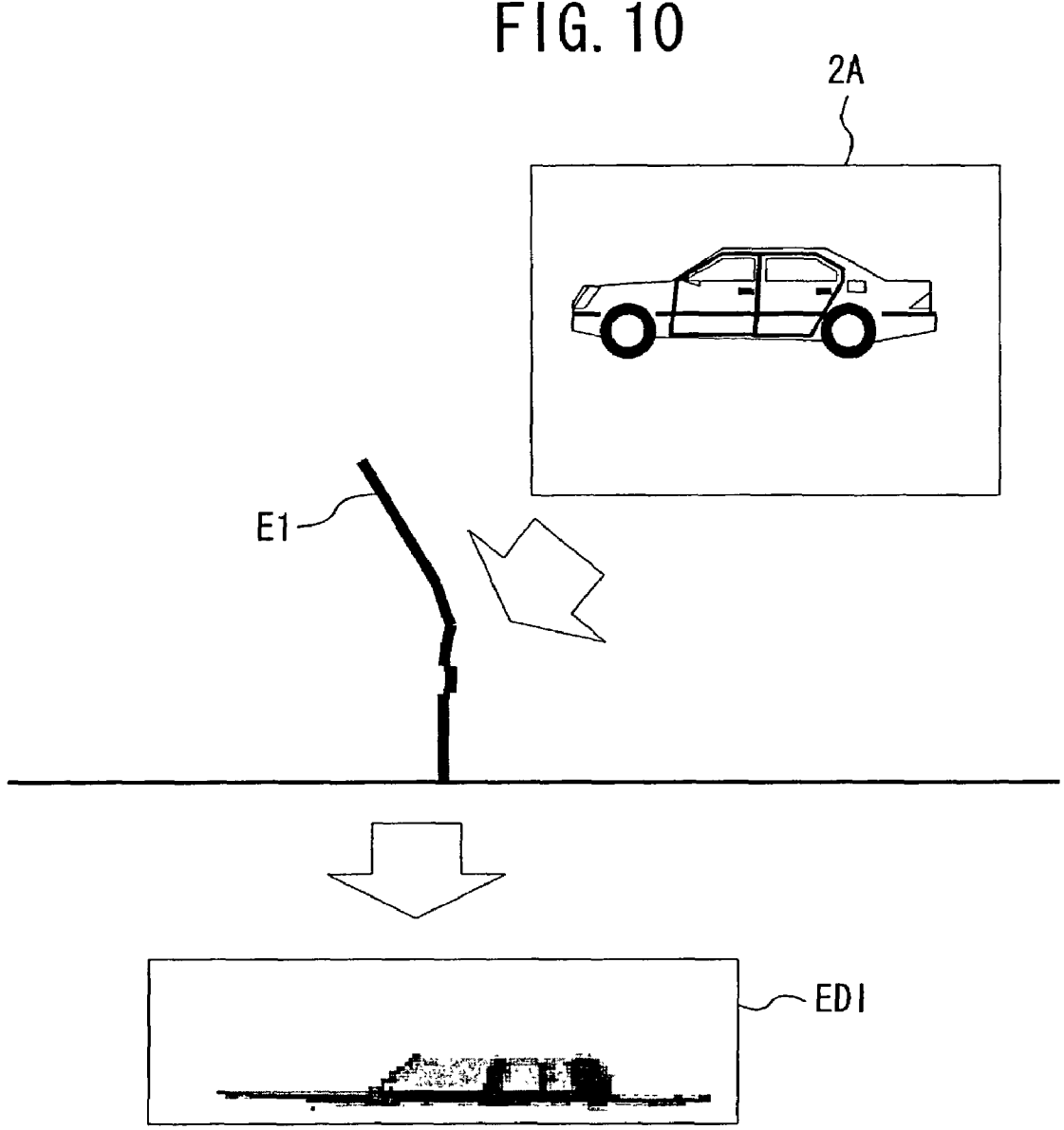
FIG. 10 is a view for illustrating generation of a border image.

Referring to FIG. 10, generation of a border image in step S14 will be described in detail. In FIG. 10, the obstacle image in the camera image 2A taken with the camera 11 is subjected to perspective projection transform using the obstacle side profile E1 obtained by the obstacle position detection means 13 as the projection plane. The viewpoint is then transformed so that the obstacle is viewed from above, to thereby obtain a border image EDI of the obstacle. The obstacle border image EDI lacks in information on an occlusion region of the obstacle including the roof, the front, the back and the side opposite to the user's vehicle side. Therefore, as is shown in FIG. 10, the obstacle border image EDI, including only part of the obstacle, is a thin image with one side face standing like a wall.

Figure 11A:
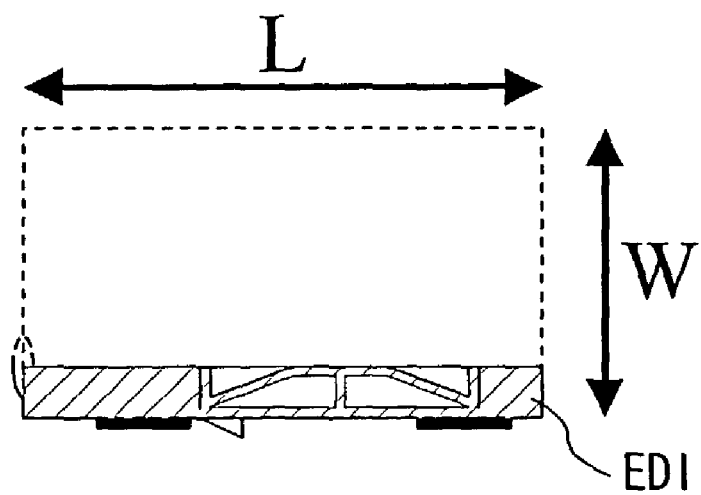
FIG. 11 is a view for illustrating generation/placement of an inverted border image.
Figure 11B:
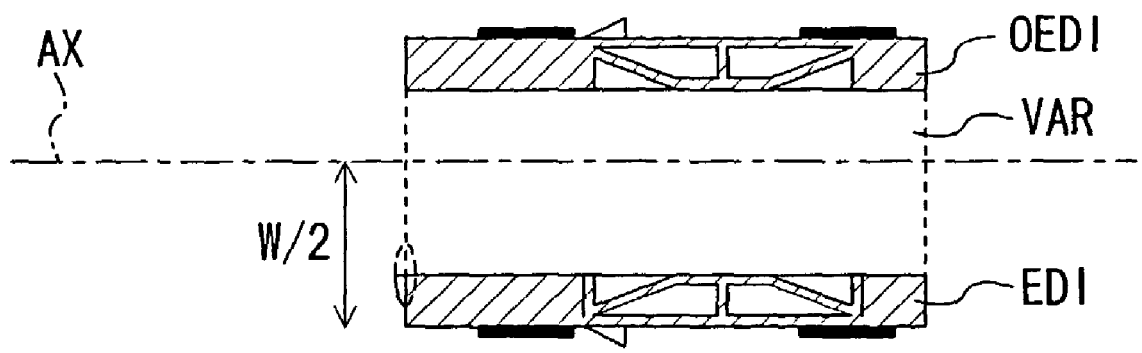

In step S15, an inverted border image of the neighboring obstacle is generated and superposed. FIG. 11A diagrammatically shows the border image EDI placed in an obstacle region of a surroundings image. As shown in FIG. 11B, on the assumption that the neighboring obstacle is roughly axisymmetric, a virtual symmetry axis AX is assumed along a position of a half of the width W so that the width of the obstacle is equal to the width W determined in step S12. An inverted border image OEDI obtained by inverting the border image EDI with respect to the virtual symmetry axis AX is placed to align with the border position on the side opposite to the user's vehicle side (position apart from the position of the border image EDI by the width W).

The image in FIG. 11B is still unnatural because a blank region VAR exists between the border image EDI and the inverted border image OEDI. Therefore, in step S16, the blank region VAR is filled by interpolating pixels of the border image EDI and the inverted border image OEDI, to complete a synthesized image of the neighboring obstacle.

Figure 12:
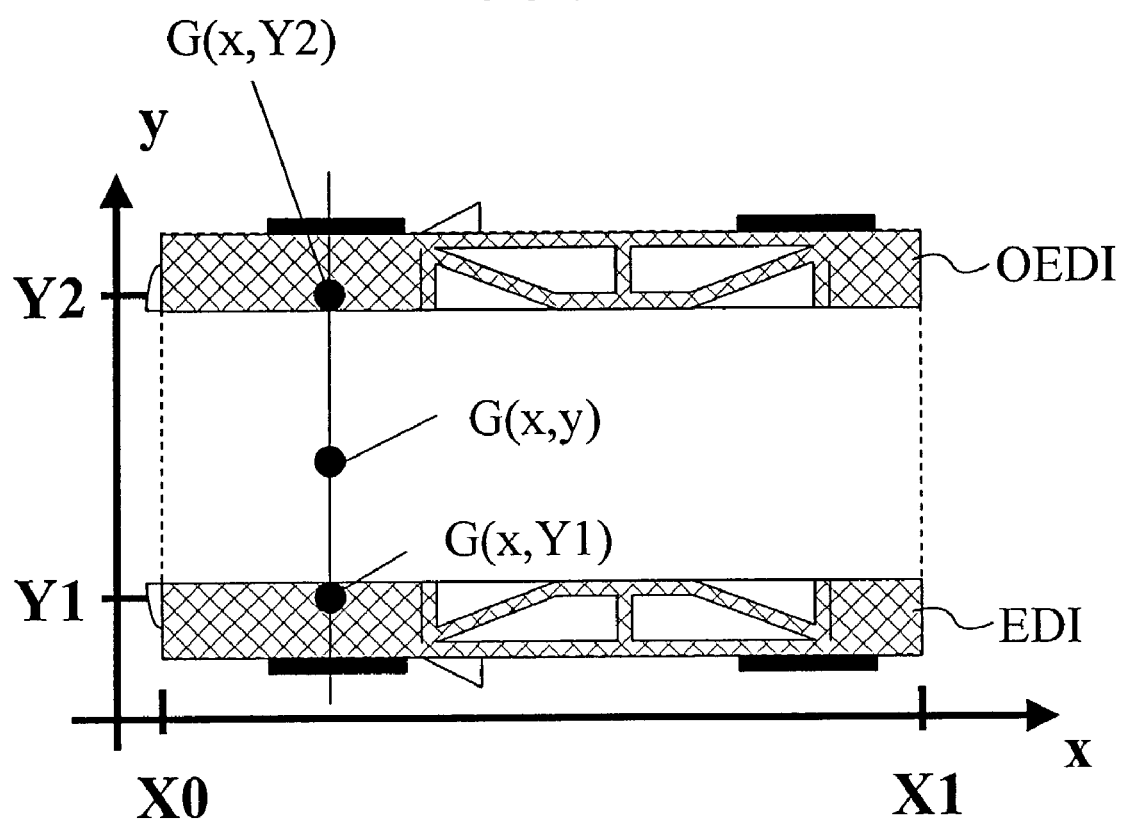
FIG. 12 is a view for illustrating pixel interpolation.

The pixel interpolation in step S16 will be described with reference to FIG. 12. FIG. 12 is an enlarged view of FIG. 11B, in which the x-axis is put in the direction along the border of the obstacle on the user's vehicle side, and the y-axis is put in the direction orthogonal to the x-axis. Assume that the x coordinates of the leftmost and rightmost ends of the blank region VAR are X0 and X1, respectively, and the y coordinates of the positions of the border image EDI and the inverted border image OEDI closest to the blank region VAR are Y1 and Y2, respectively. A pixel G(x, y) (X0<x<X1, Y1<y<Y2) in the blank region VAR is then determined by expression (1) below.

$$G(x, y) = (Y2-y)G(x, Y1) + y - Y1)G(x, Y2)/Y2 - Y1 \quad (1)$$

FIG. 13 is a diagrammatic view of the surroundings image generated in the manner described above, in which 2B denotes a synthesized image of the vehicle as the neighboring obstacle. Note that the texture, average brightness, typical color and the like of the border image EDI may also be used for interpolation of pixels in the blank region VAR.

In some cases, the border of an obstacle on the user's vehicle side obtained may be of an L shape, not a straight line. Processing in this case will be described in detail with reference to FIGS. 14A and 14B.

Figure 14A:
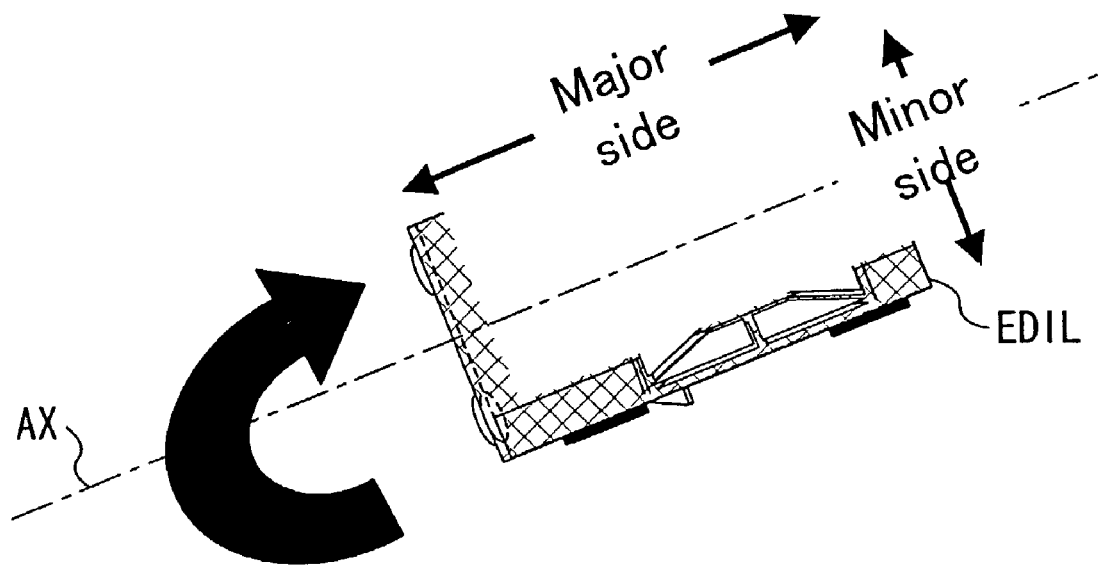
FIG. 14 is a view for illustrating processing performed when the border of an obstacle on the user's vehicle side is of an L shape.
Figure 14B:
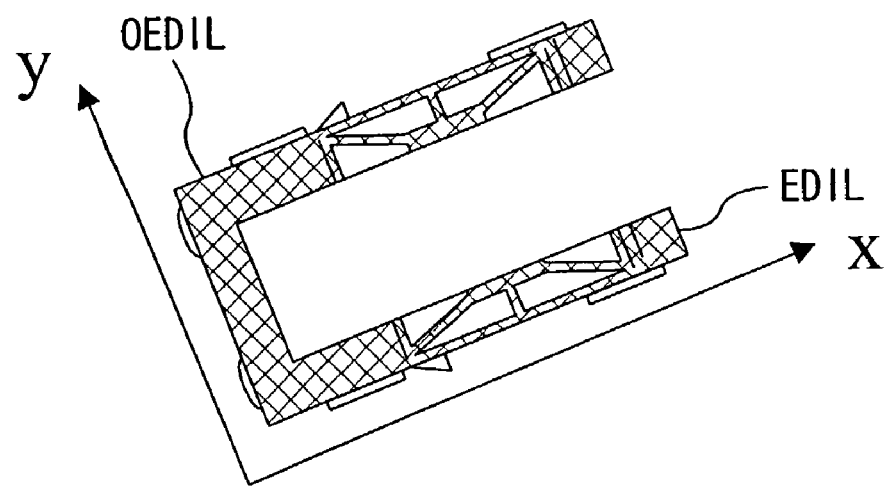

As shown in FIG. 14A, when a rectangular obstacle such as a vehicle is on a skew with respect to the line of sight of the camera, an L-shaped border image EDIL is obtained. In this case, a symmetry axis AX extending through the center of the minor side and in parallel with the major side is assumed. The border image EDIL is rotated by 180 degrees with respect to the symmetry axis AX to obtain an inverted border image OEDIL as shown in FIG. 14B. The border image EDIL takes precedence over the inverted border image OEDIL in the overlap region of the border images EDIL and OEDIL. This is because the border image EDIL reflects the actual surroundings more correctly. The symmetry axis AX may be determined based on the length of the major side as in the example described above.

The x-axis and the y-axis are put along the major side and the minor side, respectively, as in the example described above, to perform interpolation of pixels as described above. Alternatively, the x-axis and the y-axis may be put along the minor side and the major side, respectively. Otherwise, the y-axis may be put along a side closer to the line of sight of the camera, or the x-axis and the y-axis may be switched appropriately depending on camera images.

FIG. 15 is a diagrammatic view of the surroundings image generated in the manner described above, in which 2C denotes a synthesized image of the vehicle 2 as the neighboring obstacle.

When the border of an object obtained is a curve, the curved border may be subjected to linear approximation by the method of least squares and the like. The x-axis is put along the resultant straight line, and a virtual symmetry axis is assumed along a line obtained by parallel displacement of the x-axis, to perform processing as described above. Alternatively, the curved border may be subjected to L-shape approximation, to perform similar processing by putting the x-axis and the y-axis along the two sides of the L shape.

Figure 16:
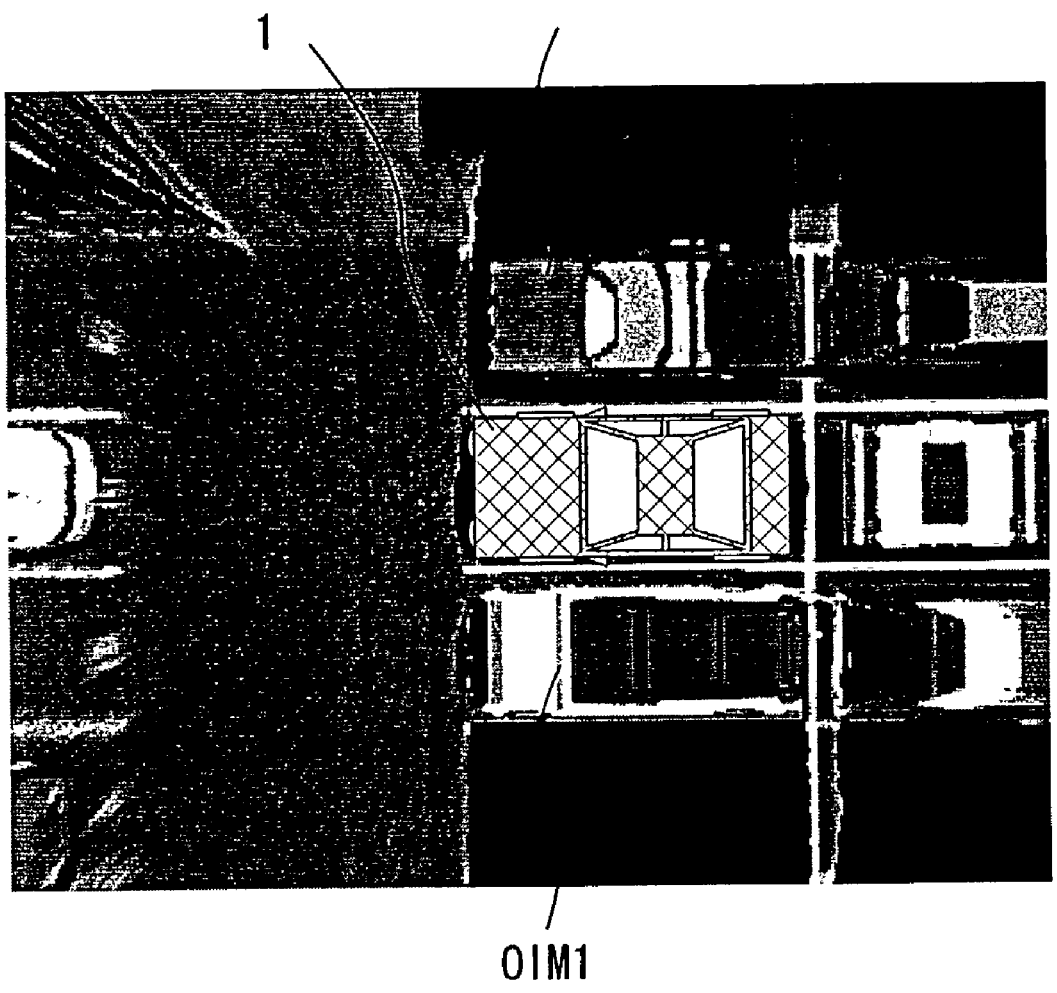
FIG. 16 is a first example of a synthesized image in Embodiment 2 of the present invention.

FIG. 16 is an image obtained by performing the processing in this example for the synthesized image shown in FIG. 41. In FIG. 16, an obstacle image OIM1 generated using the inverted border image and interpolation is superposed on each obstacle region.

<Second Example>

In the first example, an inverted border image was used on the assumption that the neighboring obstacle was roughly axisymmetric. It is also possible to generate an obstacle image using only interpolation of pixels without use of an inverted border image. That is, an obstacle image as substitute image data filling an image missing region may be obtained from the border image of the obstacle on the user's vehicle side simply by performing only interpolation of pixels. This method is effective when use of axisymmetry is not available, such as when a neighboring vehicle is in the front or rear of the user's vehicle and images of only the front or rear portion of the neighboring vehicle are taken with the camera.

Figure 17:
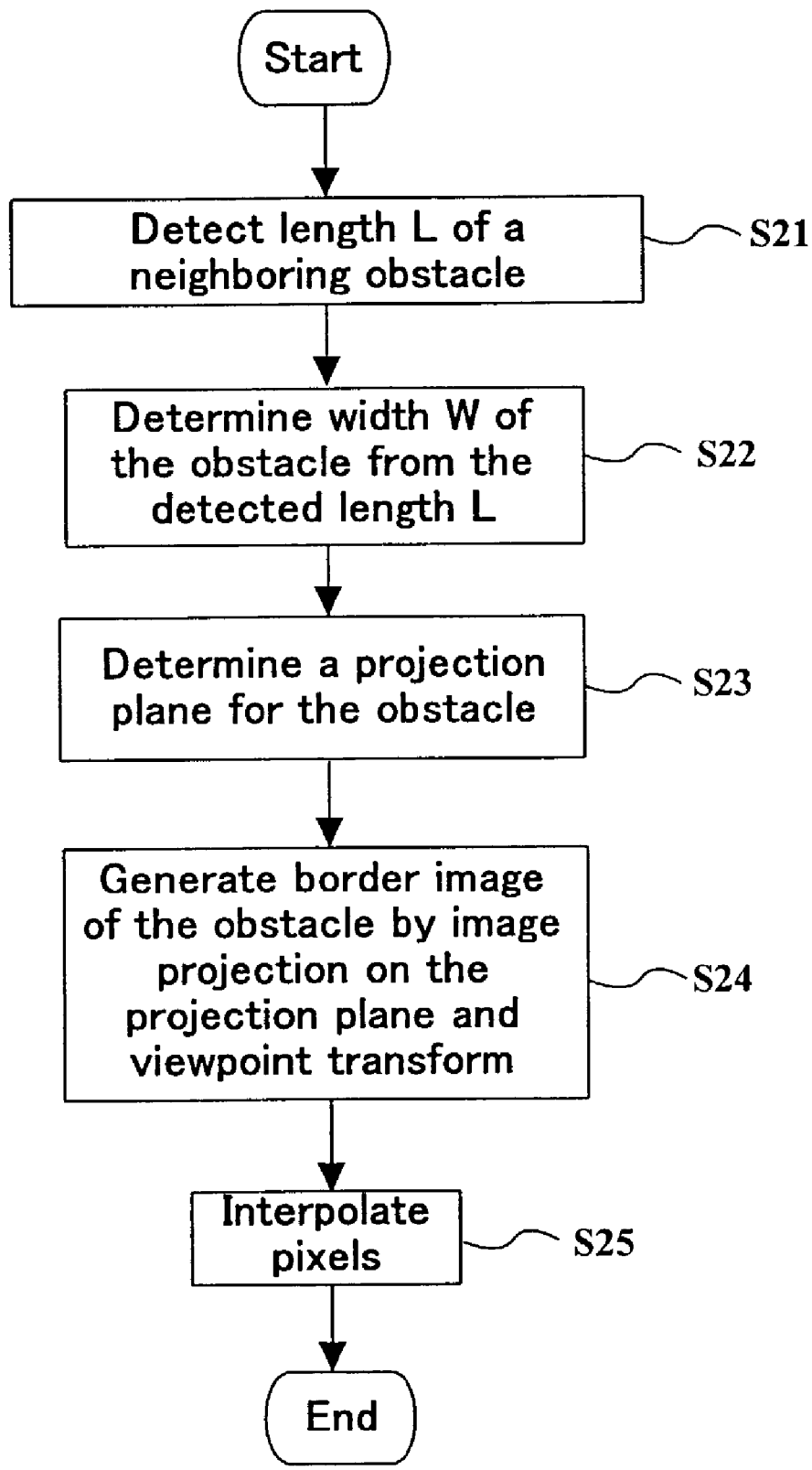
FIG. 17 is a flowchart of image synthesis using a border image and pixel interpolation by the image processor in Embodiment 2 of the present invention.

FIG. 17 is a flowchart of operation of the image processor 14 in the second example of this embodiment. Steps S21 to S24 are the same as steps S11 to S14 of the flow in the first example shown in FIG. 9. Interpolation of pixels in steps S25 in this example will be described with reference to the relevant drawings.

FIG. 18 is a diagrammatic view of a synthesized image of a situation in which a neighboring vehicle exists in the rear of the user's vehicle 1. In FIG. 18, a border image EDI2 of the neighboring vehicle is placed in the rear of the user's vehicle 1.

Figure 19:
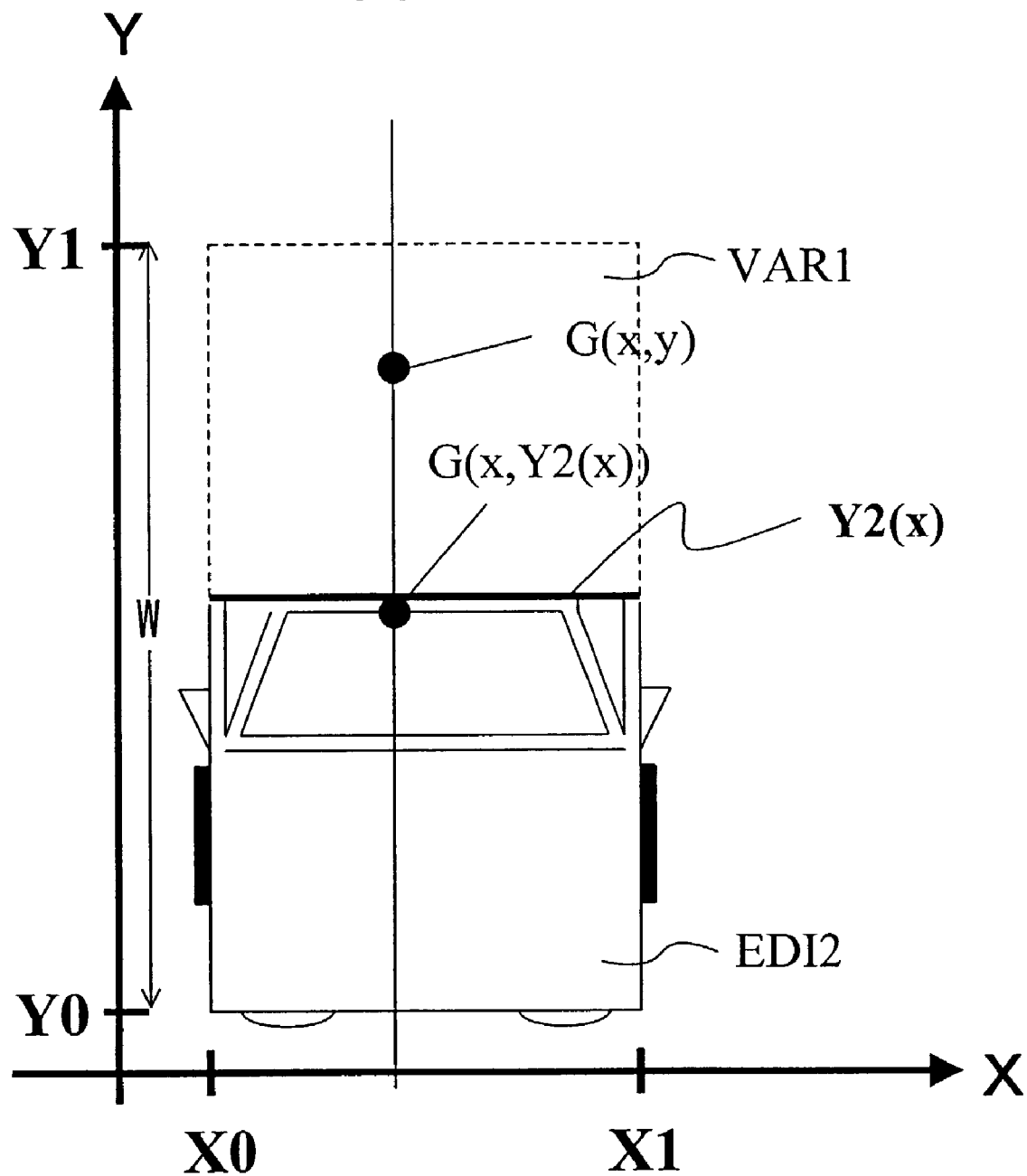
FIG. 19 is a partial enlarged view of FIG. 18.

FIG. 19 is a partial enlarged view of FIG. 18, in which the x-axis is put in the lateral direction and the y-axis is put in the depth direction with respect to the position of the user's vehicle in the synthesized image. As described earlier, the length W in the depth direction of the neighboring obstacle can be arbitrarily determined. Therefore, the obstacle region (x, y) can be presumed as X0<x<X1 and Y1<y<Y2.

In FIG. 19, VAR1 is an image missing region of the obstacle region for which no synthesized image has been determined. Assume that a line along which the image missing region VAR1 is in contact with the border image EDI2 is f=Y2(x) as a function of x. A pixel G(x, y) (X0<x<X1, Y2(x)<y<Y1) in the region VAR1 is then determined by expression (1) above as G(x, Y2(x)).

FIG. 20 is a diagrammatic view of a surroundings image generated in the manner described above, in which 2D denotes a synthesized image of the vehicle 2 as the neighboring obstacle.

Figure 21:
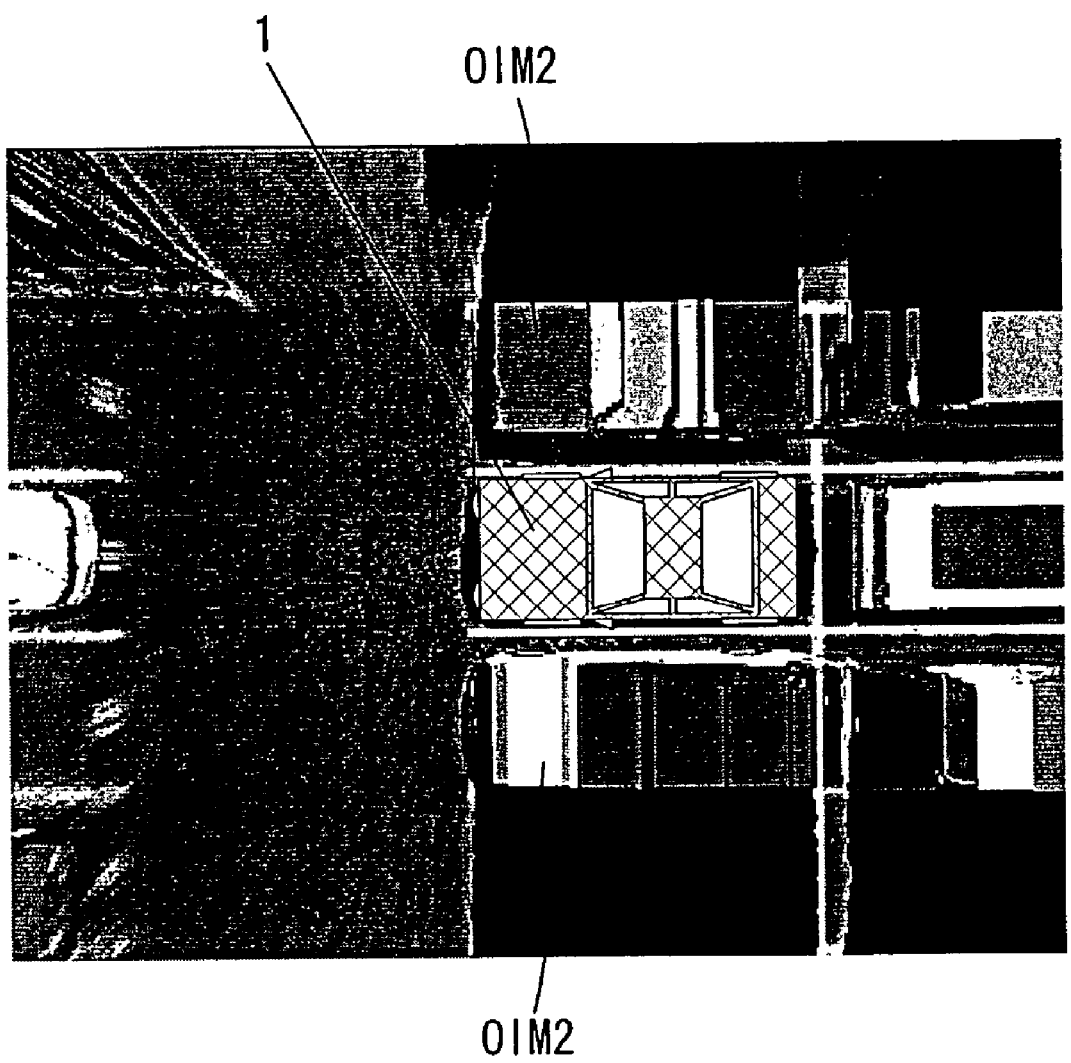
FIG. 21 is a second example of a synthesized image in Embodiment 2 of the present invention.

FIG. 21 is an image obtained by performing the processing in this example for the synthesized image shown in FIG. 41. In FIG. 21, an obstacle image OIM2 generated using the border image and interpolation is placed on each obstacle region.

<Switching of Interpolation>

The image processor 14 may have a function of switching the processing using a border image, an inverted border image and interpolation described in the first example and the processing using interpolation for a border image described in the second example, and execute either of these types of processing by switching for each obstacle.

For example, when the neighboring obstacle is a vehicle, the processing may be switched by determining the orientation of the vehicle. That is, the processing in the first example is performed when the neighboring vehicle is on one side of the user's vehicle, and the processing in the second example is performed when it is in the front or rear of the user's vehicle.

The orientation of a vehicle can be determined by detecting a number plate and a tire in the obstacle region detected by the obstacle detection means 12. A number plate can be detected from a camera image by a technique using the fact that number plates have the same size or by a technique described in Japanese Laid-Open Patent Publication No. 10-302074, for example. In the latter technique, small regions are cut from an image and input into a neural network after being subjected to edge emphasizing and size scaling. A small region that has earned the maximum output is determined as the number plate position. A tire can be detected by any of known techniques using template matching and Hough transform.

It is determined that the neighboring vehicle is in the front or rear of the user's vehicle when a number plate is detected but no tire is detected, on one side of the user's vehicle when a tire is detected but no number plate is detected, and located at a certain angle with respect to the user's vehicle when both a number plate and a tire are detected. Also, when both a number plate and a tire are detected, the processing in the second example is possible by setting a straight line including the tire in the border position as the x-axis and a straight line including the number plate in the border position as the y-axis.

Figure 22:
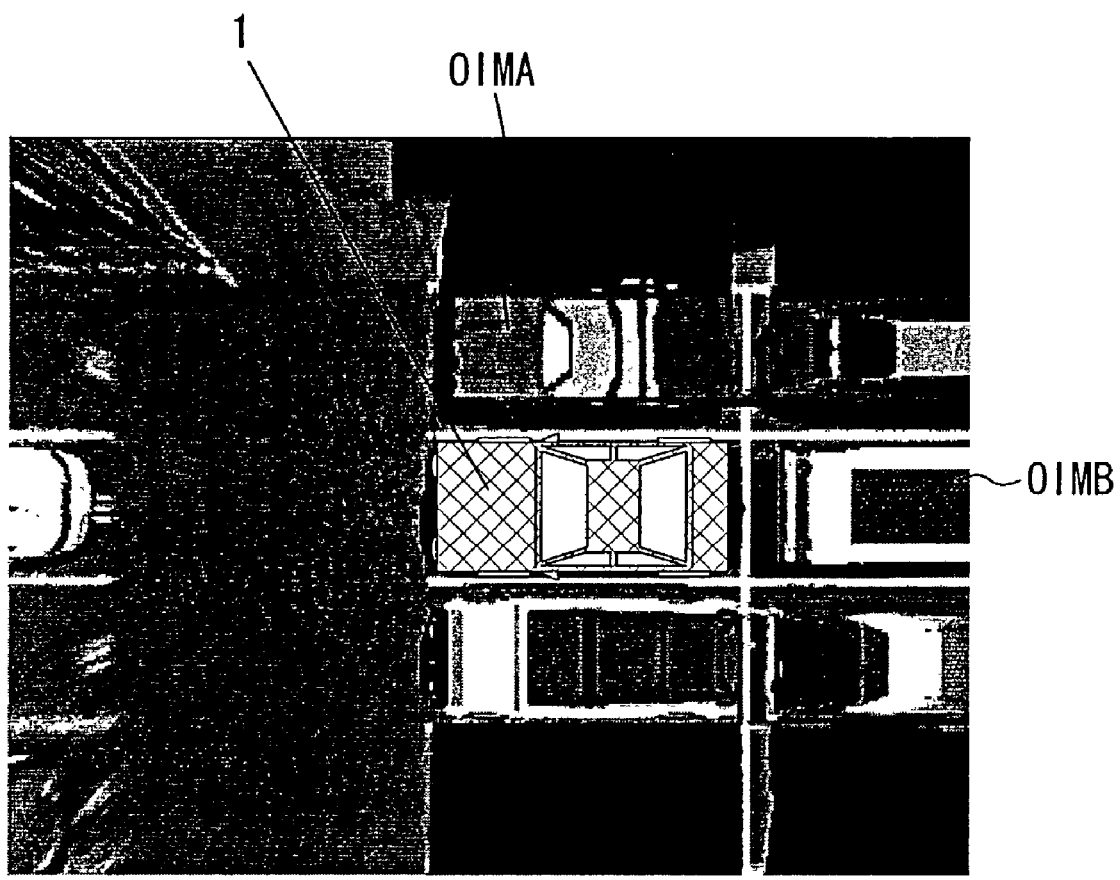
FIG. 22 is a third example of a synthesized image in Embodiment 2 of the present invention.

FIG. 22 is a synthesized image obtained by switching the interpolation processing. The synthesized image in FIG. 22 includes an obstacle image OIMA generated by the technique using an inverted border image in the first example and an obstacle image OIMB generated by the technique using interpolation for a border image in the second example.

In this embodiment, a vehicle having an axisymmetric shape was used as an example of an obstacle. This embodiment is also effective for non-axisymmetric obstacles. The reason is that in the processing of this embodiment, a border image of an obstacle is placed in the accurate position without fail. Therefore, although a correct image of an image missing region of a non-axisymmetric obstacle is not always presented, the border position of the obstacle on the user's vehicle side, which is important during driving, is presented accurately without fail.

Embodiment 3

Figure 23:
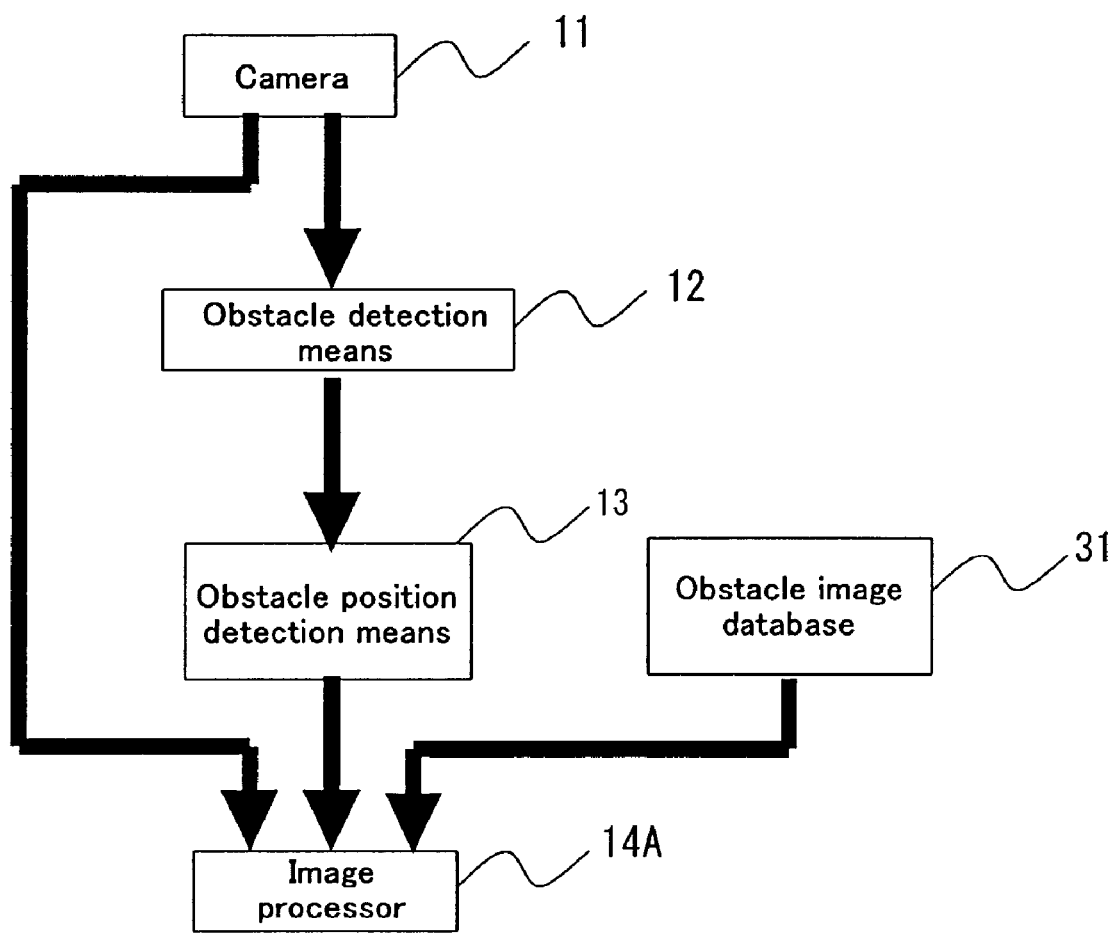
FIG. 23 is a block diagram of a basic configuration of a vehicle surroundings display device of Embodiment 3 of the present invention.

FIG. 23 shows a basic configuration of a vehicle surroundings display device of Embodiment 3 of the present invention. Referring to FIG. 23, the vehicle surroundings display device of this embodiment includes an obstacle image database 31 for storing image data of objects as potential obstacles, in addition to the camera 11, the obstacle detection means 12, the obstacle position detection means 13 and an image processor 14A.

The operation of the image processor 14A is different from the image processor 14 in Embodiments 1 and 2. That is, the image processor 14A determines the type of an obstacle detected by the obstacle detection means 12, reads image data for the determined type of obstacle from the obstacle image database 31, and places the read image data on a surroundings image to align with the border position detected by the obstacle position detection means 13 as substitute image data filling an image missing region of the surroundings image.

The determination of the type of an obstacle will be described in detail.

The obstacle image database 31 includes data on obstacles, such as the aspect ratio, the side profile and the model when vehicles are taken as an example.

Figure 24A:
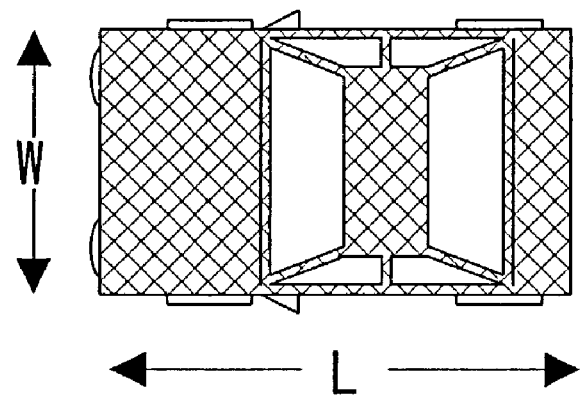
FIGS. 24A and 24B are views for illustrating the aspect ratio of a vehicle and the vehicle side profile.
Figure 24B:
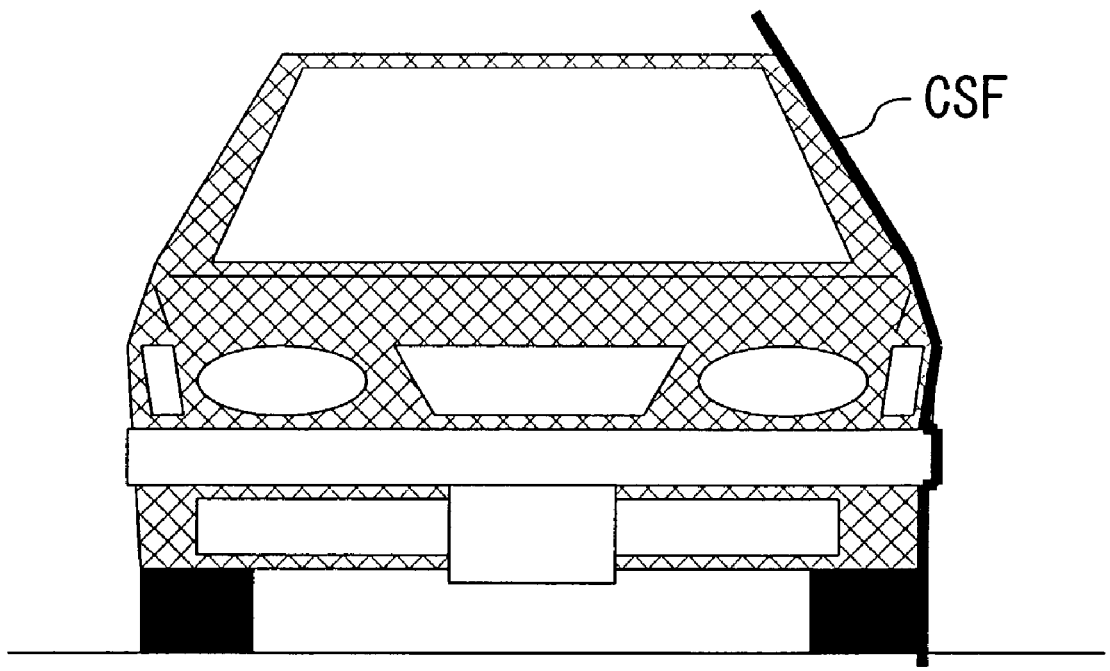

FIGS. 24A and 24B illustrate a vehicle as is viewed from above and from the front, respectively. The "aspect ratio of a vehicle" is a ratio of the length L to the width W in FIG. 24A. The distance between the right and left tires of a vehicle is roughly equal to the width W of the vehicle. Therefore, by measuring this distance, the width W of a vehicle can be obtained. The "side profile of a vehicle" is a three-dimensional profile CSF of a vehicle in FIG. 24B, which can be used as a border image.

FIG. 25 shows an example of model data, in which the model data includes model identifying data used for model identification, color data showing available colors for respective models, and display data used for image display.

The "model identifying data" refers to a binary-coded image in which, when edges and feature-points of a camera image are used for model identification, for example, a pixel including an edge or a feature-point is set at "1" and a pixel including no edge or feature-point is set at "0". The size of such binary-coded images is normalized to a fixed value.

As the "color data", all colors of respective models available in the market may be stored, for use in model identification using brightness and positioning of an obstacle image to be described later. In this example, color data is represented by 256-level gray scale for each of RGB. Specifically, red is represented by (255, 0, 0), green by (0, 255, 0) and blue by (0, 0, 255). The "display data" is used for placement of an obstacle image to be described later.

Since a vehicle near the user's vehicle may be oriented in any direction, the model identifying data and display data are desirably held so that they are transformable to data from any viewpoint. This can be realized by storing three-dimensional profile data of vehicles.

The operation of the image processor 14A will be described in detail. The image processor 14A roughly determines the type of an obstacle detected by the obstacle detection means 12, such as whether the obstacle is a car or a motorcycle, and based on the determination result, the model is identified if the obstacle is a car.

Figure 26:
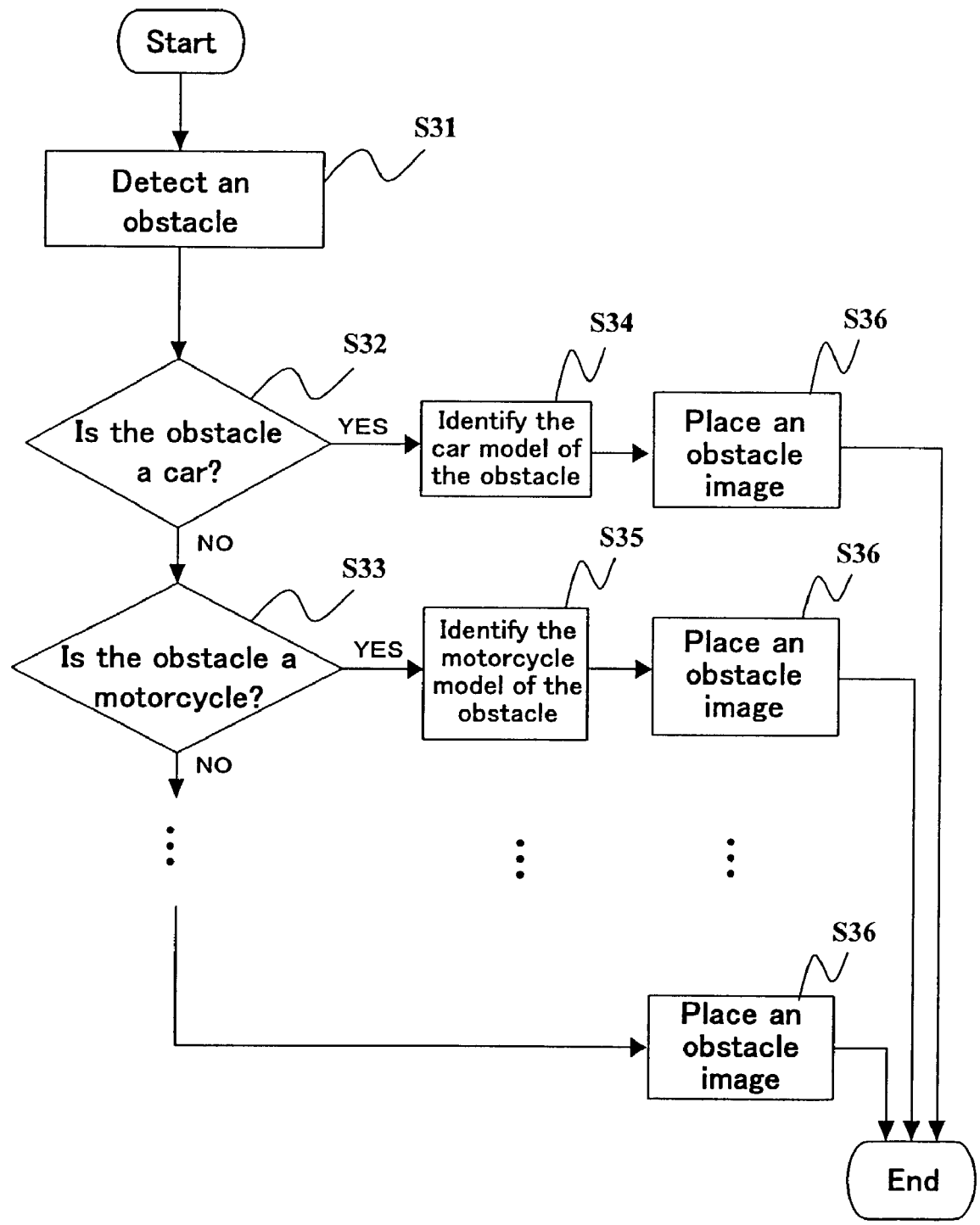
FIG. 26 is a flowchart of operation of an image processor in Embodiment 3 of the present invention.

FIG. 26 is a flowchart of operation of the image processor 14A in this embodiment. First, once an obstacle is detected by the obstacle detection means 12 (step S31), rough determination of the type of the obstacle, such as whether or not the obstacle is a car (step S32) and whether or not the obstacle is a motorcycle (step S33), is performed. If the obstacle is determined to be a car in step S32, the model of the car is identified in step S34. If the obstacle is determined not to be a car (NO in step S32), whether or not the obstacle is a motorcycle is determined. If the obstacle is determined to be a motorcycle in step S33, the model of the motorcycle is identified in step S35. If the obstacle is determined not to be a motorcycle (NO in step S33), the process proceeds to another determination step on whether or not the obstacle is a person, for example.

The obstacle determination steps S32 and S33 can be realized using a neural network and the like. A neural network can output a pattern among previously-learnt patterns that is most approximate to an input. Therefore, by making a neural network learn a large amount of data on various cars as "car patterns" and a large amount of data on various motorcycles as "motorcycle patterns", it is possible to determine whether or not the detected obstacle data indicates a car or a motorcycle. It is naturally possible to use the model identifying data and the display data stored in the obstacle image database 31 as the learning patterns. That is, the determination steps S32 and S33 may be united as a single step.

Once the model is identified in steps S34 and S35, image data of the identified model is read from the obstacle image database 31, and the read image data is placed on the surroundings image to align with the border position detected by the obstacle position detection means 13 (step S36).

Figure 27:
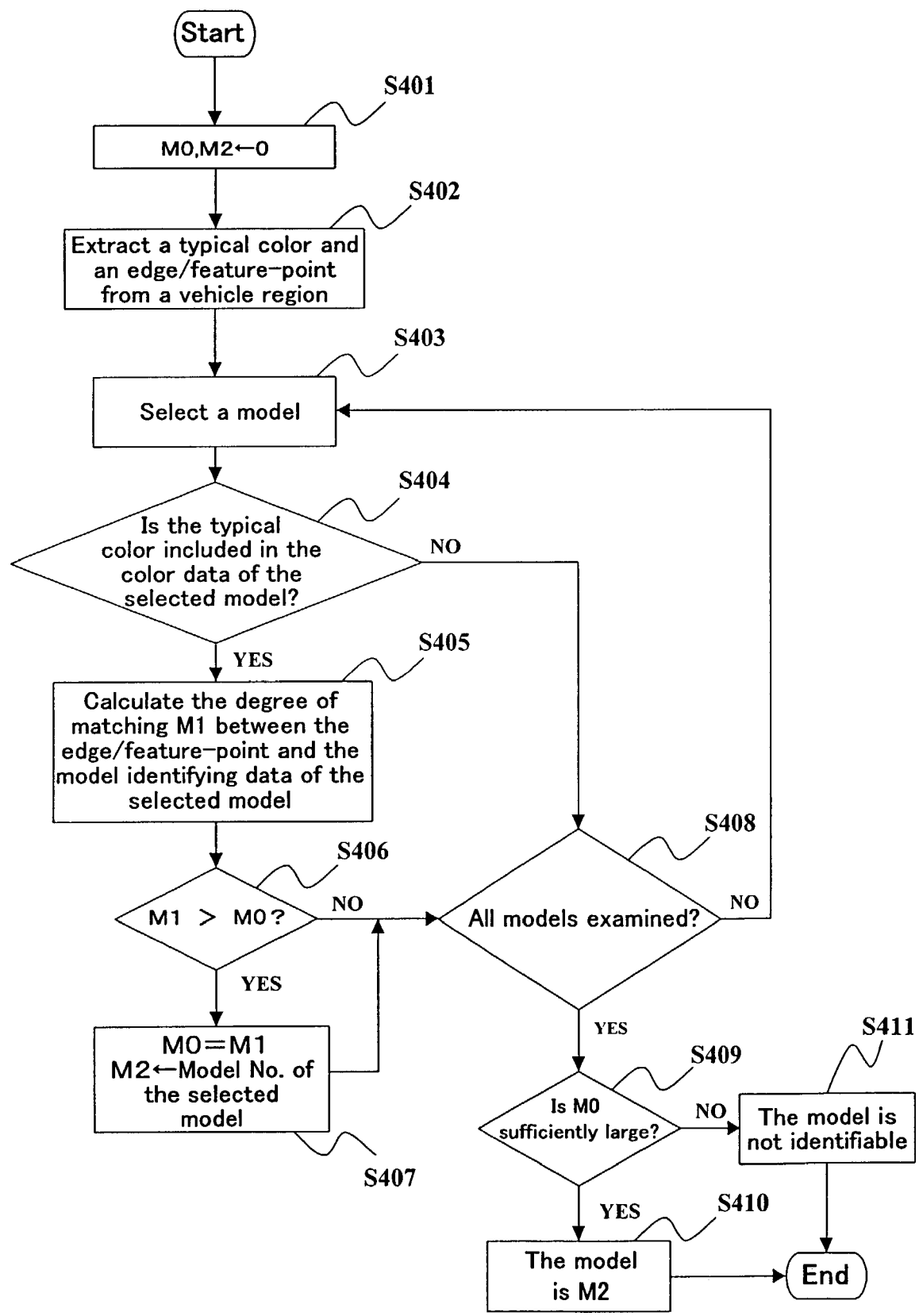
FIG. 27 is a flowchart of details of car model identification.

A method of model identification will be described. FIG. 27 is a flowchart of model identification in this embodiment.

In step S401, two variables M0 and M2 are initialized at 0. In step S402, a typical color, edges and feature-points are extracted from an obstacle region detected by the obstacle detection means 12. The typical color can be extracted by obtaining a histogram for all pixels in the obstacle region. Edges and feature-points can be extracted using convolution with a Sobel operator. A pixel from which an edge or a feature-point is detected is set at "1" and a pixel from which no edge or feature-point is detected is set at "0", to generate an edge/feature-point binary-coded image.

In step S403, one model is selected from model data stored in the obstacle image database 31, and the model identifying data and the color data for the model are retrieved. Using the retrieved data, whether or not the model selected in step S403 matches with the detected obstacle is determined in step S404 and the subsequent steps.

First, in step S404, whether or not a color close to the typical color of the detected obstacle is included in the color data of the model is examined. The closeness of the color can be determined by measuring the distance between the typical color and the color data of the model in the RGB three-dimensional space. If a color sufficiently close to the typical color exists in the color data, the process proceeds to step S405, for comparison of the edge/feature-point. If no color sufficiently close to the typical color exists, the detected obstacle is determined different from the model selected in step S403, and the process proceeds to step S408 for comparison with data of another model (step S403).

In step S405, the degree of matching M1 is calculated between the edge/feature-point of the obstacle and the model identifying data for the model selected in step S403. This can be calculated by comparing the previously-generated edge/feature-point binary-coded image of the obstacle with the edge/feature-point binary-coded image of the selected model.

Specifically, the degree of matching M1 is calculated by expression (2) below:

$$M1 = \frac{\sum f(u,v) \cdot g(u,v)}{\sum f(u,v) + \sum g(u,v)} \quad (2)$$

wherein f(u,v) denotes an image obtained by normalizing the edge/feature-point binary-coded image of the obstacle to the size of the edge/feature-point binary-coded image of the model data, and g(u,v) denotes the edge/feature-point binary-coded image of the selected model data, with u and v indicating the size of the edge/feature-point binary-coded image of the model data.

The numerator of the above expression represents the total number of edges/feature-points matching in position between the obstacle and the model data, and the denominator represents the total number of edges/feature-points existing in the obstacle and the model data. That is, as the value of M1 is greater, the two edge/feature-point binary-coded images are more similar to each other, and as the value of M1 is smaller, the two images are more different.

In step S406, whether or not the degree of matching M1 is greater than the value of the variable M0 is determined. If M1 is smaller, the obstacle is determined different from the selected model, and the process proceeds to step S408 for comparison with data of another model (S403).

If M1 is greater, the value of M0 is set at M1, and the value of M2 is set at the model number of the selected model to be held as a model candidate. The process then proceeds to step S408 for comparison with data of another model (S403). Thus, the variable M0 now holds the value of the degree of matching of the most probable model candidate used for comparison so far. In this way, by comparing the detected obstacle with all the models stored in the obstacle image database 31, a model exhibiting the highest similarity to the obstacle can be identified.

Once comparison with all the models is completed (YES in step S408), the process proceeds to step S409, where whether or not the model candidate is adequately similar to the obstacle is determined. This can be made by checking whether or not the degree of matching M0 of the model indicated by M2 determined as having the highest similarity is greater than a predetermined value. If M0 is greater than the predetermined value, it is decided that the obstacle is adequately similar to the model M2, and the process is terminated with decision that "the model of the detected obstacle is M2" (S410). If M0 is smaller than the predetermined value, it is decided that the obstacle is not adequately similar to the model M2, and the process is terminated with decision that "the model of the detected obstacle is not identifiable" (S411).

The calculation of the degree of matching with various model data may be made in parallel, not sequentially as described above, to shorten the processing time.

Model identification of a motorcycle can also be performed in a manner similar to that shown in FIG. 27 using motorcycle model data stored in the obstacle image database 31.

The type determination and model identification of an obstacle can be performed by one operation without the rough type determination, by using all of the car model data and the motorcycle model data stored in the obstacle image database 31 as the obstacle data.

As the car model data, data of roughly classified models such as a passenger car, a van, a light truck and a truck may be used.

The obstacle image database 31 preferably includes a means for updating the model data. For example, the vehicle surroundings display device of this embodiment may periodically access a database including constantly updated model data to update the model data in the obstacle image database 31. The model data may be updated via a memory medium such as a CD and a DVD, or by accessing another vehicle surroundings display device having updated model data via inter-vehicle communications to receive the model data.

An obstacle identification method using images is described in O. Hasegawa et al., "On-line identification of an object in a general road image", Seventh Symposium on Sensing via Image Information Collected Papers, pp. 221–226 (Literature 2). Another example of the method for identifying a vehicle model using images is described in Japanese Laid-Open Patent Publication 2001-101405. In this method, a large amount of data on various models is collected and grouped, and used as learning images to realize model identification.

It is also possible to directly obtain model information on a neighboring vehicle recognized as an obstacle via inter-vehicle communications. Alternatively, model information may be obtained from the number plate of a neighboring vehicle recognized as an obstacle.

Next, the placement of the obstacle image in step S36 in FIG. 27 will be described.

In this step, data representing the obstacle detected by the obstacle detection means 12 is placed on the surroundings image to present the obstacle in an accurate position so that the user does not feel unnaturalness for the resultant image.

Figure 28:
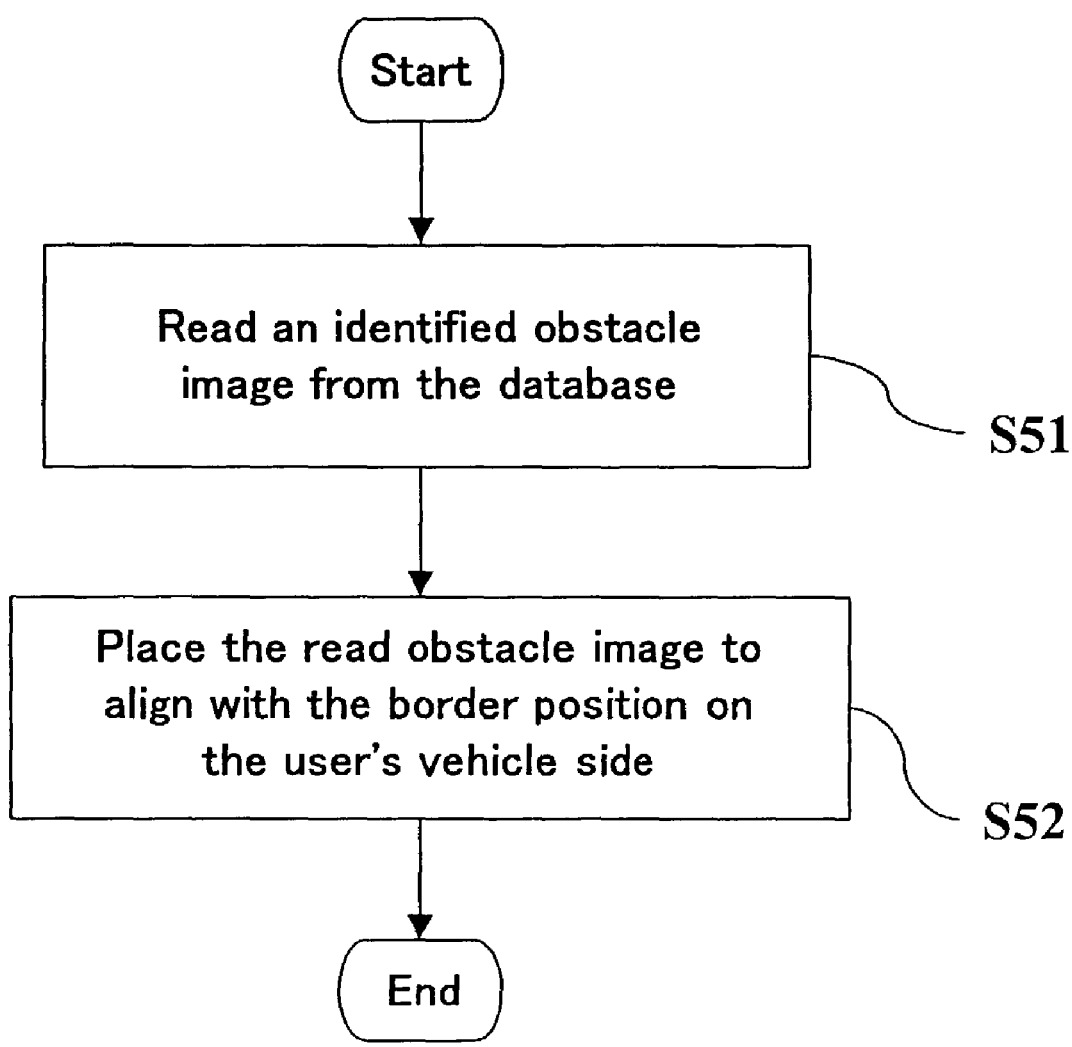
FIG. 28 is a flowchart of details of placement of an obstacle image.

FIG. 28 is a flowchart of the placement of an obstacle image in step S36. In this example, assume that in the flow shown in FIG. 26, the obstacle has been determined as a car and the model of the car has been identified in step S34.

Image data for the identified car model is read from the obstacle image database 31 to determine a neighboring obstacle image to be presented to the user (step S51). The image obtained in this step has been viewpoint-transformed so that the image fits to the border position detected by the obstacle position detection means 13. When an image viewed from above the vehicle is to be presented to the user as the surroundings image, the neighboring obstacle image must be an image viewed from above as shown in FIG. 7A. An illustration or image data of an actual vehicle may be used as the neighboring obstacle image.

The read neighboring obstacle image is placed on the surroundings image to align with the border position of the obstacle on the user's vehicle side detected by the obstacle position detection means 13 (step S52). In this example, since it is known that the obstacle is a vehicle, the border position of the obstacle on the user's vehicle side may also be detected by determining the contact position of a tire of the vehicle with the road surface from the image as described below.

Figure 29:
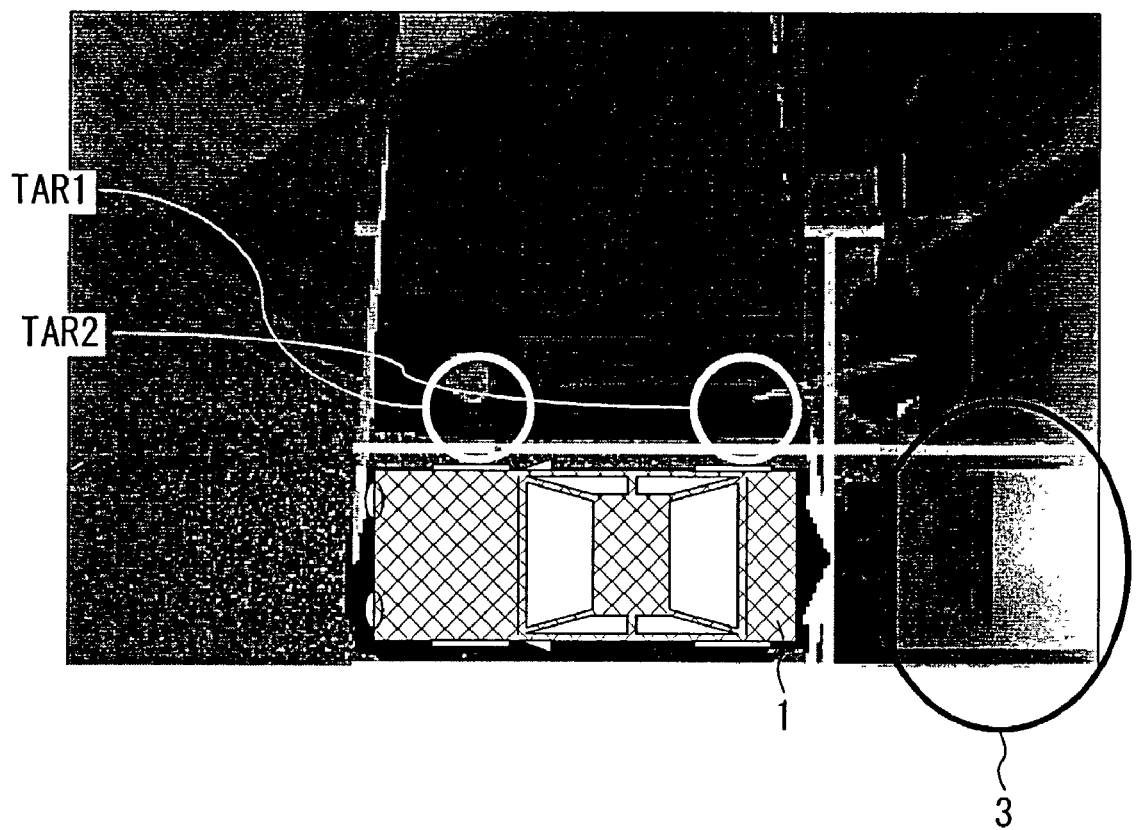
FIG. 29 is a synthesized image generated by road surface projection.

FIG. 29 is a synthesized image generated from the image shown in FIG. 7B by road surface projection described in Japanese Patent Application No. 2000-613188. As described in relation with the prior art problems, road surface projection is performed on the assumption that all objects in an image are in the plane of the road surface. Therefore, an image of a neighboring vehicle having a height component is distorted as shown in FIG. 29, and the projected position is greatly different from the actual position. However, tire regions TAR1 and TAR2 that are in contact with the road surface, which have no height component, are projected in accurate positions.

In view of the above, a synthesized image accurate in relative positions can be generated by using the contact positions of the tires with the road surface as the reference. Determination of the contact positions of tires with the road surface will be described with reference to the relevant drawings.

Figure 30:
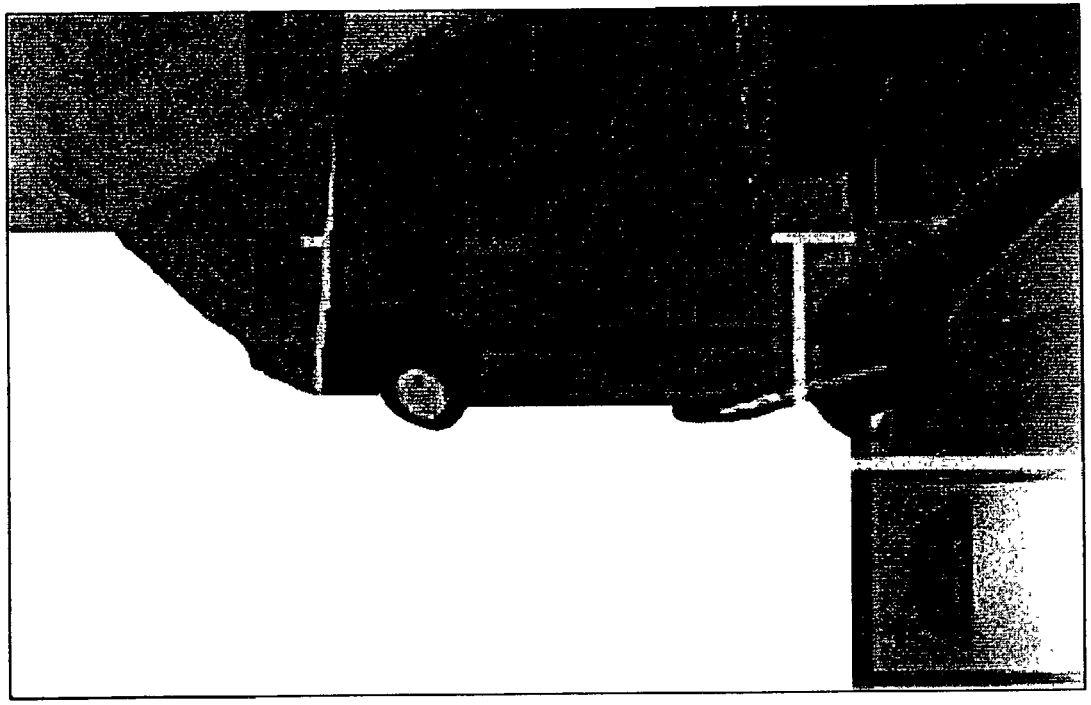
FIG. 30 is an image of an obstacle region in the image of FIG. 29.
Figure 31:
FIG. 31 is an arc pattern matching with the bottom portion of a tire.

FIG. 30 is an image of a region detected as an obstacle by the obstacle detection means 12. The obstacle position detection means 13 extracts an edge from this image using a Sobel operator described above, and from the result of the edge extraction, finds out an edge portion matching with an arc pattern CP1 shown in FIG. 31 simulating the lower portion of a tire. This processing can also be performed using template matching, Hough transform and the like.

Figure 32:
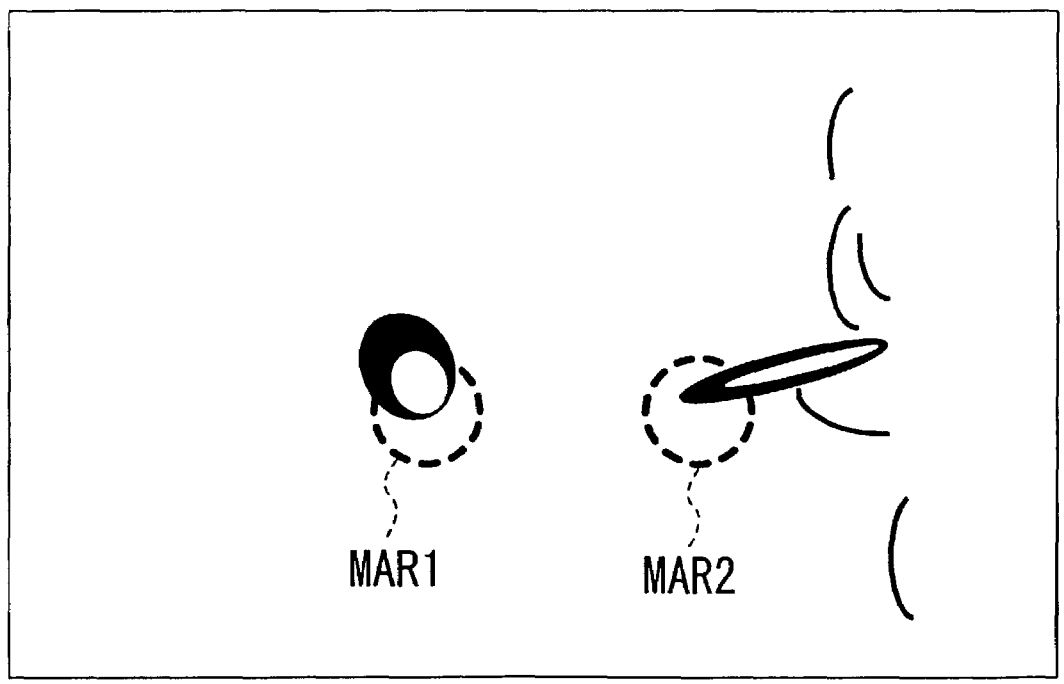
FIG. 32 is a view showing the result of edge extraction from the image of FIG. 30.

FIG. 32 shows the result of the edge extraction from the image of FIG. 30. In FIG. 32, matching regions MAR1, MAR2 and the like are obtained as edge portions matching with the arc pattern CP1. In a vehicle, tires are generally placed in the front and rear in pairs. Therefore, the two matching regions placed side by side are determined as the contact positions of tires with the road surface. That is, in the example in FIG. 32, the matching regions MAR1 and MAR2 are determined as the contact positions of the tires with the road surface. Alternatively, the fact that tires are always in contact with a non-obstacle region may be used as a condition for detection.

Figure 33:
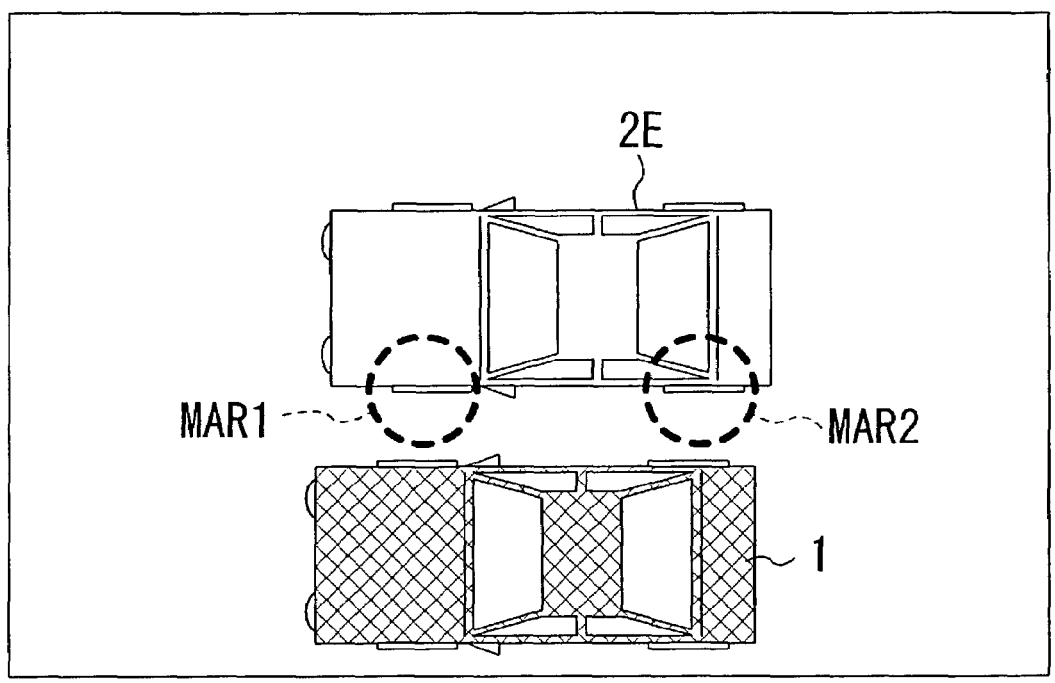
FIG. 33 is a first example of a synthesized image obtained in Embodiment 3 of the present invention.

Thereafter, the image processor 14A superposes the image data read from the obstacle image database 31 on the contact positions MAR1 and MAR2 of the tires with the road surface, to generate a neighboring vehicle synthesized image. In other words, the read image data is rotated so that the front and rear tires are located on the straight line connecting the two contact positions MAR1 and MAR2. The rotated image data is enlarged or contracted so that the positions of the two front and rear tires fit with the contact positions MAR1 and MAR2, to generate a synthesized image. FIG. 33 shows the thus-generated synthesized image.

When a neighboring vehicle is in the front or rear of the user's vehicle, like a vehicle 3 in the rear of the user's vehicle 1 in FIG. 29, no images of the tires of the neighboring vehicle are taken with the camera on the user's vehicle because the tires are concealed by the bumper of the vehicle. In this case, therefore, the border position detection method using tires described above is not adoptable. Instead, the number plate, for example, may be used for border position detection. This processing using a number plate will be described with reference to FIG. 34.

Figure 34:
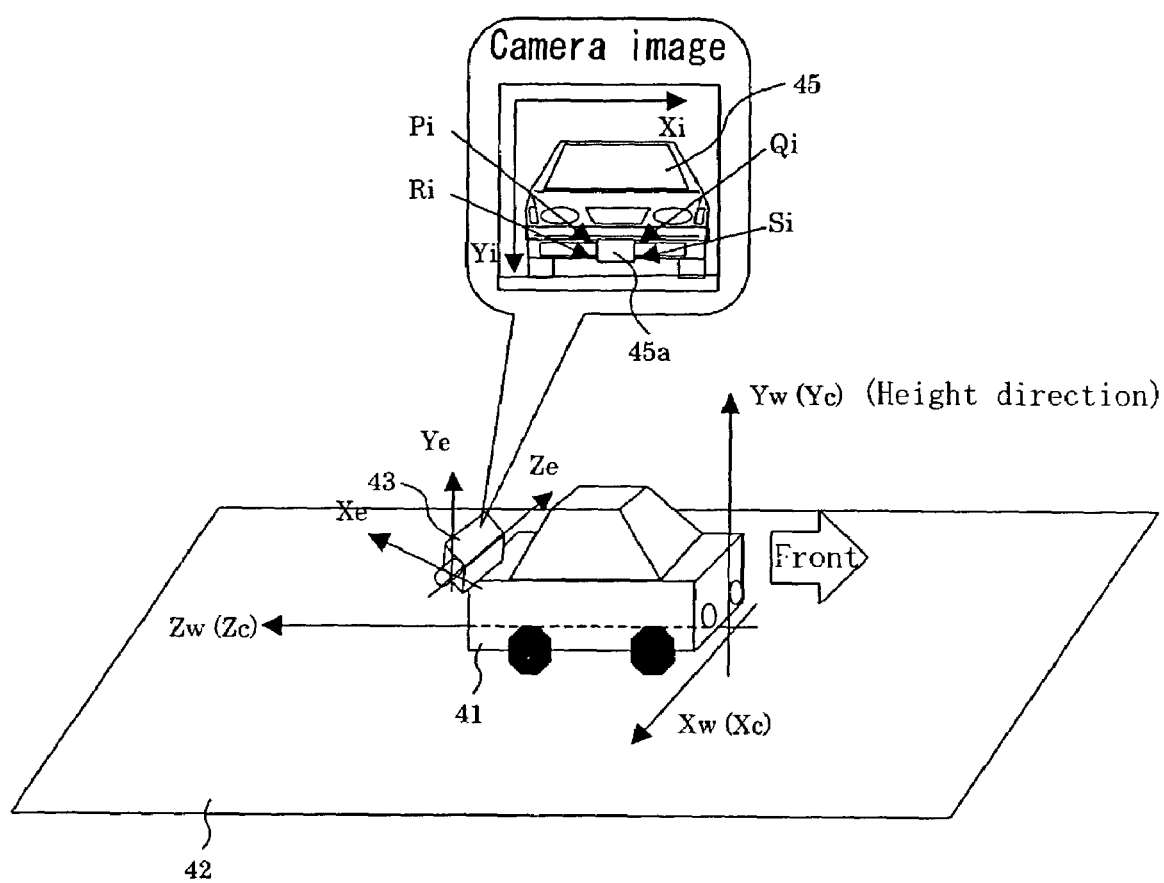
FIG. 34 is a view for illustrating obstacle border position detection using a number plate.

In FIG. 34, the reference numeral 41 denotes a user's vehicle, 42 a road surface, 43 a camera mounted on the user's vehicle 41, 45 a neighboring vehicle in an image taken with the camera 43, and 45a a number plate of the neighboring vehicle 45. As shown in FIG. 34, assume that an arbitrary point in the real world is represented by the coordinates $(Xw, Yw, Zw)$. Plane $Xw$-$Zw$ is a plane parallel to the road surface, direction $Zw$ is a forward/backward direction with respect to the user's vehicle, direction $Xw$ is a rightward/leftward direction with respect to the user's vehicle, and direction $Yw$ is a direction perpendicular to the road surface. FIG. 34 also shows a camera coordinate system $(Xe, Ye, Ze)$ having axis $Ze$ as the optical axis direction of the camera, and an image coordinate system $(Xi, Yi)$ of an image taken with the camera. These coordinate systems have the relationships represented by expressions (3) and (4) below.

$$Xe = -\frac{XiZe}{f}, Ye = -\frac{YiZe}{f} \quad (3)$$

$$\begin{pmatrix} Xw \\ Yw \\ Zw \\ 1 \end{pmatrix} = \begin{pmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{pmatrix} \begin{pmatrix} Xe \\ Ye \\ Ze \\ 1 \end{pmatrix} \quad (4)$$

wherein f and r are known constants determined with internal parameters and position of the camera 43.

The position of the number plate 45a in the camera image is detected. This detection may be performed by the method disclosed in Japanese Laid-Open Patent Publication No. 10-302074 described above, for example. That is, small regions are cut from the image and input into a neural network after being subjected to edge emphasizing and size scaling. A small region that has earned the maximum output is determined as the number plate position.

Assume that the coordinates of the four corners of the number plate 45a detected in the camera image are Pi(Xi0, Yi0), Qi(Xi1, Yi1), Ri(Xi2, Yi2), Si(Xi3, Yi3), and the coordinates of the four corners of the number plate 45a in the real world are Pw(Xw0, Yw0, Zw0), Qw(Xw1, Yw1, Zw1), Rw(Xw2, Yw2, Zw2), Sw(Xw3, Yw3, Zw3).

On the assumption that the size of number plates is standardized and that a number plate is perpendicular to the road surface, the coordinates of the four corners in the real world have the relationship represented by expression (5) below.

$$Yw0 = Yw1, Yw2 = Yw3 \quad (5)$$

$$Yw2 - Yw0 = b$$

$$(Xw1 - Xw0)^2 + (Zw1 - Zw0)^2 =$$

$$(Xw3 - Xw2)^2 + (Zw3 - Zw2)^2 = a^2$$

$$Xw1 > Xw0, Xw3 > Xw2$$

wherein a and b are known values representing the length and width of the number plate 45*a*. The values Pi, Qi, Ri and Si are known by performing the number plate position detection using the camera image. Therefore, by substituting these values into expressions (3) and (4) and solving by the method of least squares or the like using expression (5) as constraints, the positions Pw, Qw, Rw and Sw of the number plate 45*a* can be determined.

Since the number plate 45*a* is presumably at the position of the border of the neighboring vehicle closer to the user's vehicle, this border position of the neighboring vehicle can be estimated from the position of the number plate 45*a* in the real world.

In step S34 in FIG. 26, if the car model of the obstacle fails to be identified, the placement of the obstacle image in step S36 is performed in the following manner. Although no obstacle image data is available, it is known that the obstacle is a car. Therefore, the border position of the obstacle on the user's vehicle side is determined via an active sensing, by number plate recognition, or the like. An illustration, a word or a code representing a car is displayed to align with the border position as in Embodiment 1. Alternatively, as in Embodiment 2, an inverted border image, a border image and interpolation of pixels may be used.

When a neighboring vehicle is directly identified via inter-vehicle communications or the like, image data of the vehicle can also be received simultaneously during the communications.

Figure 35:
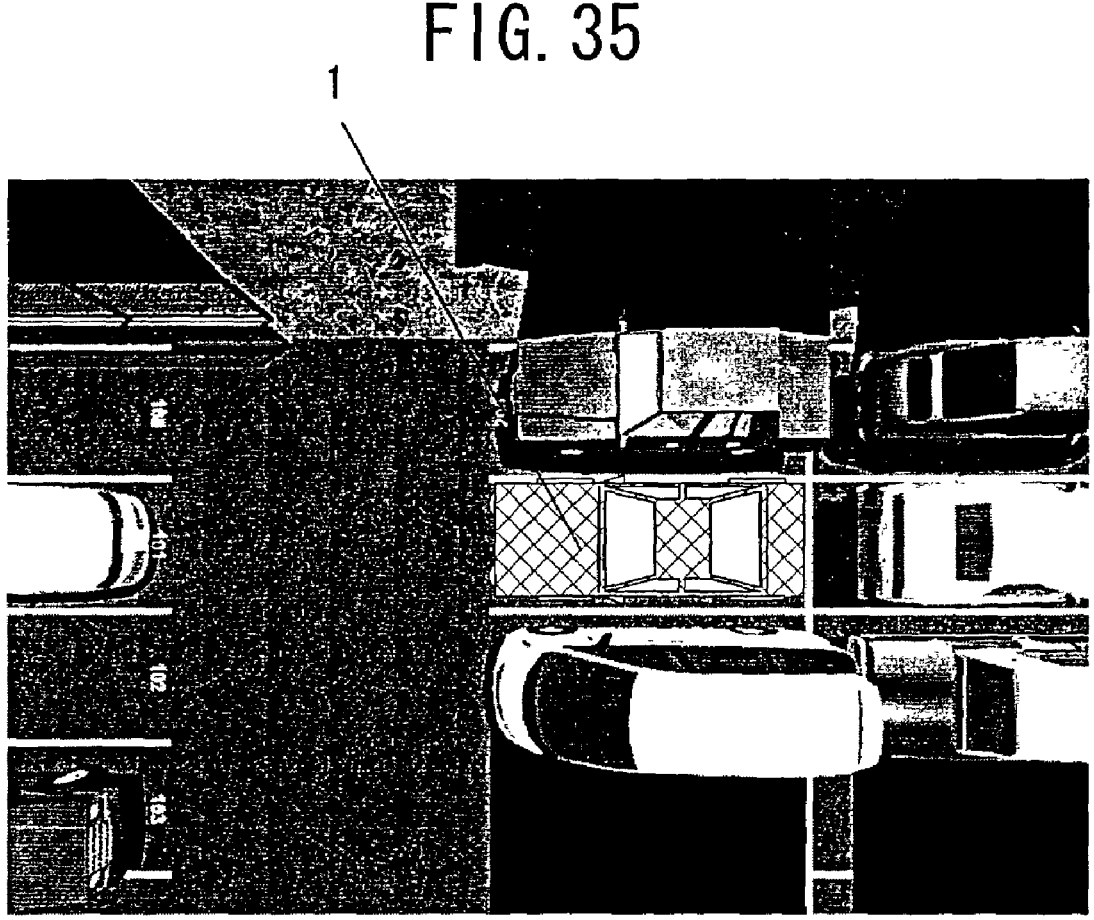
FIG. 35 is a second example of a synthesized image obtained in Embodiment 3 of the present invention.

FIG. 35 shows an example of a synthesized image in this embodiment, obtained by performing the image synthesizing techniques described in this embodiment based on camera images taken as shown in FIG. 38.

Figure 36:
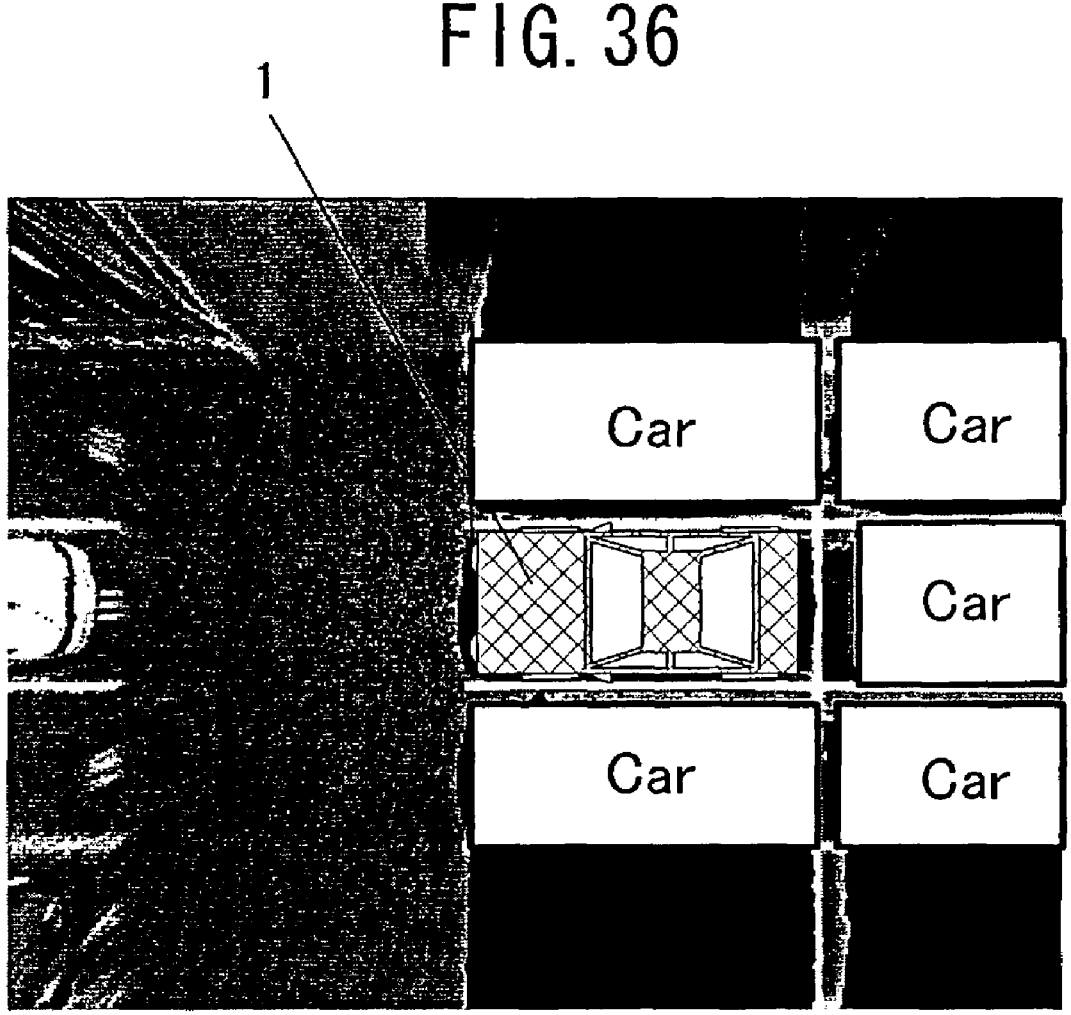
FIG. 36 is a third example of a synthesized image obtained in Embodiment 3 of the present invention.
Figure 37A:
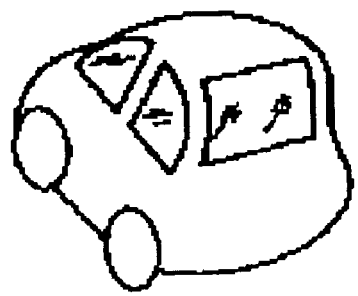
FIG. 37 shows examples of pictorial symbols in the second prior art.
Figure 37B:
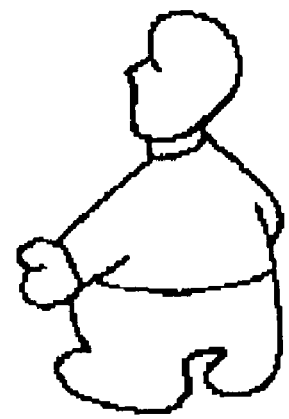
Figure 37C:
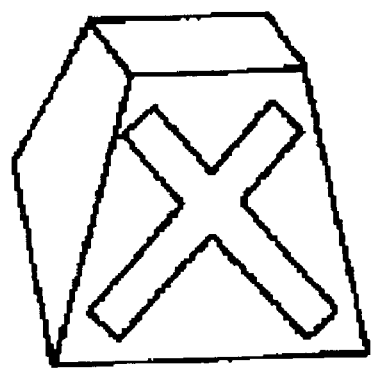
Figure 37D:
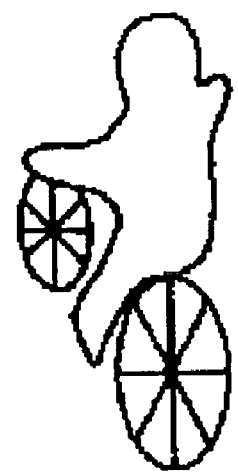

FIG. 36 shows an example of an image in which regions occupied by vehicles are represented by rectangles and a word is superimposed on each region. In FIG. 36, the word "car" is superimposed to call the user's attention. The border of each rectangular region on the user's vehicle side is aligned with the border position of the corresponding neighboring obstacle detected by the obstacle position detection means 13. This prevents the user's vehicle from coming into contact with the neighboring vehicle unlike the second prior art in which an illustration is simply pasted. In place of the word "car", other words, symbols and illustrations helpful in calling the user's attention may also be used.

In this embodiment, cars and motorcycles were used as examples of the obstacles. However, the techniques in this embodiment are also effective for other types of obstacles.

For example, when the object is a person, the accurate position of the person can be located by determining the contact position of the person with the road surface. In addition, by previously determining the person side profile, the region of the person can be divided into the head part, the upper-body part, the lower-body part and the like. That is, person data including head data, upper-body data and lower-body data are stored in the obstacle image database. The head data includes various hairstyle data items. The upper-body data includes upper-body clothing data such as short-sleeved shirt and a long-sleeved shirt. The lower-body data includes lower-body clothing data such as jeans and a skirt. An image of the person as an object can be generated using any of these data items for each detected part.

A method for detecting a person body part using an image is described in Haritaoglu et al., "W4: Who, When, Where, What: A Real Time System for Detecting and Tracking People", Third Face and Gesture Recognition Conference, pp. 222–227 (Literature 3), for example. According to the method described in this literature, parts of a person body such as the head, hands, legs, feet and the torso can be individually recognized by a stereo method.

Embodiment 4

Figure 46:
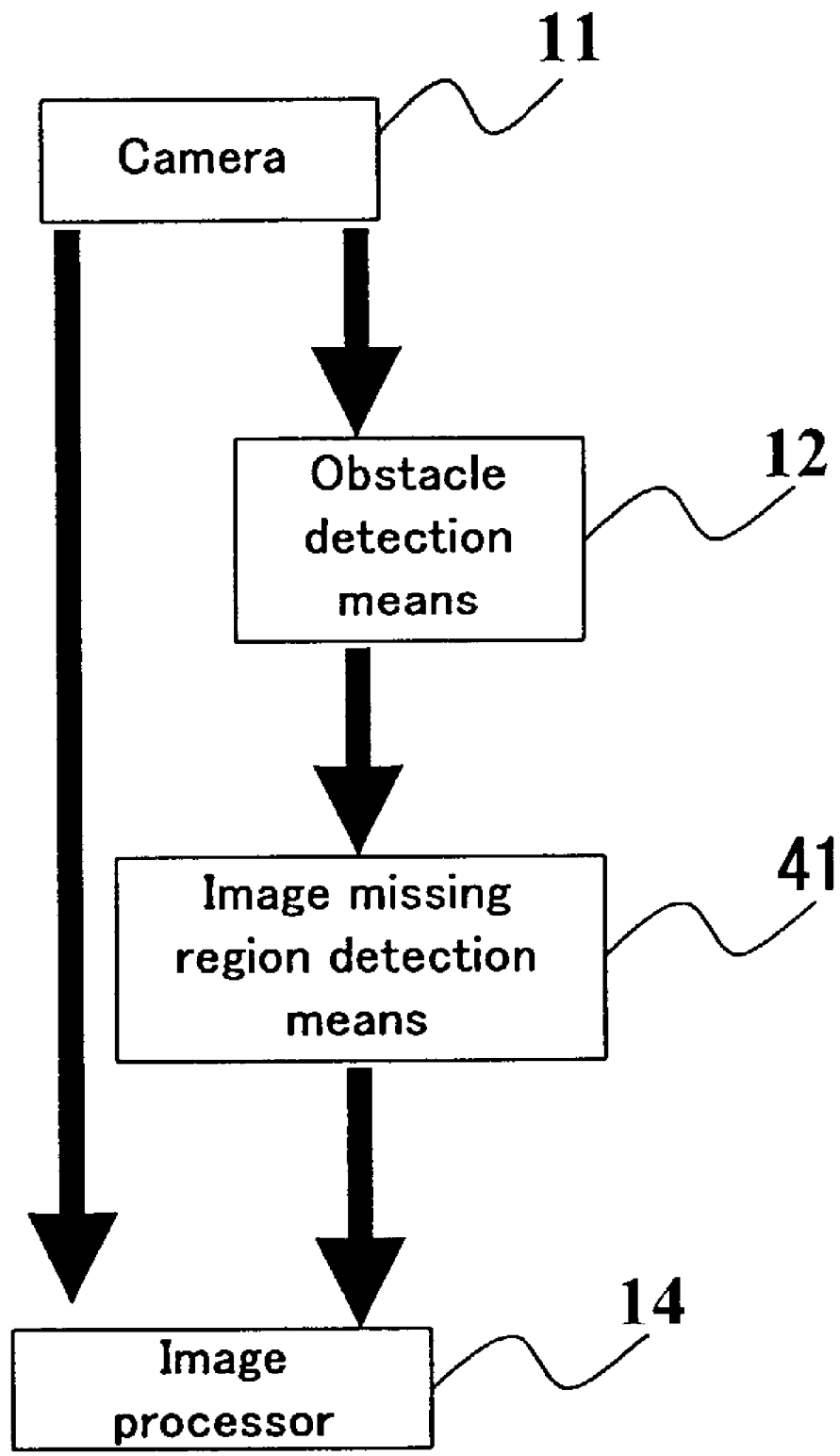
FIG. 46 is a block diagram of a basic configuration of a vehicle surroundings display device of Embodiment 4 of the present invention.

FIG. 46 conceptually shows a basic configuration of a vehicle surroundings display device of Embodiment 4 of the present invention. The vehicle surroundings display device of FIG. 46 includes, as a basic configuration: a camera 11 for taking images of the surroundings of a vehicle; an obstacle detection means 12 for detecting an obstacle in the surroundings of the vehicle; an image processor 14 receiving images taken with the camera 11 (camera images) for generating an image showing the situation around the vehicle from the received camera images; and an image missing region detection means 41 for detecting an image missing region in a surroundings image. When an obstacle is detected by the obstacle detection means 12, the image missing region detection means 41 detects an image missing region in which no image data is obtained from the camera 11 due to existence of the obstacle. The feature of Embodiment 4 distinguishing from Embodiment 1 is the image missing region detection means 41. The image missing region detection means 41 detects an image missing region failing to obtain image data from the camera 11 when an obstacle is detected by the obstacle detection means 12, and the image processor 14 fills at least part of the image missing region with substitute image data by interpolation and synthesis as in the embodiments described above, to complete a vehicle surroundings image.

Figure 47:
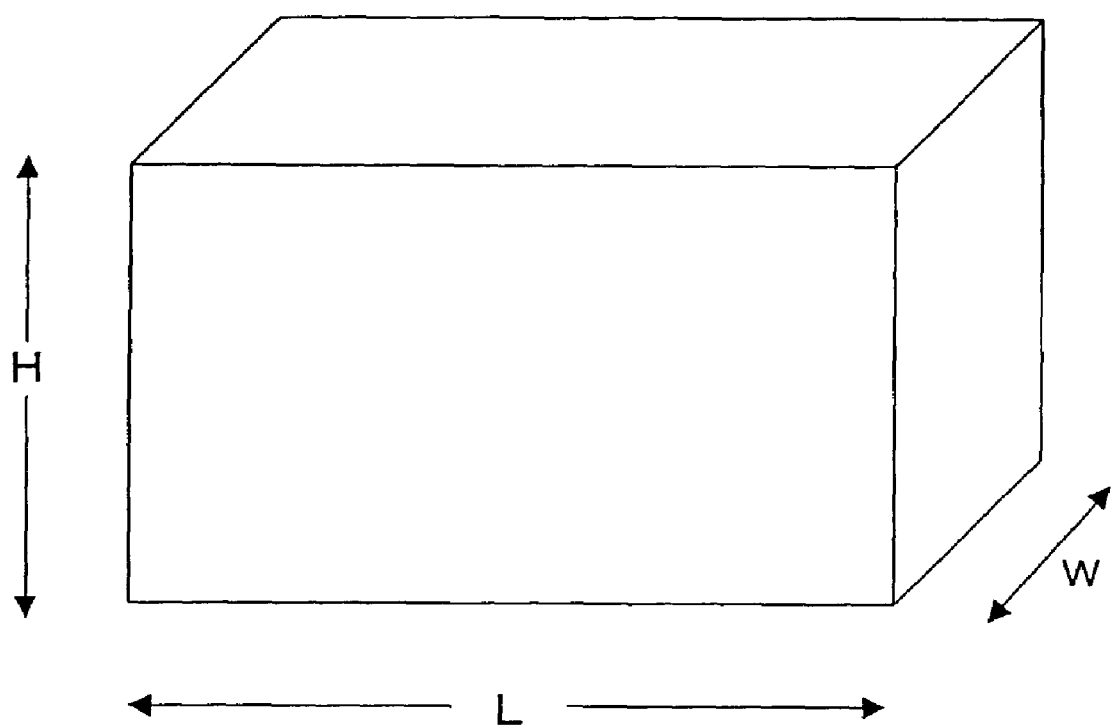
FIG. 47 is an example of a virtual obstacle shape.

The image missing region detection means 41 holds arbitrary three-dimensional shape models called virtual obstacle shapes imitating rough shapes of obstacles. FIG. 47 shows an example of a virtual obstacle shape. Other virtual obstacle shapes, such as a cube and any polyhedrons, and modeled shapes of actual obstacles can also be used. The size of a virtual obstacle shape may be determined arbitrarily. If it is presumed that a detected obstacle is a vehicle, the size may be a size of normal vehicles, such as 1.7 m W (minor side)×4.2 m L (major side)×1.4 mm H (height), for example. It is also possible to hold a plurality of virtual obstacle shapes, determine the type of an obstacle in the manner described in Embodiment 3, and select a virtual obstacle shape based on the determined type.

The determined virtual obstacle shape is fitted to the region recognized as an obstacle, and a camera image is projected on the shape. A region of the virtual obstacle shape on which no image is projected during the projection of the camera image is considered as an image missing region. The image processor 14 performs image synthesis by the interpolation/superposing described above to fill the image missing region with image data, to thereby generate a surroundings image. That is, by use of a virtual obstacle shape, the image projection plane and the image missing region can be presumed simultaneously.

Figure 48:
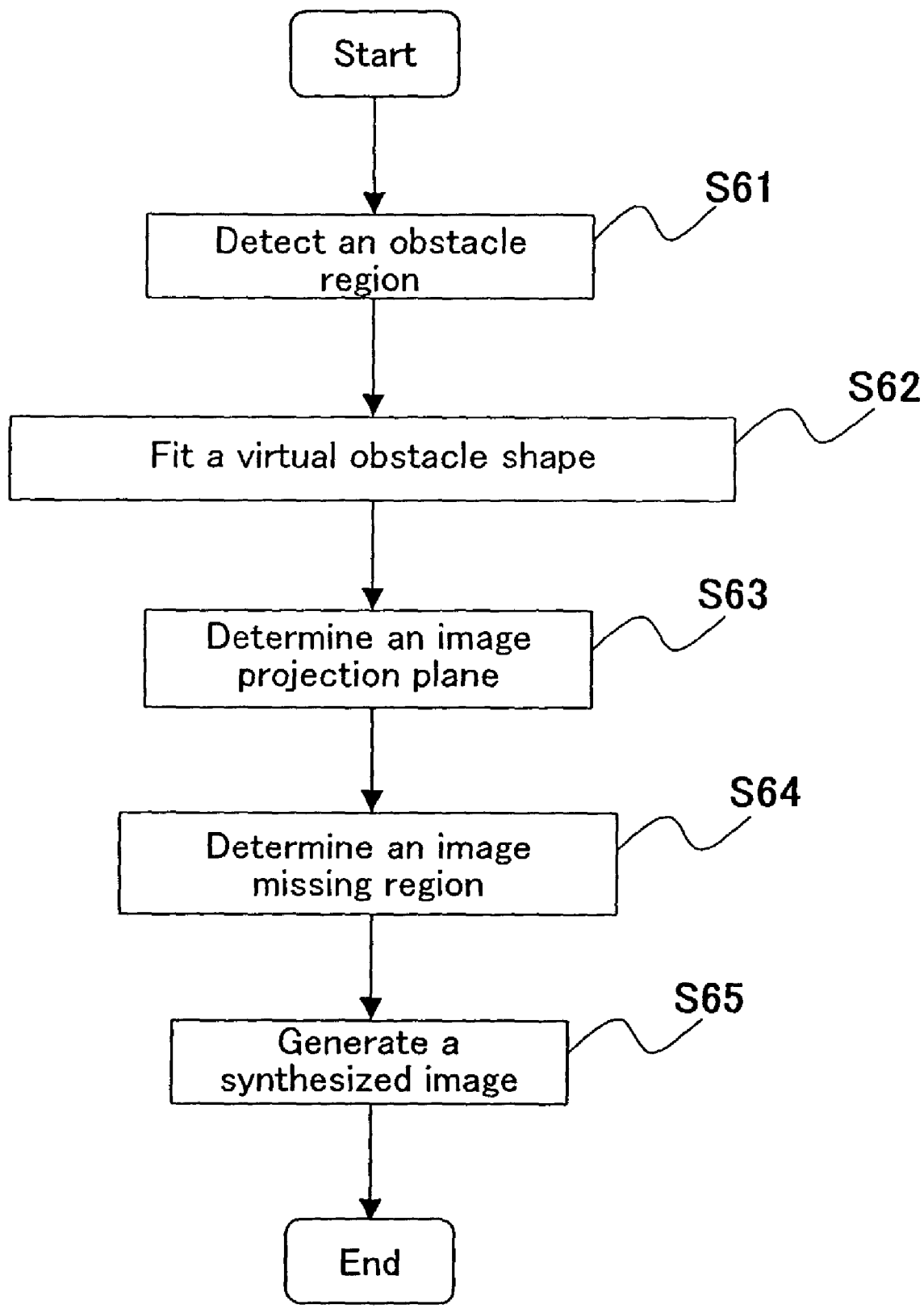
FIG. 48 is a flowchart of processing in Embodiment 4 of the present invention.
Figure 49:
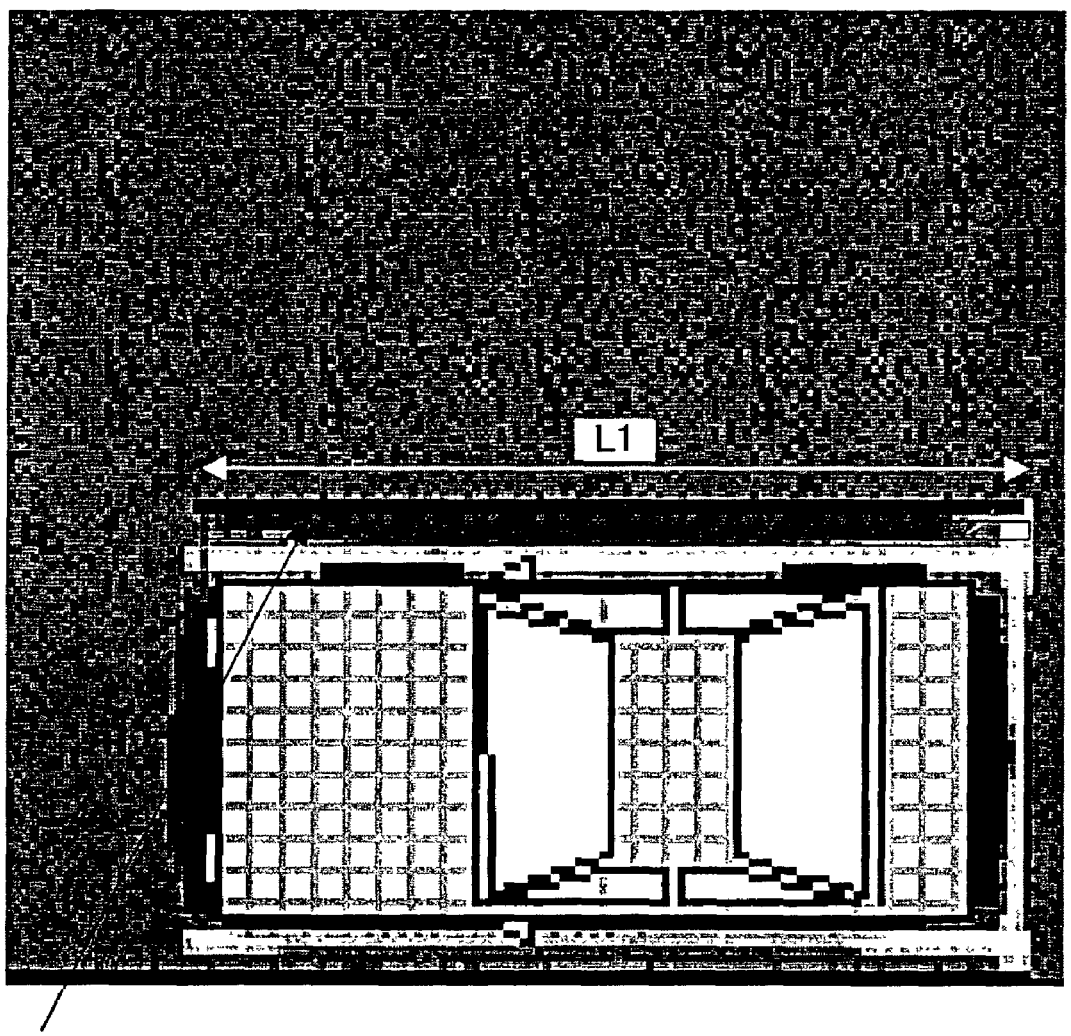
FIG. 49 shows an obstacle region detected.

FIG. 48 is a flowchart of processing in this embodiment. First, as shown in FIG. 49, an obstacle region is detected by the obstacle detection means 12, and the length L1 of the region is measured (step S61) as in Embodiment 1. The obstacle region is obtained as a plane.

Figure 50:
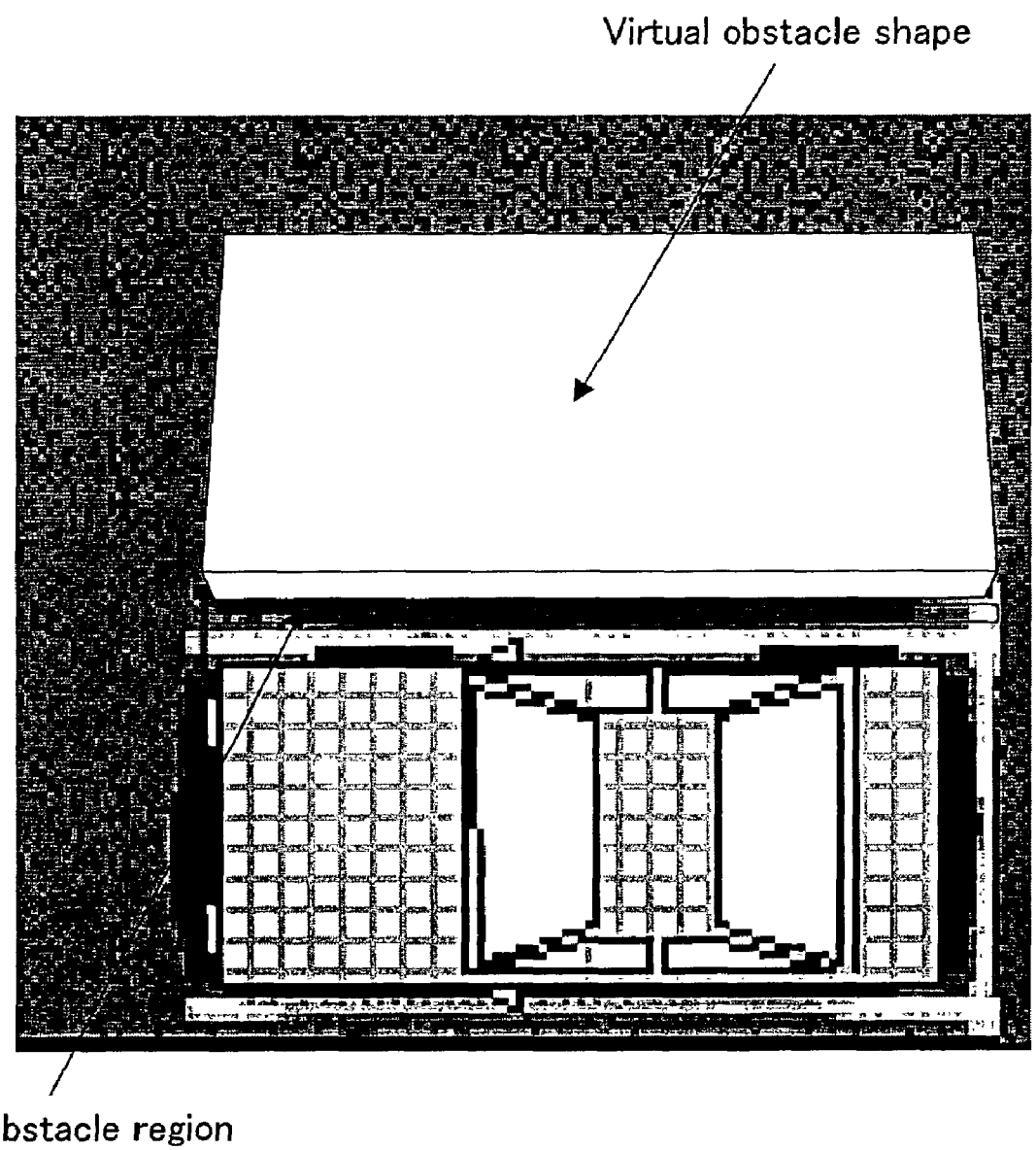
FIG. 50 is a view for illustrating fitting of a virtual obstacle shape to the obstacle region.

A virtual obstacle shape is fitted to the detected obstacle region (step S62). As the virtual obstacle shape, a shape formed based on the shape and size of a vehicle as shown in FIG. 47 is used. When the measured length L1 of the obstacle region is near the length L of the major side and sufficiently longer than the length W of the minor side, the virtual obstacle shape is placed so that the major side is aligned with the obstacle region as shown in FIG. 50. On the contrary, when the length L1 of the obstacle region is near the length W of the minor side and sufficiently shorter than the length L of the major side, the virtual obstacle shape is placed so that the minor side is aligned with the obstacle region.

Figure 51:
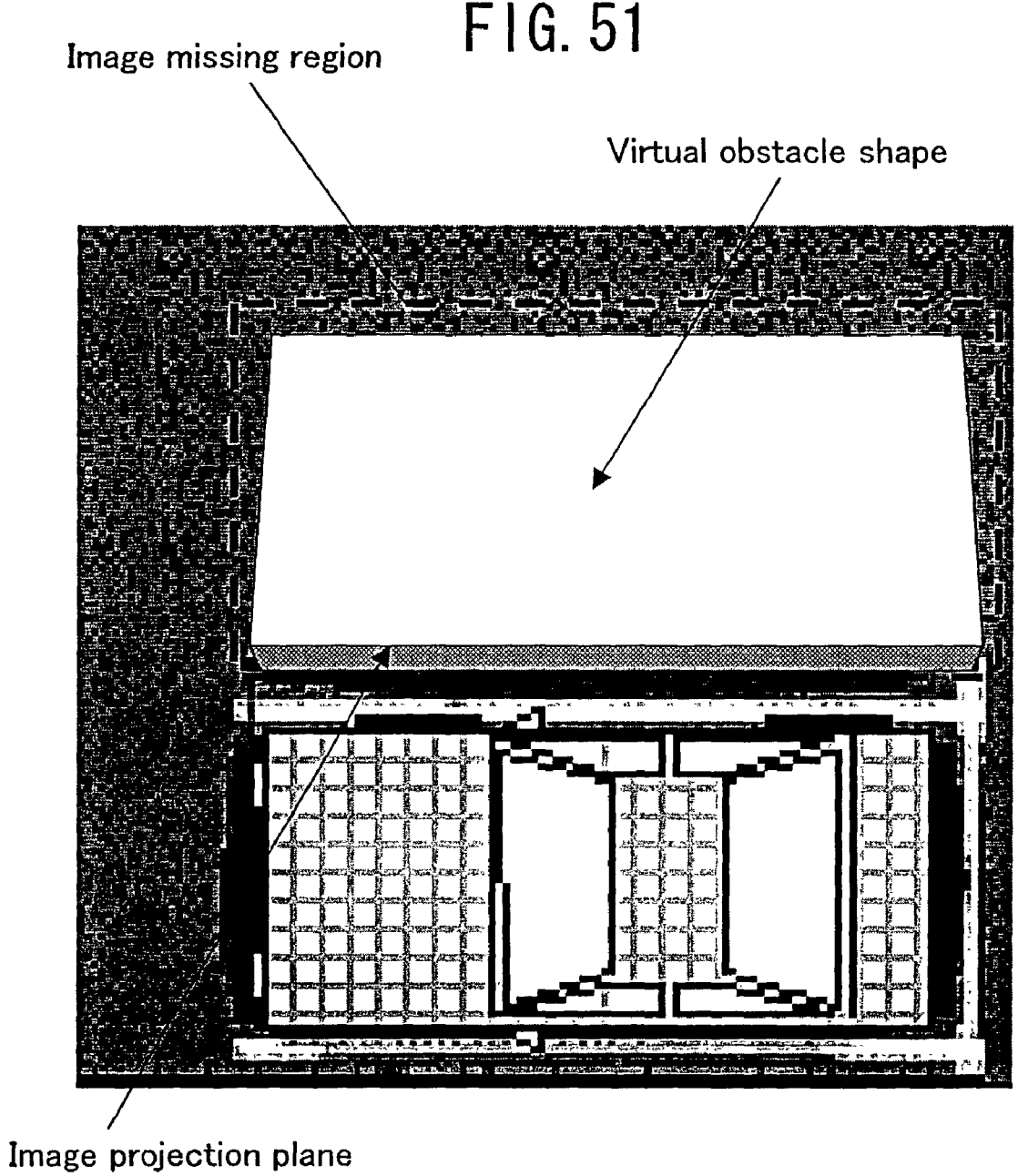
FIG. 51 is a view for illustrating image projection on the virtual obstacle shape.

As shown in FIG. 51, a region of the fitted virtual obstacle shape closer to the user's vehicle is determined as an image projection plane, to project an obstacle image taken with the camera on the image projection plane (step S63). After this projection, the region of the fitted virtual obstacle shape other than the image projection plane is considered as an image missing region (step S64). The interpolation/superposing described above is performed for this image missing region, to thereby generate a synthesized image (step S65).

Figure 45:
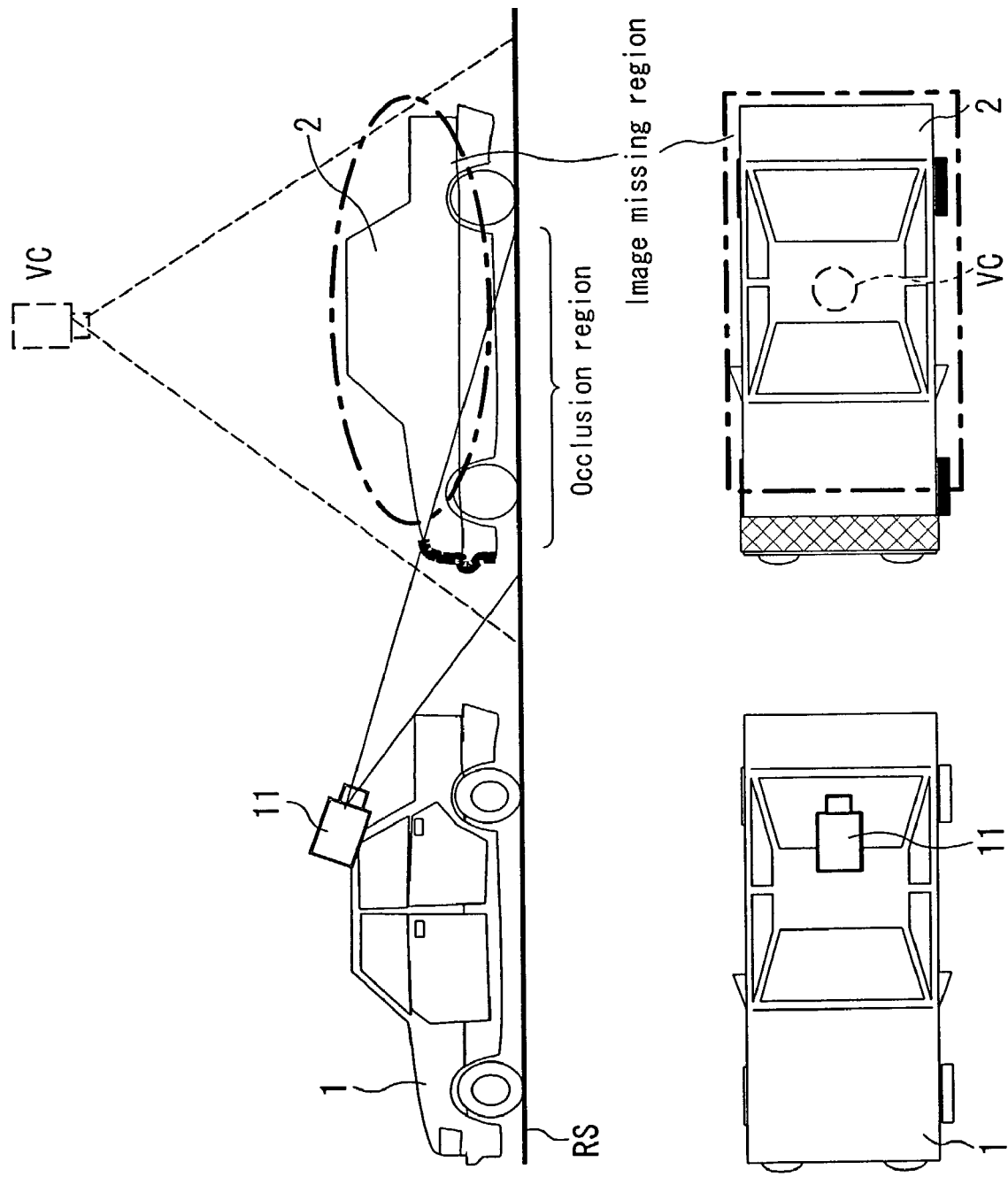
FIG. 45 is a view for illustrating an image missing region, in which a vehicle is at a stop in the rear of the user's vehicle.

FIGS. 52A, 52B, 53A and 53B conceptually show the results of the fitting of a virtual obstacle shape in the situation shown in FIG. 45 in which a vehicle 2 exists in the rear of the user's vehicle 1. FIGS. 52A and 52B are viewed from a side, while FIGS. 53A and 53B are viewed from above.

(Application to Objects Other than Vehicles)

The application of the present invention is not limited to vehicles. For example, the present invention is applicable to indoor and outdoor monitoring systems and vision systems for mobile robots.

An application to an indoor monitoring system will be described as an example. In an indoor monitoring system as an image providing system, a plurality of cameras may be placed to widen the image-provided range, and images from the plurality of cameras may be synthesized into one image for monitoring by applying a technique of virtual viewpoint synthesis. FIG. 54 is a conceptual view of a monitoring system in which two cameras 11A and 11B take images of a room. As shown in FIG. 54, a table TB and two chairs CH1 and CH2 are placed in the room. Images taken with the two cameras 11A and 11B are synthesized to provide a virtual viewpoint image viewed via a virtual camera VC.

The center region of the table TB is not covered by any of the cameras 11A and 11B and thus fails to obtain image data although it is not an occlusion region. Therefore, this region constitutes an image missing region in the virtual viewpoint image. If the table TB does not exist in the room, this missing of image data will not occur. In other words, in this case, the image missing region is generated, not due to occlusion, but because no image data is obtained due to existence of the table TB as an object.

In view of the above, the system is provided with a detection means for detecting an object in the monitor range (image-provided range) and an image missing region detection means for detecting an image missing region in a monitor image (provided image) when an object is detected by the detection means. Once an image missing region is detected, an image processor fills the image missing region with substitute image data by the interpolation or by the method using a database image described above, for example. In the resultant provided image, unnaturalness of the image missing region is reduced due to the filling with substitute image data, and camera image data is used for the portion other than the image missing region. Therefore, the user does not feel the provided image unnatural so much and can recognize the situation in the image-provided range accurately.

In recent years, research on a novel view from multiple views has been vigorously made (for example, H. Saito et al., "Virtualizing real scene from multiple view images—View interpolation of multiple cameras based on projective geometry among cameras", Information Processing Society of Japan SIG Notes 2002-CVIM-131, pp. 53–60). The present invention is also applicable to the fields related to this technique, including, for example, the field of amusement such as TV broadcast of football, baseball and other sports. This research relates to generation of an image from a viewpoint at a non-camera position as an interpolation image between multiple camera images. However, if the viewpoint is largely deviated from actual camera positions, an occlusion region is generated as described above causing formation of an image missing region. The present invention is also effective for generation of an image for such an image missing region.

In the embodiments described above, it was assumed that the position of a virtual viewpoint for image synthesis was above a vehicle. The present invention is also applicable to cases using virtual viewpoints at positions other than this position. The technical idea of the present invention is also effective for generation of a vehicle surroundings image by a technique other than the virtual viewpoint transform.

As described above, using the vehicle surroundings display device of the present invention, the user does not feel unnaturalness for a surroundings image so much and can recognize the position of an obstacle in the surroundings of the user's vehicle accurately. Thus, safe driving operation is possible more reliably and comfortably than in the conventional case. Also, according to the image providing system of the present invention, the user does not feel unnaturalness for a provided image so much and can recognize the situation in the image-provided range accurately.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A vehicle surroundings display device comprising:
   a camera for taking an image of the surroundings of a vehicle:
   obstacle detection means for detecting an obstacle in the surroundings of the vehicle;
   an image processor for generating a surroundings image representing the situation around the vehicle from the image taken with the camera; and
   image missing region detection means for detecting an image missing region in the surroundings image when the obstacle is detected by the obstacle detection means, the image missing region failing to obtain image data from the camera due to existence of the obstacle,
   wherein the image missing region detection means includes object position detection means for detecting a border position of the obstacle, which is a position of a border on the vehicle side of an outline of the obstacle, and determines the image missing region using the detected border position,
   wherein the image processor fills at least part of the image missing region with substitute image data when the image missing region is detected.

2. The device of claim 1, wherein the image processor uses a border image including at least the border portion of the obstacle on the vehicle side for generation of the substitute image data.

3. The device of claim 2, wherein the image processor places the border image on the surroundings image so as to align with the border position detected by the obstacle position detection means, presumes a region occupied by the obstacle in the surroundings image by aligning with the border position, and generates the substitute image data by pixel interpolation using pixel data of the border image for a portion of the presumed obstacle region other than the border image.

4. The device of claim 3, wherein when the obstacle is an axisymmetric object, the image processor assumes a symmetry axis of the obstacle in the surroundings image, inverts the border image with respect to the symmetry axis to provide an inverted border image, and generates an image between the border image and the inverted border image in the obstacle region by the pixel interpolation using pixel data of the border image.

5. The device of claim 1, further comprising an obstacle image database for sorting image data of objects as candidates of obstacles, wherein the image processor determines the type of the detected obstacle, reads image data of the determined type of obstacle from the obstacle image database, places the read image data on the surroundings image to alight with the border position detected by the obstacle position detection means as the substitute image data.

6. The device of claim 5, wherein the image processor determines the type of the obstacle based on the image from the camera.

7. The device of claim 1, wherein when the obstacle is a vehicle, the obstacle position detection means detects a contact position of a tire of the vehicle with the road surface in the image form the camera as the border position.

8. The device of claim 1, wherein when the obstacle is a vehicle, the obstacle position detection means detects a line of a plane including a number plate of the vehicle in contact with the road surface in the image from the camera as the border position.

9. The device of claim 1, wherein the image processor generates the surroundings image by performing virtual viewpoint transform based on the image form the camera.

10. An image providing system comprising:

a camera for taking an image;

detection means for detecting an object in an image-provided range;

an image processor for generating a provided image showing the situation in the image-provided range form the image taken with the camera; and image missing region detection means for detecting an image missing region in the provided image when an object is detected by the detection means, the image missing region failing to obtain image data from the camera due to existence of the object, wherein the image missing region detection means includes object position detection means for detecting a border position of the object, which is a position of a border on the camera side of an outline of the object, and determines the image missing region using the detected border position, wherein the image processor fills at least part of the image missing region with substitute image data when the image region is detected.

11. The system of claim 10, wherein the camera takes an image of the surroundings of a vehicle.

12. The system of claim 10, wherein the camera takes an image of the inside or surroundings of a building.

* * * * *